United States Patent
Sivertsen et al.

(10) Patent No.: US 12,529,707 B2
(45) Date of Patent: Jan. 20, 2026

(54) LATERAL FLOW ASSAY MACHINE TESTING QUALITY VERIFICATION

(71) Applicant: Assaya LLC, Roswell, GA (US)

(72) Inventors: Clas Sivertsen, Lilburn, GA (US); Sturla Sivertsen, Møre og Romsdal (NO); Roy Larsen, Kristiansund (NO); Tom Sivertsen, Kristiansund (NO)

(73) Assignee: Assaya LLC, Lakeside, MT (US)

( * ) Notice: Subject to any disclaimer, the term of this patent is extended or adjusted under 35 U.S.C. 154(b) by 313 days.

(21) Appl. No.: 17/382,968

(22) Filed: Jul. 22, 2021

(65) Prior Publication Data

US 2024/0410910 A1    Dec. 12, 2024

(51) Int. Cl.
*G01N 35/00*    (2006.01)
*G01N 21/77*    (2006.01)
(Continued)

(52) U.S. Cl.
CPC .  *G01N 35/00722* (2013.01); *G01N 33/54388* (2021.08); *G01N 2035/00019* (2013.01); *G01N 2035/0091* (2013.01)

(58) Field of Classification Search
CPC .... G01N 21/77; G01N 21/78; G01N 21/8483; G01N 33/487; G01N 33/5302;
(Continued)

(56) References Cited

U.S. PATENT DOCUMENTS

| 5,075,078 A | * | 12/1991 | Osikowicz | G01N 33/54366 D24/223 |
| 5,308,775 A | * | 5/1994 | Donovan | G01N 33/54366 436/805 |

(Continued)

FOREIGN PATENT DOCUMENTS

| CN | 102482702 A | 5/2012 |
| CN | 102539735 A | 7/2012 |

(Continued)

OTHER PUBLICATIONS

Waters, L. C. et al, Journal of Hazardous Materials 1995, 43, 1-12. (Year: 1995).*

(Continued)

*Primary Examiner* — Arlen Soderquist
(74) *Attorney, Agent, or Firm* — Nicholson De Vos Webster & Elliott LLP; Judith Szepesi

(57) ABSTRACT

A system including a processor and memory coupled to the processor. The memory stores a local testing database having a test configuration profile for a cassette having a lateral flow assay ("LFA") strip having a test line and intensity threshold value. An operator input device is coupled to the processor for receiving operator provided results from an operator that is provided to the processor. An LFA test result display for displaying an LFA test result, and an LFA strip reader coupled to the processor for reading the LFA strip is in the system. The processor determines the LFA test result based on comparing a measured intensity value of a portion of the test line in the LFA strip image to the intensity threshold value for the test line, receives the operator provided result from the operator input device, and provides to the LFA test result display the LFA test result.

22 Claims, 64 Drawing Sheets

(51) Int. Cl.
*G01N 21/84* (2006.01)
*G01N 33/543* (2006.01)

(58) Field of Classification Search
CPC ....... G01N 33/54366; G01N 33/54387; G01N 33/54388; G01N 33/558; G01N 33/56983; G01N 35/00584; G01N 35/00594; G01N 35/00613; G01N 35/00623; G01N 35/00722; G01N 2035/0091; G01N 2035/00019
USPC ................... 422/403–404, 420–430, 63–67, 422/82.05–82.11; 436/43, 46, 164–166, 436/169–170, 172
See application file for complete search history.

(56) References Cited

U.S. PATENT DOCUMENTS

| | | | | |
|---|---|---|---|---|
| 5,717,778 | A * | 2/1998 | Chu | G01N 21/8483 382/133 |
| 5,875,258 | A * | 2/1999 | Ortyn | G01N 35/00594 382/129 |
| 5,968,839 | A * | 10/1999 | Blatt | G01N 33/54388 435/11 |
| 6,061,128 | A * | 5/2000 | Zweig | G01N 21/6428 250/252.1 |
| 6,267,722 | B1 * | 7/2001 | Anderson | G16H 15/00 436/814 |
| 6,394,952 | B1 * | 5/2002 | Anderson | G01N 21/8483 436/814 |
| 6,664,071 | B1 * | 12/2003 | Windhab | H10K 85/633 436/805 |
| 7,177,235 | B2 | 2/2007 | Rund | |
| 7,236,428 | B1 | 6/2007 | Morse | |
| 7,267,799 | B1 * | 9/2007 | Borich | G01N 21/8483 422/62 |
| 9,702,872 | B1 * | 7/2017 | Wang | B01L 3/502761 |
| 9,857,372 | B1 * | 1/2018 | Pulitzer | G01N 33/54388 |
| 9,857,373 | B1 * | 1/2018 | Pulitzer | G06V 10/56 |
| 10,197,558 | B1 | 2/2019 | Saaski et al. | |
| 10,823,746 | B1 * | 11/2020 | Busa | G01N 33/56983 |
| 11,740,203 | B2 | 8/2023 | Galen et al. | |
| 11,802,868 | B2 | 10/2023 | Pulitzer et al. | |
| 12,094,603 | B2 | 9/2024 | Sivertsen | |
| 2001/0053336 | A1 | 12/2001 | Hammer et al. | |
| 2003/0021726 | A1 * | 1/2003 | Wu | B01L 3/502 422/404 |
| 2003/0040128 | A1 * | 2/2003 | Meador | G16H 10/40 702/19 |
| 2003/0120633 | A1 | 6/2003 | Torre-Bueno | |
| 2003/0139903 | A1 * | 7/2003 | Zweig | G16H 40/40 702/182 |
| 2003/0143530 | A1 * | 7/2003 | Klepp | C12Q 1/701 435/5 |
| 2004/0122790 | A1 * | 6/2004 | Walker | A61B 5/318 |
| 2005/0008538 | A1 * | 1/2005 | Anderson | G01N 33/94 436/56 |
| 2005/0203353 | A1 * | 9/2005 | Ma | G01N 21/8483 600/315 |
| 2005/0255001 | A1 * | 11/2005 | Padmanabhan | G01N 15/1404 436/63 |
| 2005/0255600 | A1 * | 11/2005 | Padmanabhan | G01N 35/00722 436/63 |
| 2006/0216832 | A1 * | 9/2006 | Nishikawa | G01N 21/8483 436/514 |
| 2006/0223192 | A1 * | 10/2006 | Smith | G01N 33/6842 436/514 |
| 2006/0246599 | A1 * | 11/2006 | Rosenstein | G01N 33/54388 436/514 |
| 2006/0274145 | A1 * | 12/2006 | Reiner | G16H 30/20 707/E17.031 |
| 2006/0292040 | A1 * | 12/2006 | Wickstead | G01N 21/8483 422/82.05 |
| 2007/0122914 | A1 * | 5/2007 | Curry | G01N 33/54366 435/287.2 |
| 2008/0186499 | A1 * | 8/2008 | Krauth | G01N 21/278 356/243.1 |
| 2009/0061450 | A1 | 3/2009 | Hunter | |
| 2009/0074282 | A1 * | 3/2009 | Pinard | G06V 20/69 382/133 |
| 2009/0087926 | A1 * | 4/2009 | Hasegawa | G01N 33/54388 436/518 |
| 2009/0155811 | A1 * | 6/2009 | Natan | G01N 33/54388 435/7.1 |
| 2009/0312663 | A1 * | 12/2009 | John | G16H 10/60 705/3 |
| 2010/0045789 | A1 * | 2/2010 | Fleming | G01N 21/77 348/79 |
| 2010/0105024 | A1 | 4/2010 | Xu et al. | |
| 2010/0135857 | A1 * | 6/2010 | Hunter | G01N 35/00693 422/82.08 |
| 2010/0267049 | A1 | 10/2010 | Rutter et al. | |
| 2010/0331651 | A1 * | 12/2010 | Groll | G16H 40/63 345/440 |
| 2011/0213564 | A1 * | 9/2011 | Henke | G16H 40/67 702/23 |
| 2011/0213579 | A1 * | 9/2011 | Henke | G16H 10/40 702/85 |
| 2012/0071342 | A1 * | 3/2012 | Lochhead | B01L 3/502715 435/5 |
| 2012/0115214 | A1 * | 5/2012 | Battrell | G01N 21/645 422/82.08 |
| 2012/0122236 | A1 | 5/2012 | Tarpey | |
| 2012/0123686 | A1 | 5/2012 | Xiang et al. | |
| 2012/0282154 | A1 * | 11/2012 | Slowey | G01N 21/8483 422/401 |
| 2013/0203043 | A1 * | 8/2013 | Ozcan | G01N 21/645 435/7.1 |
| 2013/0273645 | A1 | 10/2013 | Waga | |
| 2013/0288254 | A1 | 10/2013 | Pollack et al. | |
| 2013/0338243 | A1 | 12/2013 | Kentsis et al. | |
| 2014/0017812 | A1 * | 1/2014 | Smith | G01N 33/54388 422/430 |
| 2014/0018779 | A1 | 1/2014 | Worrell et al. | |
| 2014/0154792 | A1 * | 6/2014 | Moynihan | G01N 33/5302 422/69 |
| 2014/0227681 | A1 * | 8/2014 | Fleming | G01N 21/6428 435/5 |
| 2014/0278832 | A1 * | 9/2014 | Glavina | G06Q 30/018 705/7.42 |
| 2014/0324373 | A1 * | 10/2014 | Xiang | G01N 35/00623 702/81 |
| 2014/0339100 | A1 | 11/2014 | Malecha | |
| 2015/0010992 | A1 * | 1/2015 | Fleming | G01N 21/6428 422/69 |
| 2015/0099306 | A1 * | 4/2015 | Ku | G01N 35/00871 436/87 |
| 2015/0244852 | A1 | 8/2015 | Erickson et al. | |
| 2016/0030613 | A1 | 2/2016 | Paul et al. | |
| 2016/0157598 | A1 | 6/2016 | Anelevitz | |
| 2016/0178607 | A1 * | 6/2016 | Husheer | G01N 21/78 422/82.09 |
| 2016/0188937 | A1 * | 6/2016 | Tyrrell | G01N 35/00029 382/128 |
| 2016/0265032 | A1 | 9/2016 | Sethi et al. | |
| 2016/0356800 | A1 * | 12/2016 | Glavina | G01N 35/00871 |
| 2016/0356801 | A1 * | 12/2016 | Glavina | G01N 35/00623 |
| 2016/0370366 | A1 * | 12/2016 | Fleming | B01L 3/502746 |
| 2017/0049915 | A1 | 2/2017 | Brais et al. | |
| 2017/0160258 | A1 * | 6/2017 | Hengstler | G01N 33/48 |
| 2017/0184586 | A1 * | 6/2017 | Hopper | G01N 33/54388 |
| 2018/0031551 | A1 * | 2/2018 | Karlovac | G16H 10/40 |
| 2018/0106789 | A1 * | 4/2018 | Pulitzer | G01N 33/5302 |
| 2018/0107790 | A1 * | 4/2018 | Pulitzer | G06T 7/0012 |
| 2018/0149600 | A1 * | 5/2018 | Farrell | G01N 33/54373 |
| 2018/0164222 | A1 | 6/2018 | Pulitzer et al. | |
| 2018/0246038 | A1 | 8/2018 | Hunter | |
| 2018/0259449 | A1 | 9/2018 | Poulsen et al. | |
| 2018/0293350 | A1 * | 10/2018 | Dimov | G16H 50/20 |
| 2018/0348198 | A1 * | 12/2018 | Broadwell | A61B 5/14532 |

(56) References Cited

U.S. PATENT DOCUMENTS

| | | | |
|---|---|---|---|
| 2018/0372734 A1* | 12/2018 | Pfenninger | G01N 21/8483 |
| 2019/0070324 A1 | 3/2019 | Hardin et al. | |
| 2019/0096516 A1 | 3/2019 | Pulitzer et al. | |
| 2019/0122768 A1 | 4/2019 | Pulitzer et al. | |
| 2019/0224685 A1 | 7/2019 | Benenati | |
| 2019/0229907 A1 | 7/2019 | Nicolson et al. | |
| 2019/0267822 A1 | 8/2019 | Waffner et al. | |
| 2019/0317115 A1 | 10/2019 | Maclean et al. | |
| 2019/0339264 A1 | 11/2019 | Gary et al. | |
| 2019/0369094 A1 | 12/2019 | Ishikawa et al. | |
| 2020/0330979 A1* | 10/2020 | Cyr | G01N 11/02 |
| 2020/0386753 A1 | 12/2020 | Somes et al. | |
| 2020/0408715 A1 | 12/2020 | Galen et al. | |
| 2021/0086177 A1 | 3/2021 | Lin | |
| 2021/0132035 A1* | 5/2021 | Adelman | H04W 12/08 |
| 2021/0172945 A1 | 6/2021 | Armbruster et al. | |
| 2021/0263018 A1 | 8/2021 | Taran | |
| 2021/0293688 A1* | 9/2021 | Chang | G01N 33/487 |
| 2021/0319911 A1 | 10/2021 | Hall et al. | |
| 2021/0327056 A1* | 10/2021 | Needham | G06T 7/30 |
| 2022/0091114 A1* | 3/2022 | Levin | G01S 19/01 |
| 2022/0178920 A1 | 6/2022 | Howard | |
| 2022/0254027 A1* | 8/2022 | Lin | G01N 21/8483 |
| 2022/0254133 A1* | 8/2022 | Adsul | G06V 10/454 |
| 2022/0258155 A1 | 8/2022 | Ren et al. | |
| 2022/0296755 A1 | 9/2022 | Wurmfeld et al. | |
| 2022/0304560 A1 | 9/2022 | Jackson et al. | |
| 2022/0399109 A1* | 12/2022 | Sivertsen | G16H 10/40 |
| 2022/0404354 A1 | 12/2022 | Robinson et al. | |
| 2022/0405551 A1* | 12/2022 | Jain | G01N 33/54388 |
| 2022/0412961 A1 | 12/2022 | Jolly et al. | |
| 2023/0213452 A1* | 7/2023 | Minobe | G01N 21/78 345/634 |
| 2023/0274538 A1* | 8/2023 | Sia | G06V 10/82 382/155 |
| 2023/0351754 A1* | 11/2023 | Satish | G01N 21/8483 |
| 2024/0363206 A1 | 10/2024 | Mayer | |
| 2024/0387010 A1* | 11/2024 | Sivertsen | G16H 10/60 |
| 2024/0402198 A1* | 12/2024 | Sivertsen | G01N 35/00029 |
| 2024/0404658 A1* | 12/2024 | Sivertsen | G16H 10/60 |
| 2024/0412829 A1* | 12/2024 | Sivertsen | G16H 10/40 |
| 2024/0424160 A1* | 12/2024 | Sivertsen | A61L 2/24 |
| 2024/0428905 A1* | 12/2024 | Sivertsen | G16H 10/40 |

FOREIGN PATENT DOCUMENTS

| | | | | |
|---|---|---|---|---|
| CN | 106680496 A | * | 5/2017 | ....... G01N 33/56983 |
| EP | 2839264 A1 | | 2/2015 | |
| TW | 201833554 A | | 9/2018 | |
| TW | M588797 U | | 1/2020 | |
| WO | 2013/119266 A1 | | 8/2013 | |
| WO | 2013/158504 A1 | | 10/2013 | |
| WO | 2020/174895 A1 | | 9/2020 | |
| WO | 2020/251460 A1 | | 12/2020 | |

OTHER PUBLICATIONS

Lin, C.-S. et al, Optik 2004, 115, 363-369. (Year: 2004).*
Waugh, J. J. S. et al, BJOG: an International Journal of Obstetrics and Gynaecology 2005, 112, 412-417. (Year: 2005).*
Filippini, D. et al, Analyst 2006, 131, 111-117. (Year: 2006).*
O'Farrell, B., in Lateral Flow Immunoassay 2009, Wong, R. C. et al. (eds.), Humana Press, New York, 1-33. (Year: 2009).*
De Silva, D. A. et al, Journal of Obstetrics and Gynaecology Canada 2014, 36, 605-612. (Year: 2014).*
Hou, Y. et al, Nanoscale Research Letters 2017, 12, paper 291, 13 pages. (Year: 2017).*
Correa, M. E. et al, Pregnancy Hypertension: An International Journal of Women's Cardiovascular Health 2017, 750-53. (Year: 2017).*
Tucker, K. et al, Pregnancy Hypertension 2018, 12, 161-168. (Year: 2018).*
Xu, Y. et al, Analytical Chemistry 2018, 90, 708-715 with 13 pages of supporting information. (Year: 2018).*
Magiati, M. et al, Microchimica Acta 2018, 185, paper 314, 9 pages. (Year: 2018).*
Panic, G. et al, Parasites & Vectors 2019, 12, paper 298, 7 pages. (Year: 2019).*
Anfossi et al., Multiplex Lateral Flow Immunoassay: An Overview of Strategies towards High-throughput Point-of-Need Testing, Biosensors (Basel). Mar. 2019; 9(1): 2. (Year: 2018).
Assaygenie, Rapid covid19 antibody detection test principles and methods, published: 2020, https://www.assaygenie.com/rapid-covid 19-antibody-detection-tests-principles-and-methods (Year: 2020).
Azzi et al, Rapid Salivary Test suitable for a mass screening program to detect SARS-CoV-2: A diagnostic accuracy study, Journal of Infection, vol. 81, Issue 3, Sep. 2020, pp. e75-e78 (Year: 2020).
Badi et al., The Effect of Gold Salt Concentration in the Production of Gold Nanospheres, Jan. 2020, Journal of Applied Mathematics and Physics (Year: 2020).
Baker et al., The SARS-COV-2 Spike Protein Binds Sialic Acids and Enables Rapid Detection in a Lateral Flow Point of Care Diagnostic Device, 2020, vol. 6, 2046-2052 (Year: 2020).
Contreras-Aguilar, Changes in Saliva Analytes in Dairy Cows during Peripartum: A Pilot Study, Mar. 9, 2021, Animals, vol. 11, issues 3 (Year: 2021).
Independent Forensics, Developmental Validation of RSID-Urine, Mar. 2021, Independent Forensics, https://www.ifi-test.com/rsid-urine/ (Year: 2021).
Larsen et al., Fluorometric determination of uric acid in bovine milk, 2010, Journal of Dairy Research, vol. 77, 438-444 (Year: 2010).
Old et al., Developmental Validation of RSIDTM-Saliva: A Lateral Flow Immunochromatographic Strip Test for the Forensic Detection of Saliva, J Forensic Sci, Jul. 2009, vol. 54, No. 4 (Year: 2009).
Richardson et al., Amylase in Cow's Milk, 1936, Journal of Dairy Science, vol. 19, Issue 12, 761-772 (Year: 1936).
Stattechnologies, Adulteration Test Strips, 2017, StatTechnologies, https://stat-technologies.com/product/adulteration-test-strips/ (Year: 2017).
Stuart Patton, Some Practical Implications of the Milk Mucins, 1999, Journal of Dairy Science, vol. 82, Issue 6, 1115-1117 (Year:1999).
Thao et al., Analytical Chemistry 2017, 89, 6781-6786.
Zhu et al. Paper electrode integrated lateral flow immunosensor for quantitative analysis of oxidative stress induced DNA damage, 2014, Analyst, 139(11), 2850-2857 (Year: 2014).
Urusov AE et al. (2019) Towards Lateral Flow Quantitative Assays: Detection Approaches. Biosensors, 9(3), 16 pgs; https://doi.org/10. 3390/bios9030089 (Year: 2019).

* cited by examiner

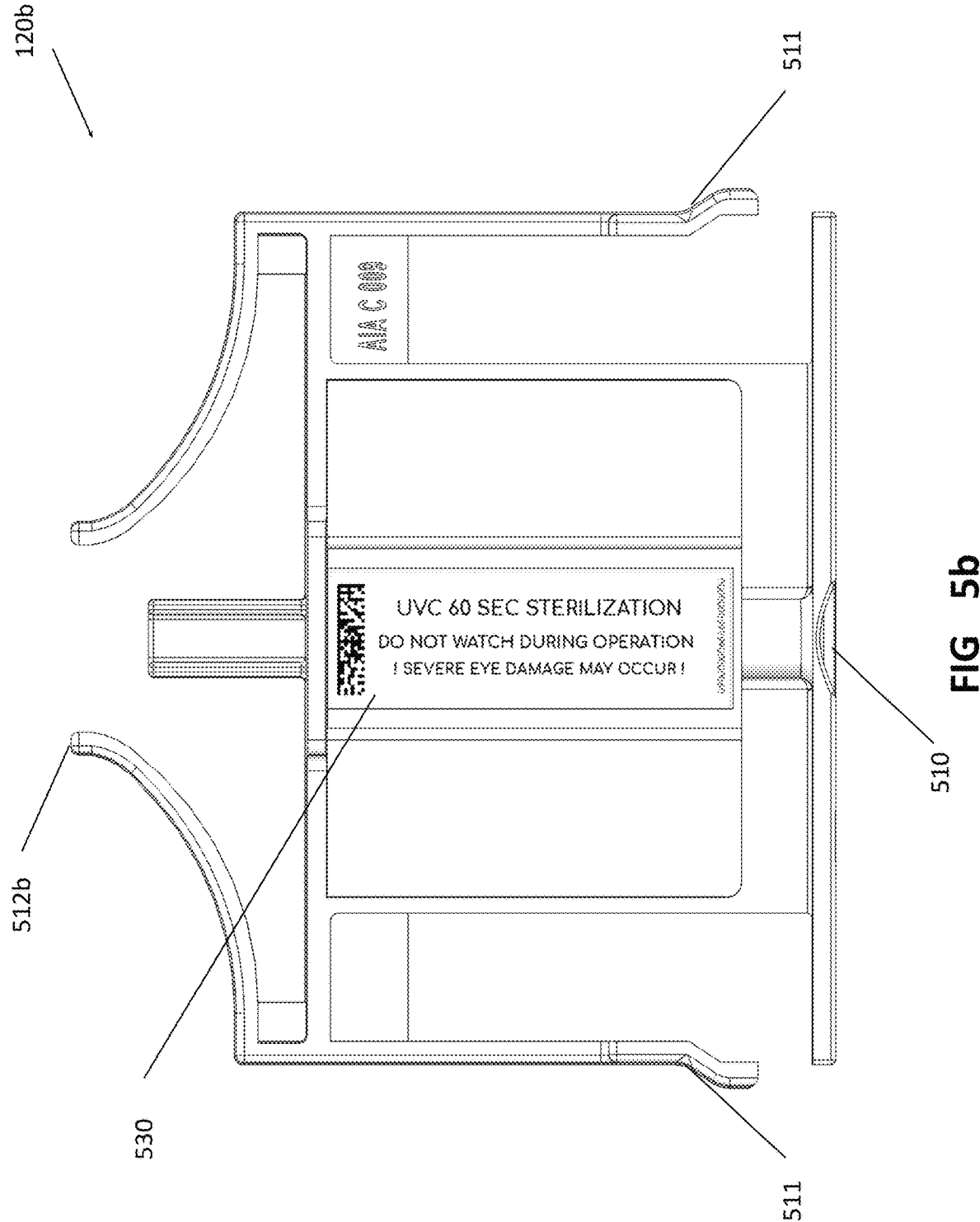

LATERAL FLOW ASSAY MACHINE TESTING QUALITY VERIFICATION

BACKGROUND

The present invention generally relates to diagnostic testing and more specifically, to a machine testing quality verification system and method.

Coronavirus Disease 2019 ("COVID-19") is spreading throughout the world caused by the spread of a novel coronavirus called SARS-CoV-2. With the rapid spread of the disease, testing quickly, accurately, and efficiently is becoming more important. Testing may be performed by a machine or testing may be made using lateral flow assay strips that are visually read by a technician. As systems are developed to computer read and analyze lateral flow assay strips, questions arise as to the quality of the machine readings when compared to reading by a technician.

SUMMARY

Embodiments of the present invention are directed to a system including a processor and memory coupled to the processor. The memory coupled to the processor stores a local testing database having a test configuration profile for a cassette having a lateral flow assay ("LFA") strip having a test line. The test configuration file includes an intensity threshold value for the test line that represents an intensity value which if met or exceeded indicates a positive test result. An operator input device is coupled to the processor for receiving operator provided results from an operator that is provided to the processor. An LFA test result display displays an LFA test result, and an LFA strip reader coupled to the processor reads the LFA strip. The processor determines the LFA test result based on comparing a measured intensity value of a portion of the test line in the LFA strip image to the intensity threshold value for the test line, receives the operator provided result from the operator input device, and provides to the LFA test result display the LFA test result.

Further embodiments of the invention are directed to a method. The method receives a cassette containing an LFA strip having a test line. The method reads, using a processor, the LFA strip, determines, using the processor, an LFA test result based on comparing a measured intensity value of a portion of the test strip in an LFA strip image to an intensity threshold value. A positive test result determination is made when the measured intensity value of the portion of the test strip in the LFA strip image meets or exceeds the intensity threshold value, and a negative test result determination is made when the measured intensity value of the portion the test strip in the LFA strip image is less than the intensity threshold value. The method receives, using the processor, an operator provided result from an operator input device and provides, using the processor, the LFA test result on an LFA test result display.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5b depicts a top-down view of a second sample carrier used in the testing device according to an embodiment of the present invention;

FIGS. 23a-d illustrate the interface on the display unit during operation of the testing device when in the Visual Reading with Machine Confirmation ("VRM") mode in accordance with an embodiment of the present invention.

Figure 1:
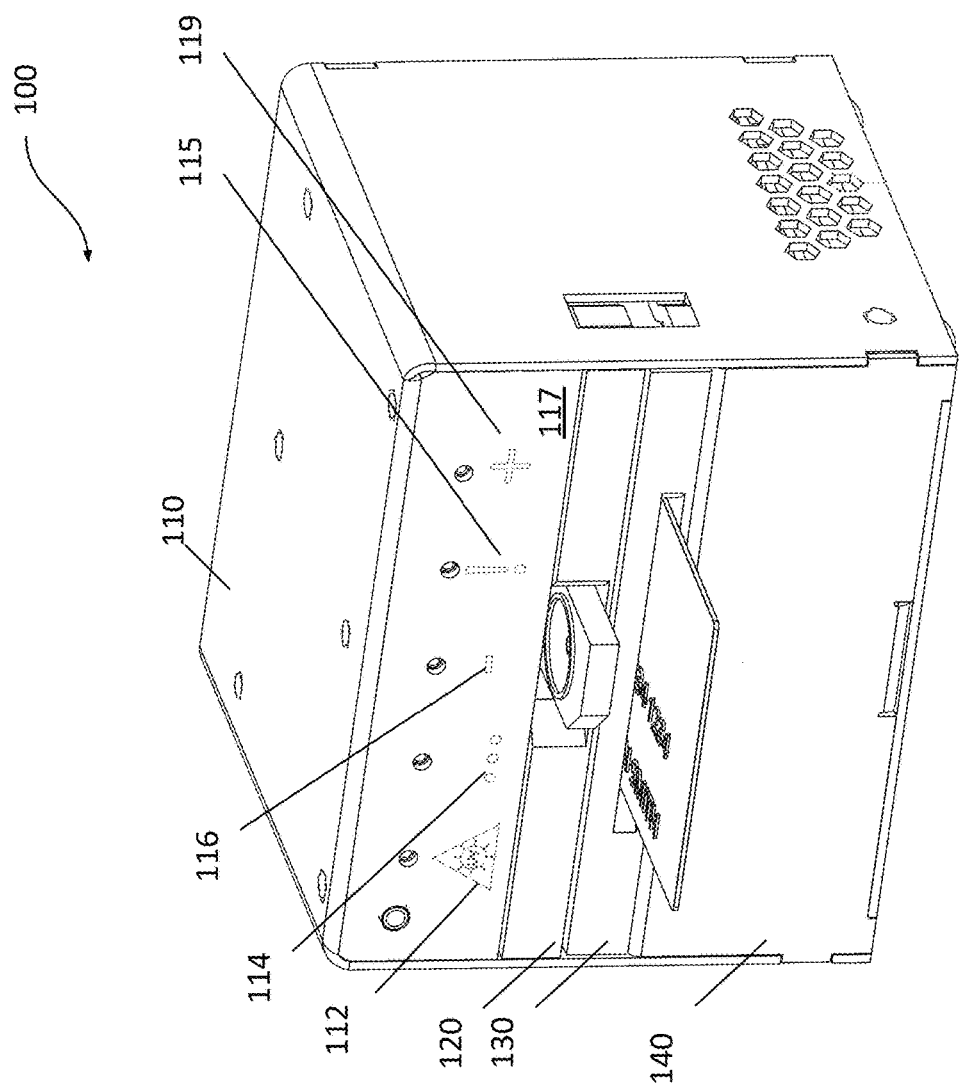
FIG. 1 depicts an orthogonal view of a testing device according to an embodiment of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as previously stated, SARS-CoV-2 is spreading rapidly around the country and around the world resulting in a large portion of the population being at risk of developing COVID-19. It is imperative to test, often repeatedly, the population for SARS-CoV-2, and present testing systems are inadequate.

Testing systems often require a nasal swab to get samples from a patient. This is very uncomfortable for the patient and requires a doctor, nurse, or technician to get very close to the patient, putting her at risk for developing COVID-19. Some tests exist that involve blood or saliva, but those tests, like the nasal tests, often take a great deal of time in order to get results back to the patient. By the time that test results are returned to the patient, the patient, if positive for SARS-CoV-2, may have infected dozens of others, thus spreading the illness.

Furthermore, prior art testing systems do not clearly link a sample taken to a patient's identity. Samples must be labeled, and mistakes are easily made. Results of tests are not returned or stored in any type of database, either locally at the testing device or centrally. This requires difficult and error-prone data collection and entry. These time-consuming and error-riddled techniques are not up to the task of tackling a global pandemic.

In addition, prior art testing systems often lack a display unit and only render results as being positive, negative, or inconclusive. They lack a display that could provide further information about the test administered. Furthermore, such machine readings of LFA strips are questioned as to the quality of the readings when compared to readings made by a human.

Turning now to an overview of the aspects of the invention, one or more embodiments of the invention address the above-described shortcomings of the prior art by providing a system to collect machine readings of LFA strips, along with human readings of the same LFA strips. In this fashion, the quality of the machine readings may be compared with the quality of the readings by a technician. Embodiments of the present invention provide a variety of modes of operation with machine reading and human reading taking place in different order, e.g. machine first or human first. In addition, embodiments can be set up where the human has knowledge of the machine results prior to entering her results or that knowledge can be kept from the human.

While the discussion in this description uses testing for SARS-CoV-2 to discuss embodiments of the invention, those skilled in the art after reading this specification will appreciate that similar techniques can be used to standardize testing of multiple viruses or substances to standardize test results. These test results are standardized across testing techniques and across testing products and protocols of a range of test manufacturers. Regardless of test kit maker, health care professionals can be provided with a standardized result that has meaning beyond positive and negative results.

As previously mentioned, embodiments of the present invention can be implemented with a testing device that provides fast results. RAPID™ (which is an acronym for Reliable Accurate Practical Inexpensive Diagnostics) antigen and antibody tests and associated reading methods become crucial in improving the speed and quality of test data. Because the invention described herein uses a computerized reader rather than relying on human interpretation, systems and method described herein are not only more accurate in differentiating a positive, a negative, and an invalid test result, but they may also visually read and store data, i.e., intensity of a test line, indicative of a concentration of a possibly present pathogen, so that analytics can be performed across a large number of patients, which can in turn be used by government, research institutes, vaccine developers, and pandemic planners implementing prevention measures to reduce the spread of future diseases. This data indicative of a concentration is also used to determine an equivalent result, i.e., an eCt value that can be used by health professionals to guide treatment.

In addition, the testing device of the present invention includes a powerful computer that can store testing protocols for a full gauntlet of different tests as well as equivalence curves that are used to convert intensity of a read test line to an eCt or other appropriate standardized, equivalent results. Tests are not limited to COVID-19 testing, but can include reading any type of test strip, or test carriage, for any type of disease, syndrome, drug, substance, virus, or bacteria. The results of any of these tests are uploaded to a central database for providing to the patient and for later use and analysis. Data collected in the central database may be anonymized for data mining purposes.

The testing device may also communicate with a web browser or dedicated app on a patient's mobile phone, tablet, or computer for providing the patient with test results and logging.

FIG. 1a depicts an orthogonal view of a testing device 100 according to an embodiment of the present invention. The testing device 100 is enclosed by a case 110. The case 110 includes a plurality of electronics for analyzing a lateral flow assay ("LFA") strip present in an assay tube or cassette. References to LFA throughout this specification include references to lateral flow tests, rapid antigen tests, antibody tests, and antigen card tests. A removable carrier 120 has an opening in which the assay tube, cassette, or card is placed. During the remainder of this description, whenever the term "cassette" is used that term includes any of an assay tube, cassette, or card. The LFA strip provides indicators (stripes at various places along the LFA strip) that indicate the presence of analytes present in a sample. The testing device 100 includes an LFA strip reader having a plurality of LEDs at a variety of wavelengths that shine upon the sample and a camera that images the sample, sending the image to a computer present in the testing device 100 for analysis. As a relatively powerful computer receives the image of the LFA strip, the computer can adjust for any misalignment of samples or changes to characteristics of the paper that the LFA strip is made from. In addition, in exemplary embodiments of the invention, one of the light sources can provide UVC light for sterilizing the testing device 100 prior to a new assay tube or cassette being placed in the testing device 100.

The camera in the device not only reads the LFA strip, but also any barcode, providing both images to the computer in the testing device 100. When a barcode is not present, the camera provides a visual feature to the computer. Such a visual feature may be the shape of the inserted cassette, text on the cassette, presence or absence of one or more barcodes, data matrices or QR codes, or one or more colors present on the cassette, for example. Where the cassette has a unique ID by having a barcode, data matrix, QR code, or an identifier on the cassette, the computer then associate the unique ID with the test results and upload the results to a central database where it is provided back to the patient and/or caregiver.

As the testing device 100 may be a headless device (one lacking a keyboard or screen for input and a screen or printer for output), a plurality of indicators on an LFA test result display, such as indication panel 117, is present on the front of the testing device 100 for indicating, for example, disinfecting in process 112, testing-in-process 114, negative results 116, invalid 118, or positive results 119 from the sample.

Testing device 100 also includes a patient identification reader for reading patient identification information, such as card reader 130 for reading an identification card from a patient to associate the patient with the received assay tube or cassette. In an exemplary embodiment of the invention, the card reader may be a smart card reader to read a government issued ID, such as a passport, national ID card, health card, or smart driver's license or it may read a credit card associated with the patient. Those skilled in the art will appreciate after reading this disclosure that other readers may also be used: for example, near field communication from a patient's device, such as her mobile phone, may be used to associate the patient with the sample or a magnetic strip may be read from a credit card lacking a smart chip. These variations are all contemplated to be used. The testing device 100 associates the test result with the patient as will be described with respect to FIGS. 13-15. No user input is needed beyond the identification card.

As stated previously, the testing device 100 may be in communication over, for example, Ethernet, WiFi, or mobile communications (such as 3G, 4G, and 5G, for example, to a central database. Test results, including standardized results, such as eCt, are linked to the patient at the testing device 100 and provided to the central database following a test. The test results may then be further shared with the patient's healthcare provider and/or directly to the patient. A rich database of information is developed in the central patient database, and following anonymization, may be mined for demographic or other information relating to the test being taken.

Linking the testing device 100 to a central server also provides an additional benefit, as new tests are developed that use LFA strips, new profiles for tests may be downloaded, either automatically or pushed manually, from a central test database to the testing device 100. Thus, there is no need for expensive field technicians to update the testing device 100. Such updates happen automatically. These profiles include not only testing information, but also equivalence curves used by testing device 100 to convert intensity measurements of the test line to an equivalent, standardized result.

Figure 2:
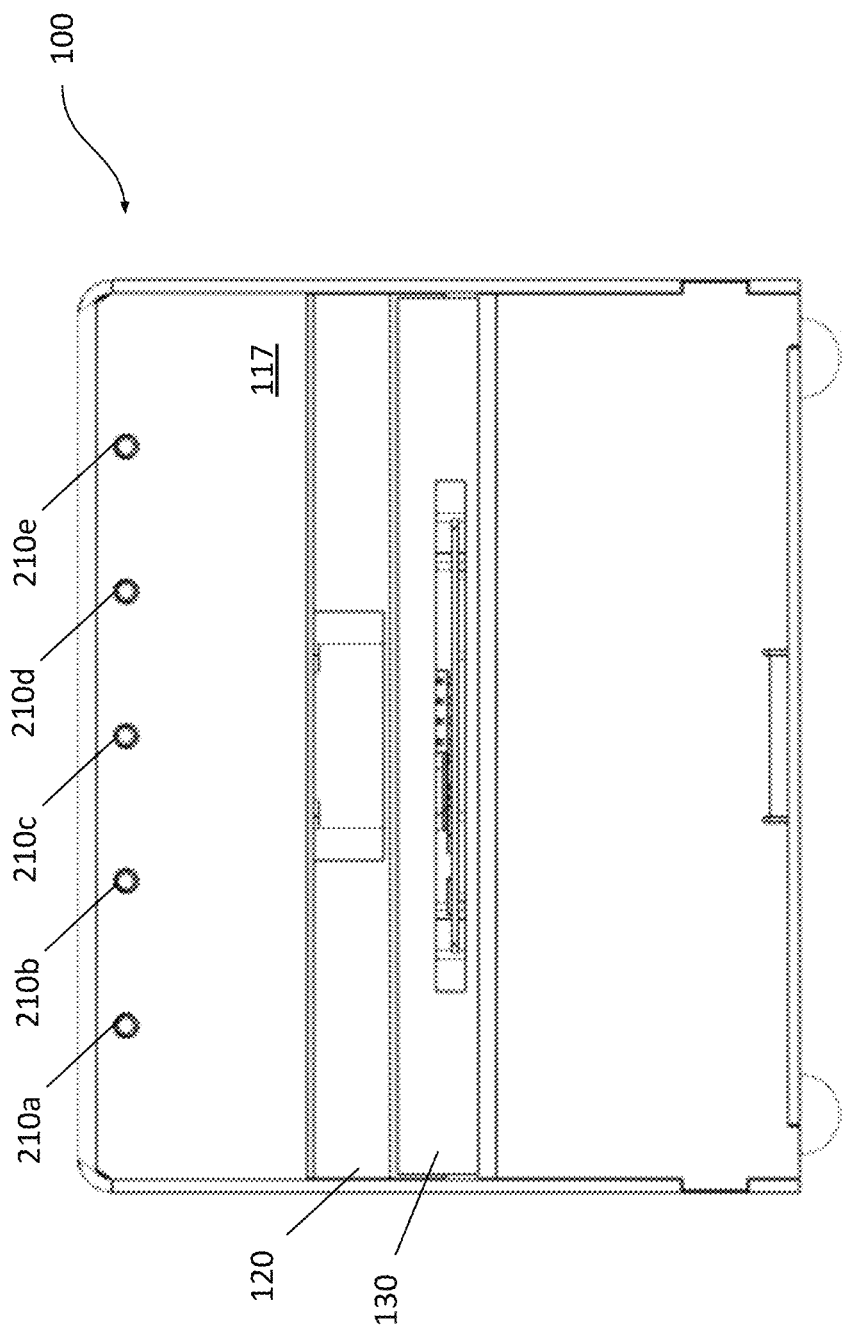
FIG. 2 depicts a front view of the testing device according to an embodiment of the present invention.

FIG. 2 depicts a front view of the testing device 100 according to an embodiment of the present invention. The front view again shows the removable carrier 120 for holding a cassette or assay tube and the card reader 130. In addition, five indicators, for example LEDs, provide test results to a patient who is using the test device 100. In an exemplary embodiment, a sterilization indicator 210a that shows when sterilization activity is occurring within testing device 100, connectivity indicator 210b, positive result indicator 210c, fault indicator 210d, and negative result indicator 210e may be provided. An additional power indicator with a power button 440 may be included to power the testing device 100 on and off.

Figure 3:
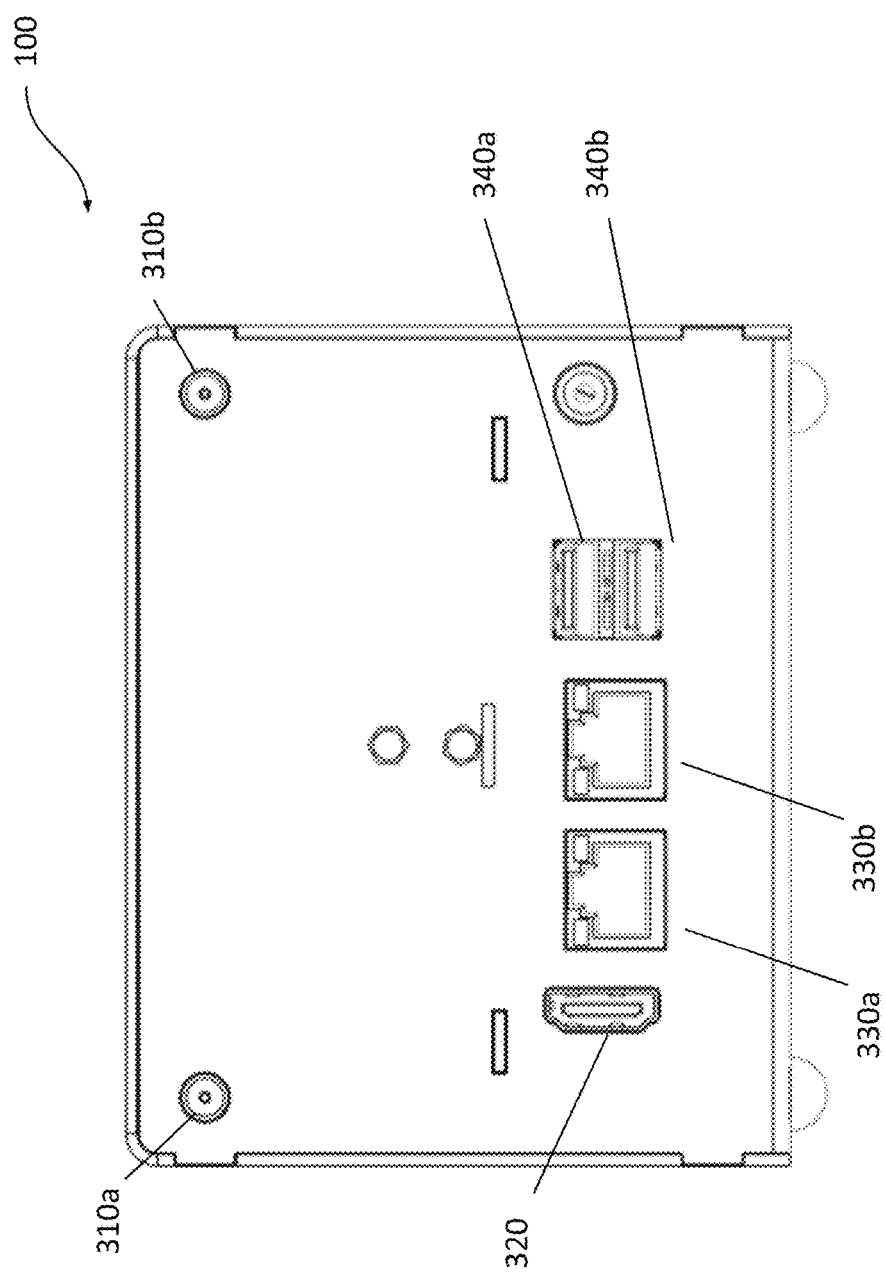
FIG. 3 depicts a back view of the testing device according to an embodiment of the present invention.

FIG. 3 depicts a back view of the testing device 100 according to an embodiment of the present invention. The back view of the testing device 100 shows various connectivity features present in an exemplary testing device 100. Testing device 100 may have a port for a display, such as HDMI port 320, Ethernet ports 330a and 330b, and USB ports 340a and 340b. Thus, while the testing device is primarily designed to be headless, if placed in a lab or a doctor's office the testing device also supports connection to a monitor and a keyboard. Results may then be shared with a healthcare professional on the display, and since the testing device 100 includes a full computer, it can support additional functions for the healthcare provider. Additionally, a sterilization interrupt button may be provided in communication with the processor of the testing device in order to trigger a sterilization process interrupt request.

Figure 4A:
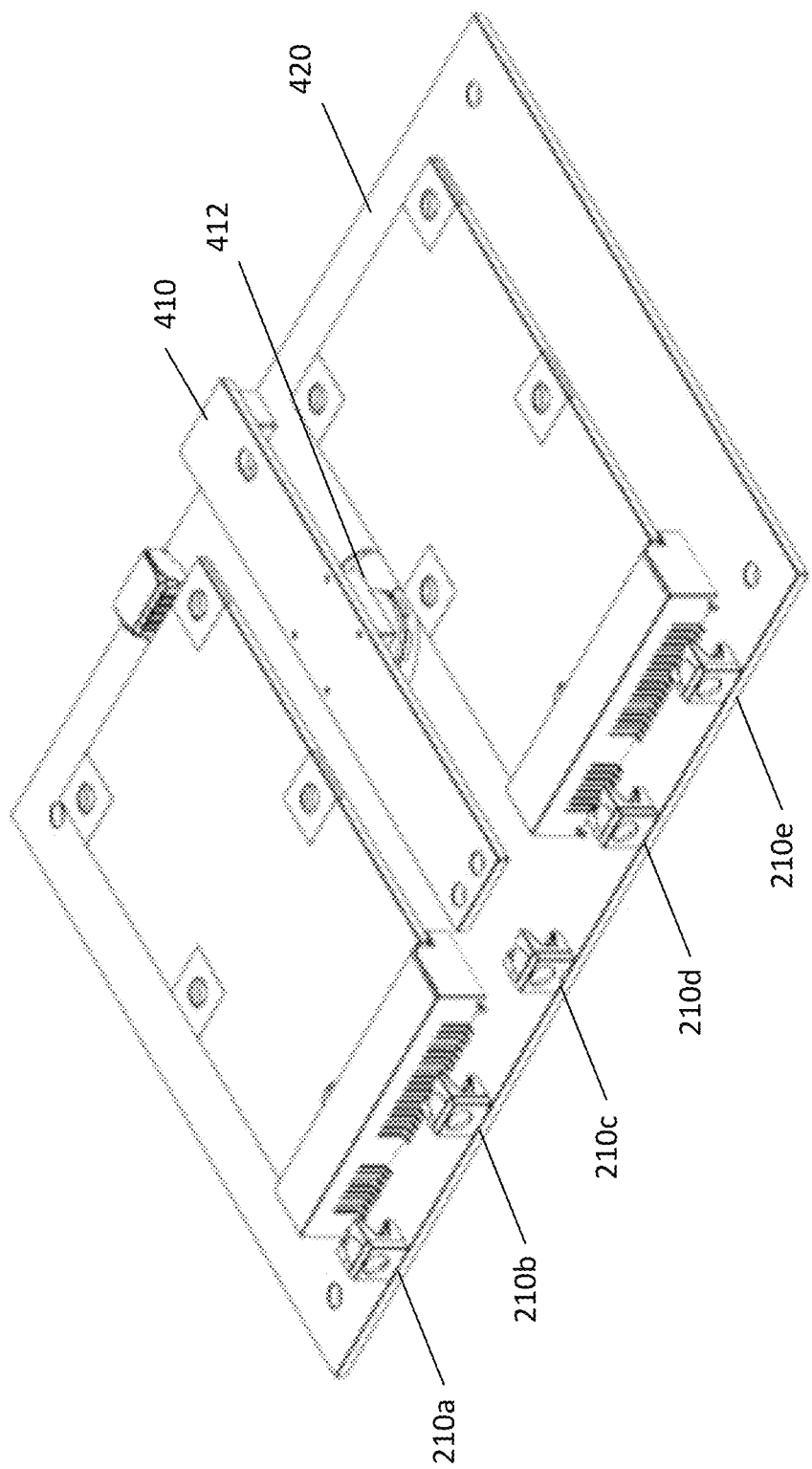
FIG. 4a depicts an orthogonal view of an LED testing and indicating board within the testing device according to an embodiment of the present invention.

FIG. 4a depicts an orthogonal view of an LED testing 410 board and indicating board 420 within the testing device 100 according to an embodiment of the present invention. The LED testing board 410 includes a plurality of LEDs (not shown) to provide a variety of wavelengths of light that shine upon the LFA strip. The LED testing board 410 may include one or more UVC light sources (not shown) to sterilize at least the portion of the testing device 100 that comes in contact with the sample. The LED testing board 410 includes a camera to take an image of a barcode present on an assay tube and of any LFA strips inserted into the testing device 100. These images are then communicated to the on-board computer within the testing device 100. The LED testing board 410 resides on the indicating board 420 that supports the indicators previously described. A hole in the indicating board 420 allows for a camera 412 on the LED testing board 410 to view the LFA strip. Camera 412 may be protected from damage that may be caused by UVC light sources by having a UV filter (not shown) placed in front of a lens of camera 412. The LED testing board also contains a temperature and a humidity sensor.

Figure 4B:
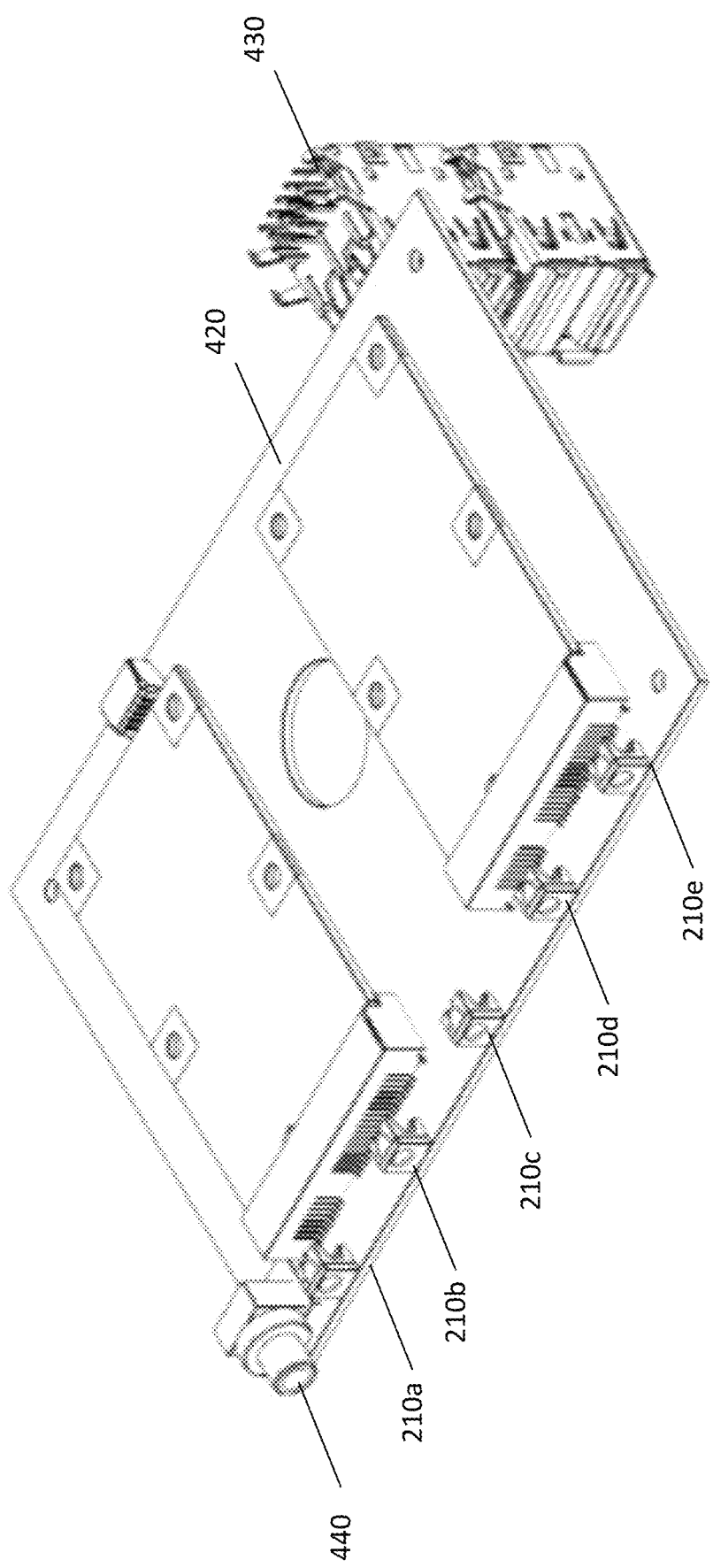
FIG. 4b depicts an orthogonal view of another embodiment of an indicating board within the testing device according to an embodiment of the present invention.

FIG. 4b depicts an orthogoncal view of another exemplary embodiment of the indicating board 420 within the testing device 100 according to an embodiment of the present invention. A power switch 440 may be provided on the indicating board 420 to power the testing device 100 on and off. A multi-port USB connector 430 may be provided that allows a carrier, such as sample carrier 120 to have electronic features that communicate with a host PC and its software. The positioning of the USB connectors relative to the sample carriers are aligned such that a PCB mounted within the sample carrier can use edge gold fingers in the same position as a typical USB connector, thus eliminating the need for an actual USB connector to be mounted on the PCB, and the USB connection between the PCB and the USB connector 430 is made when the sample carrier is inserted.

Figure 5A:
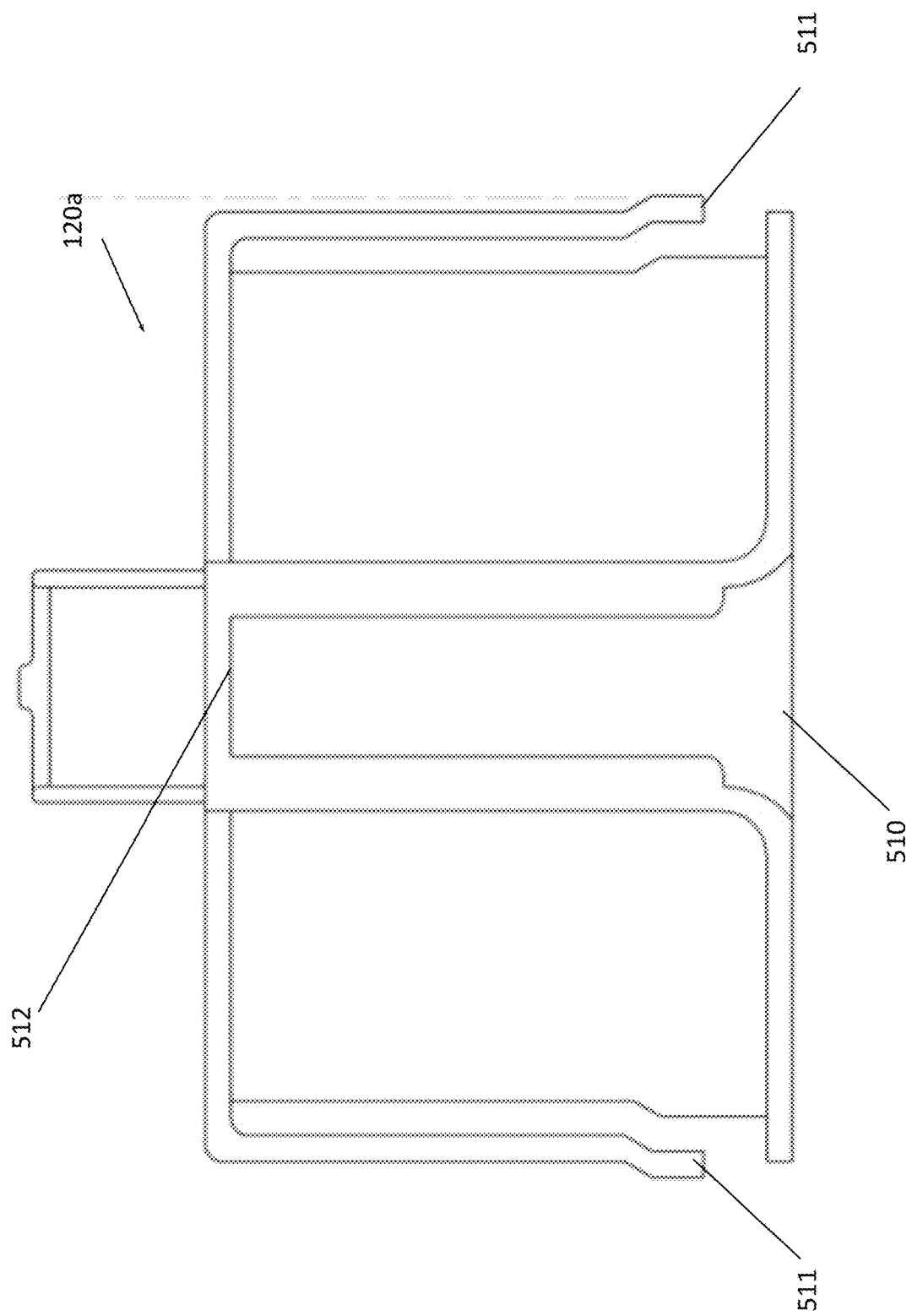
FIG. 5a depicts a top-down view of a first sample carrier used in the testing device according to an embodiment of the present invention.

FIG. 5a depicts a top-down view of a first sample carrier 120a used in the testing device according to an embodiment of the present invention. The sample carrier 120a having a carrier backstop 512 receives an assay tube or carriage containing an LFA strip in opening 510 and supports it while camera 412 takes an image of the LFA strip. It is removable in an exemplary embodiment, so that as testing carriages or assay tubes change in the future, it may be swapped out. The sample carrier may include an active USB controller coupled to a mechanical switch or photo-optical device for sensing the presence of the assay tube or carriage. There are features on the sides 511 to latch with the chassis as the sample carrier is installed in the chassis, and a structure that serves like a spring 512a in the rear both holding the carrier in place during shipping and providing tension.

FIG. 5b depicts a top-down view of a second sample carrier 120b used in the testing device according to an embodiment of the present invention. The sample carrier 120b receives an assay tube or carriage containing an LFA strip in opening 510 and supports it while camera 412 takes an image of the LFA strip. It is removable in an exemplary embodiment, so that as testing carriages or assay tubes change in the future, it may be swapped out. The sample carrier may include an active USB controller coupled to a mechanical switch or photo-optical device for sensing the presence of the assay tube or carriage. There are features on the sides 511 to latch with the chassis as the sample carrier is installed in the chassis, and a structure that serves like a spring 512*b* in the rear both holding the carrier in place during shipping and providing tension. Furthermore, a label 530 containing a sterilization code, such as a barcode or QR code, may be placed on either second sample carrier 120*b* or first sample carrier 120*a* which may trigger a sterilization function, such as activation of the UVC light sources, when read by camera 412.

Figure 5C:
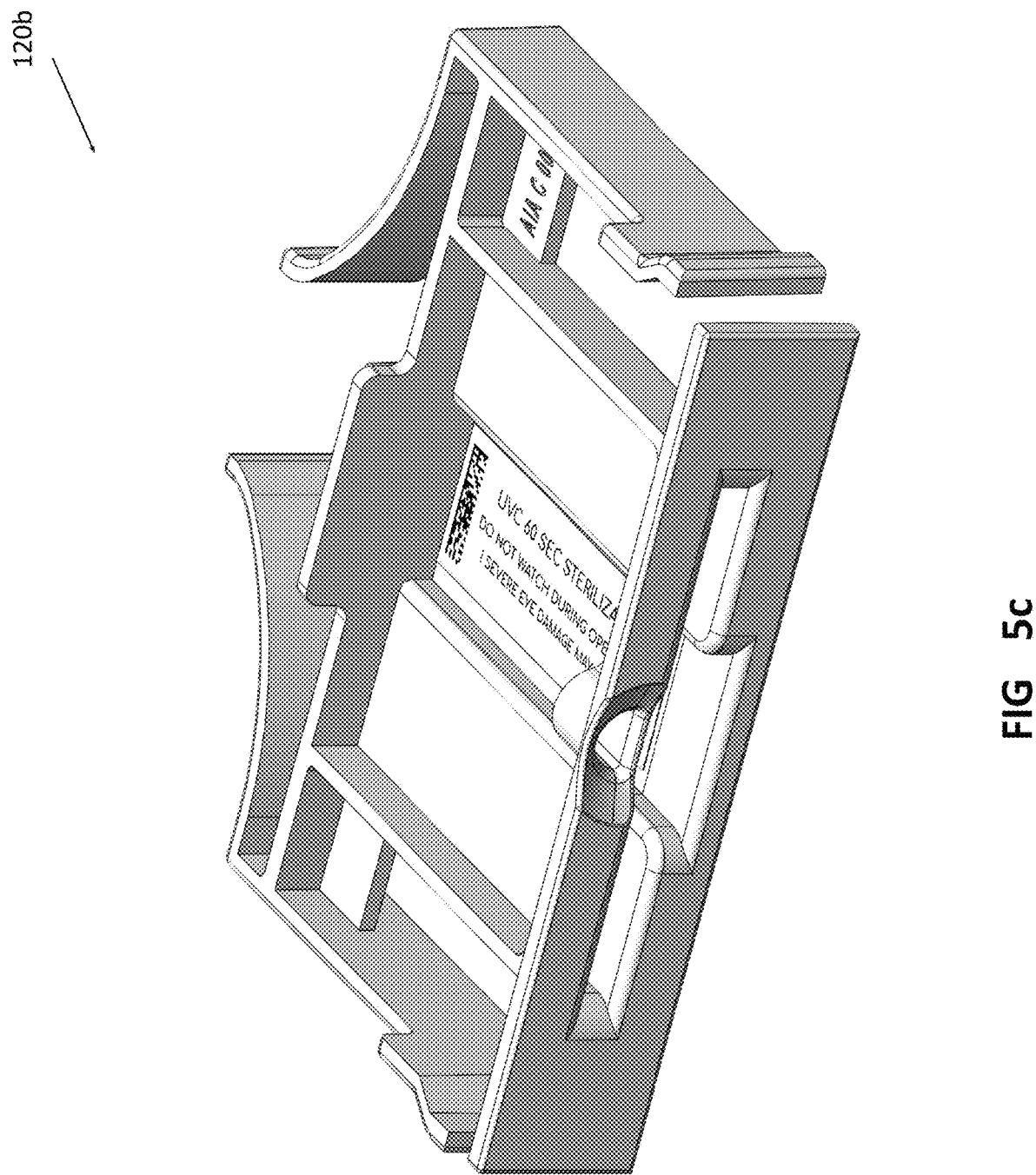
FIG. 5c depicts an orthogonal view of the second sample carrier used in the testing device which has a sterilization barcode sticker internal to the second sample carrier according to an embodiment of the present invention.
Figure 5D:
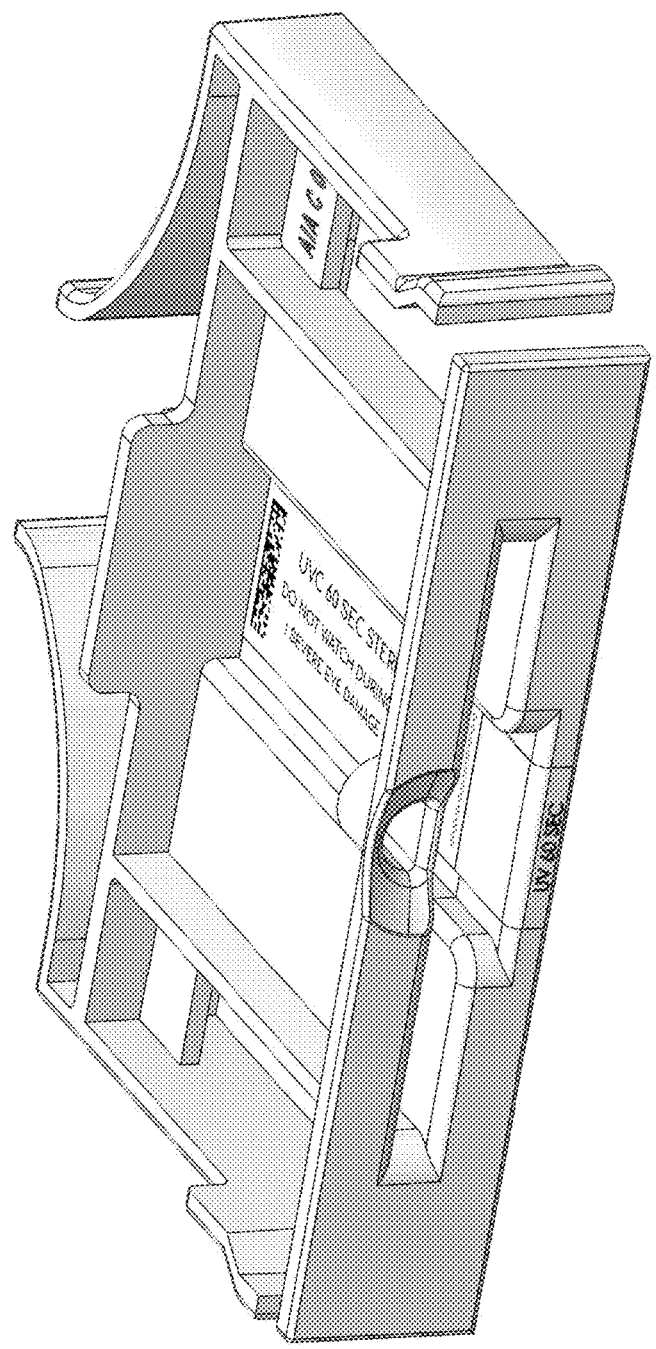
FIG. 5d depicts an orthogonal view of the second sample carrier used in the testing device which has a sterilization barcode sticker which is both internal and external to the second sample carrier according to an embodiment of the present invention.

FIG. 5*c* depicts an orthogonal view of the second sample carrier 120*b* used in the testing device which has a sterilization barcode sticker internal to the second sample carrier according to an embodiment of the present invention. FIG. 5*d* depicts an orthogonal view of the second sample carrier 120*b* used in the testing device which has a sterilization barcode sticker which is both internal and external to the second sample carrier according to an embodiment of the present invention.

Figure 6A:
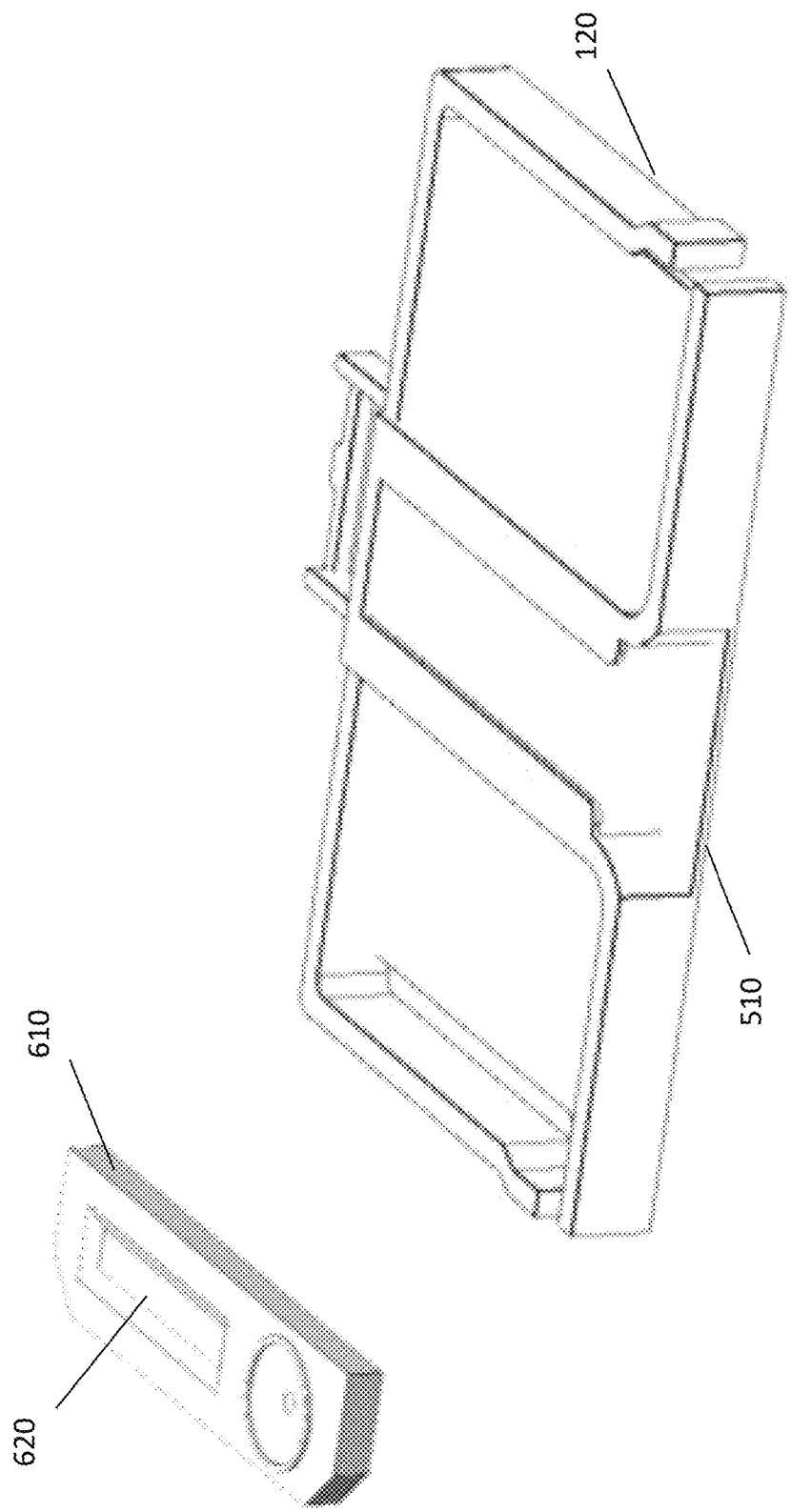
FIG. 6a depicts an orthogonal view of the sample carrier with a sample cassette used in the testing device according to an embodiment of the present invention.
Figure 6B:
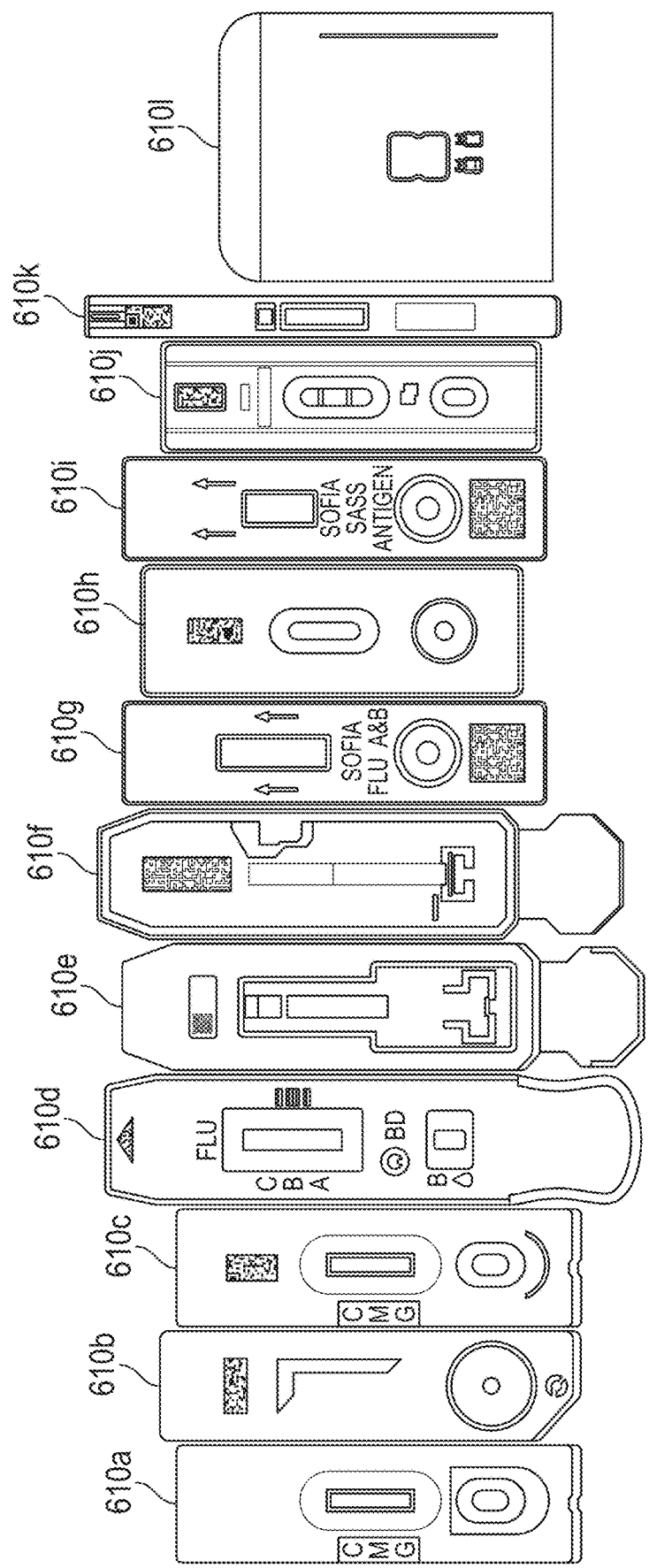
FIG. 6b depicts a plurality of cassettes that may be used in conjunction with the testing device according to an embodiment of the present invention.

FIG. 6*a* depicts an orthogonal view of the sample carrier 120*a* with a sample cassette 610 containing an LFA strip 620 used in the testing device 100 according to an embodiment of the present invention. FIG. 6*b* depicts a plurality of cassettes 610*a*-*l* that may be used in conjunction with the testing device 100. Cassette 610*k* is a clear assay and cassette 610*l* is a card containing an LFA test strip.

Figure 6C:
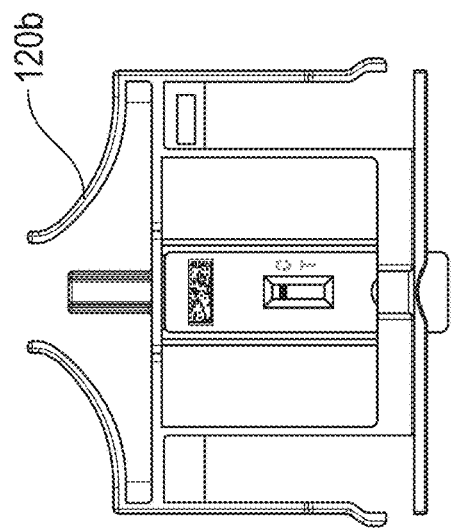
FIG. 6c depicts the cassette containing the lateral flow assay strip being inserted into the second carrier which contains a sterilization barcode sticker according to an embodiment of the present invention.
Figure 6C:
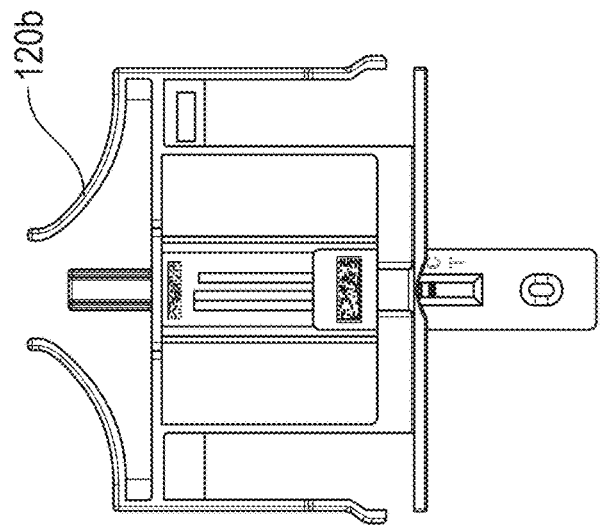
Figure 6C:
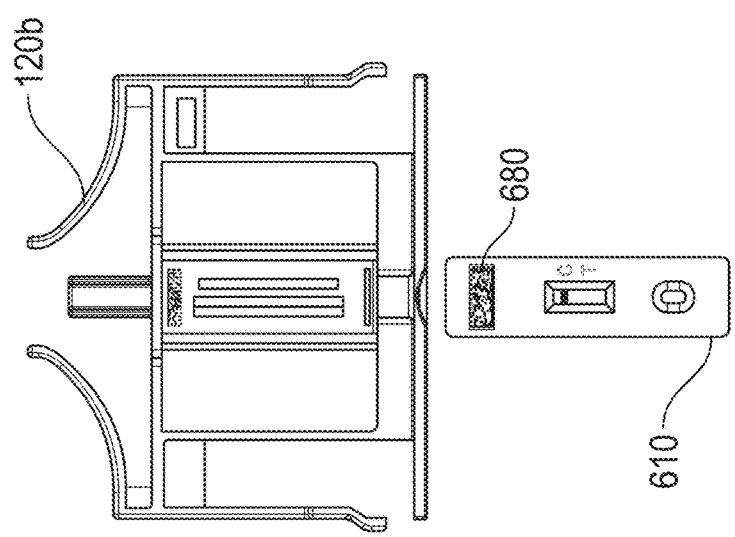

FIG. 6*c* depicts the cassette 610 containing the lateral flow assay strip 620 being inserted into the second carrier 120*b* which contains UVC code in the form of a physical sticker on the second carrier 120*b* or printed on the second carrier 120*b*, for example, according to an embodiment of the present invention. The UVC code may include a time duration for sterilization within the barcode, for example, the last few digits of the barcode may be sterilization time in seconds.

As the cassette 610 is inserted over time, as shown in this figure, a code 680 that identifies the cassette replaces the label 530 in the field of vision of camera 412, so that the testing device 100 will initiate a scan of the lateral flow assay strip to provide a test result.

Figure 6D:
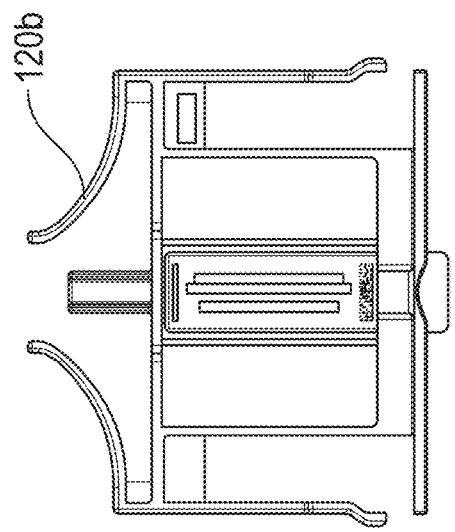
FIG. 6d depicts a sterilization cassette having a sterilization code being inserted into the second carrier where the second carrier lacks a sterilization barcode sticker according to an embodiment of the present invention.
Figure 6D:
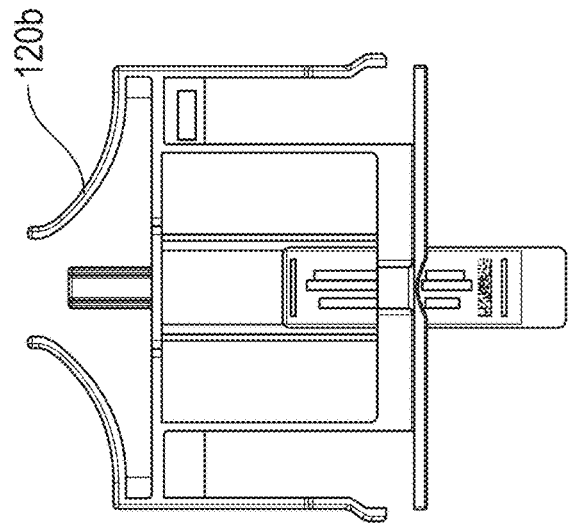
Figure 6D:
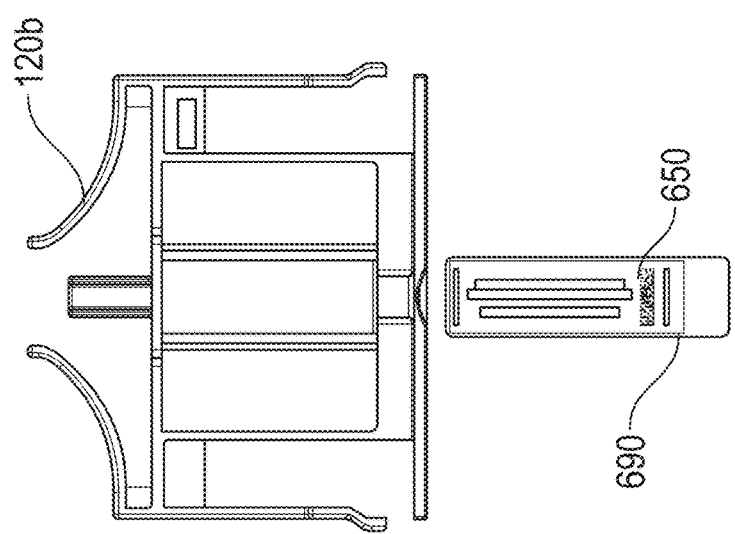

FIG. 6*d* depicts a sterilization cassette 690 having a UVC code 650, as described above, being inserted into the second carrier 120*b* where the second carrier 120*b* lacks a UVC code according to an embodiment of the present invention. Inserting the sterilization cassette 690 triggers a sterilization process, i.e., activation of the UVC light source, when the UVC code is read by camera 412.

Figure 6E:
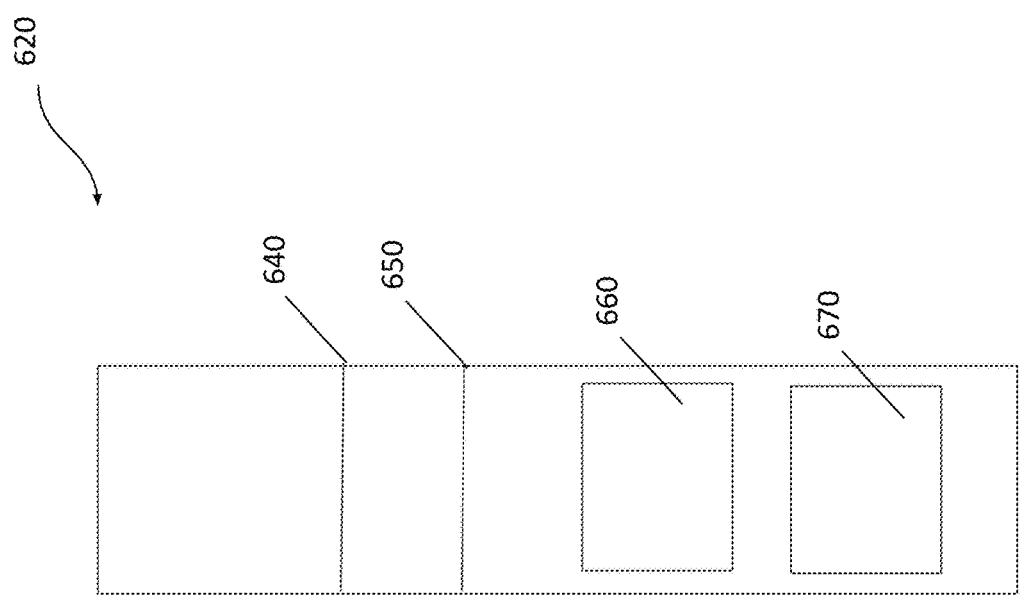
FIG. 6e depicts the LFA strip within the cassette according to an embodiment of the present invention.

FIG. 6*e* depicts the LFA strip 620 within the cassette 610 according to an embodiment of the present invention. The LFA strip 620 has at least one control line 640, test line 650, conjugate pad 660, and analyte pad 670. An analyte containing a sample from a domain is placed on the analyte pad 670. The analyte flows up the LFA strip 620 through the area of the strip having the conjugate pad 660, test line 650, and control line 640. Testing systems may be used in multiple domains. The domain, mentioned above, is the human domain, but testing is also performed in other domains, such as animals and the environment, for example. Reference to a domain herein is reference to any situation, for example, human testing, animal testing, environmental testing, and food testing.

The material of the test line 650 provides a positive result in the presence of a chemical-of-interest being tested for in the domain and a negative result in the absence of the chemical-of-interest being tested for in the domain. Where the chemical-of-interest can be a pathogen, or a piece of a pathogen, a biological marker, such as a protein of a chemical organic or inorganic, and where the biological marker can specifically be a substance such as the active ingredient in a drug, food additive, or environmental pollutant. The intensity of the test line 650 is measured by testing device 100 in order to be used with the equivalence curve to determine an equivalent, standardized result, such as an eCt value.

Figure 7A:
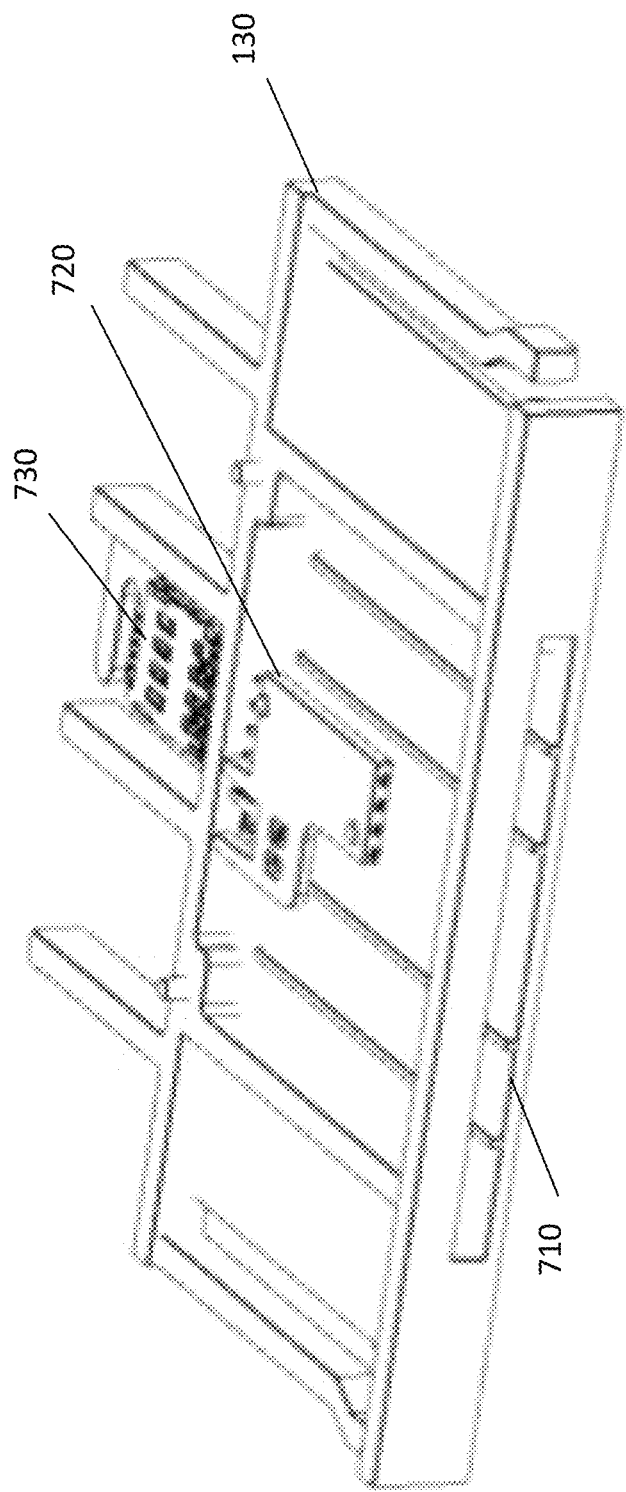
FIG. 7a depicts an orthogonal view of a card reader used in the testing device according to an embodiment of the present invention.

FIG. 7*a* depicts an orthogonal view of a removable card reader 130 used in the testing device 100 according to an embodiment of the present invention. As previously discussed, the card reader 130 receives a smart card, such as a credit card or national ID card, reads it with smart reader 720 and provides the read information to the computer within the testing device 100. In alternative embodiments, the removable card reader 130 can read magnetic strips on credit cards or use near field communication to read identifying information from a patient's mobile phone or tablet. Identity collection accessories include the removable card reader 130 and the external reader.

Removable card reader 130 may have a secondary smart card reader 740 for inserting a smart card from a health care provider, such as a medical professional. For example in Taiwan doctors' offices have smart card readers where patients can insert their cards, but the reader also requires a second smart card to be inserted by the doctor with their credentials for added security. The health care provider's smart card would be inserted into a second card or smart card slot 730 before the removable card reader 130 is inserted into the testing device 100.

Figure 7B:
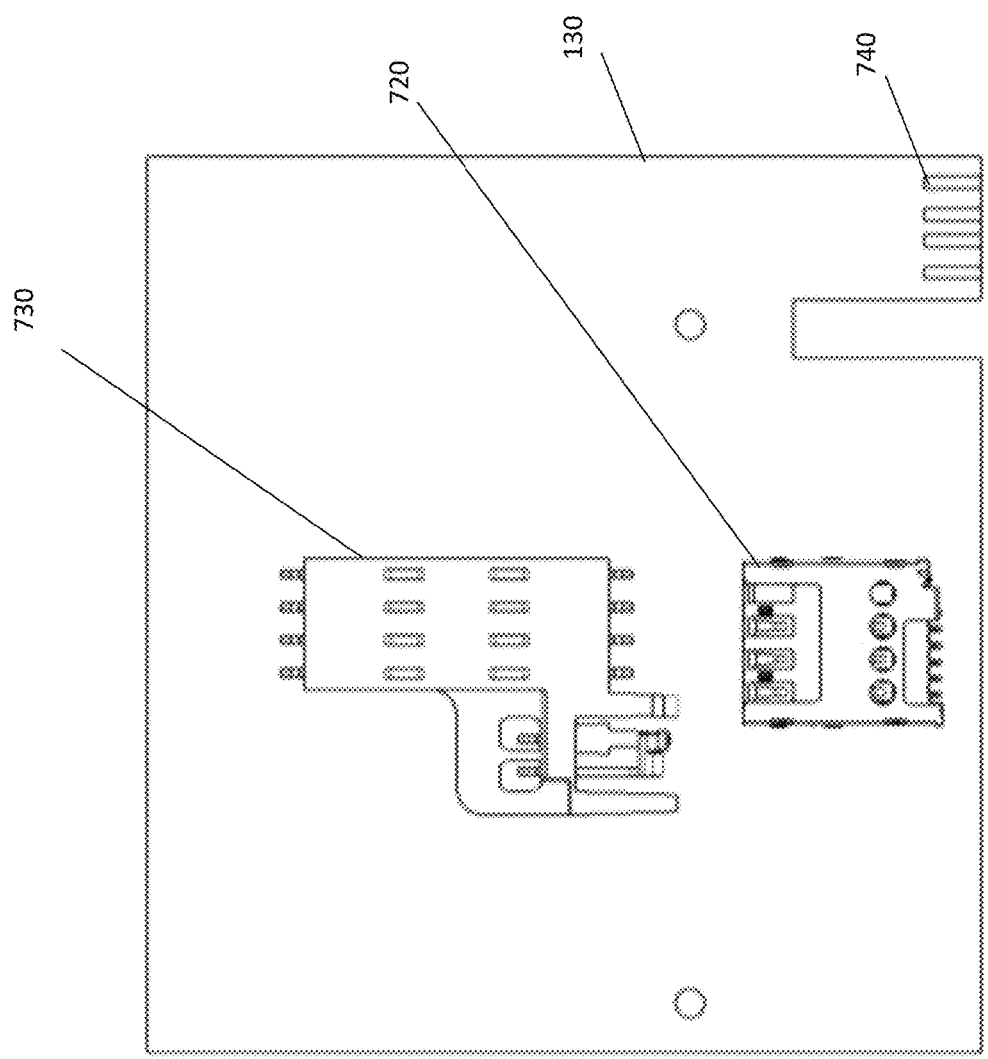
FIG. 7b depicts a top view of the card reader used in the testing device according to an embodiment of the present invention.

The removable card reader 130 may be plugged into the USB connector 340 or other interface without having to physically mate a printed circuit board in the removable card reader 130 with a computer 800 (discussed with respect to FIG. 8 below). The removable card reader 130 may also be configured to receive the smart card upside down. This configuration would place the smart card reader 740 facing up on a floor of the removable card reader 130 and include a camera above the removable card reader 130 to read and communicate a signature from the smart card to the computer 800. FIG. 7*b* depicts a top view of the card reader used in the testing device according to an embodiment of the present invention.

In an alternative embodiment of the invention, instead of a card reader being separated from the sample carrier, the card reader and sample carrier are in the same reception tray, such that an identification card (such as a driver's license) and assay tube or carriage are inserted side-by-side. In this embodiment, two cameras above the reception tray may be used, where a first camera reads the assay tube or carriage and a second camera reads the identification card visually, such as by PDF-417. PDF417 is a stacked linear barcode format used in a variety of applications such as transport, identification cards, and inventory management. "PDF" stands for Portable Data File. The "417" signifies that each pattern in the code consists of 4 bars and spaces in a pattern that is 17 units (modules) long.

Figure 8:
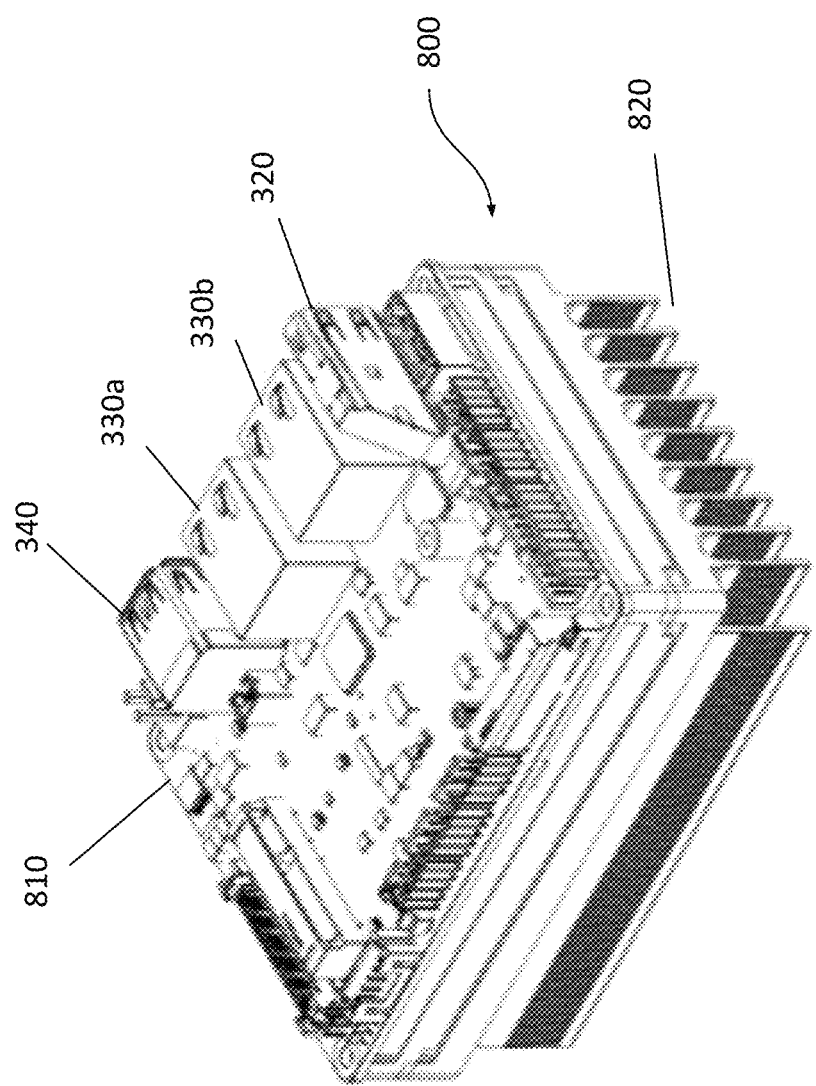
FIG. 8 depicts an orthogonal view of a computer used in the testing device according to an embodiment of the present invention.

FIG. 8 depicts an orthogonal view of a computer 800 used in the testing device 100 according to an embodiment of the present invention. The computer 800 will be described in more detail in FIG. 9, but includes a PC board or Motherboard 810, along with a heat sink 820. In an exemplary embodiment, the computer 800 resides in the bottom of the testing device 100 and is physically separated from the sample carrier 120. The computer hosts the ports 320, 330, and 340 previously discussed.

Figure 9:
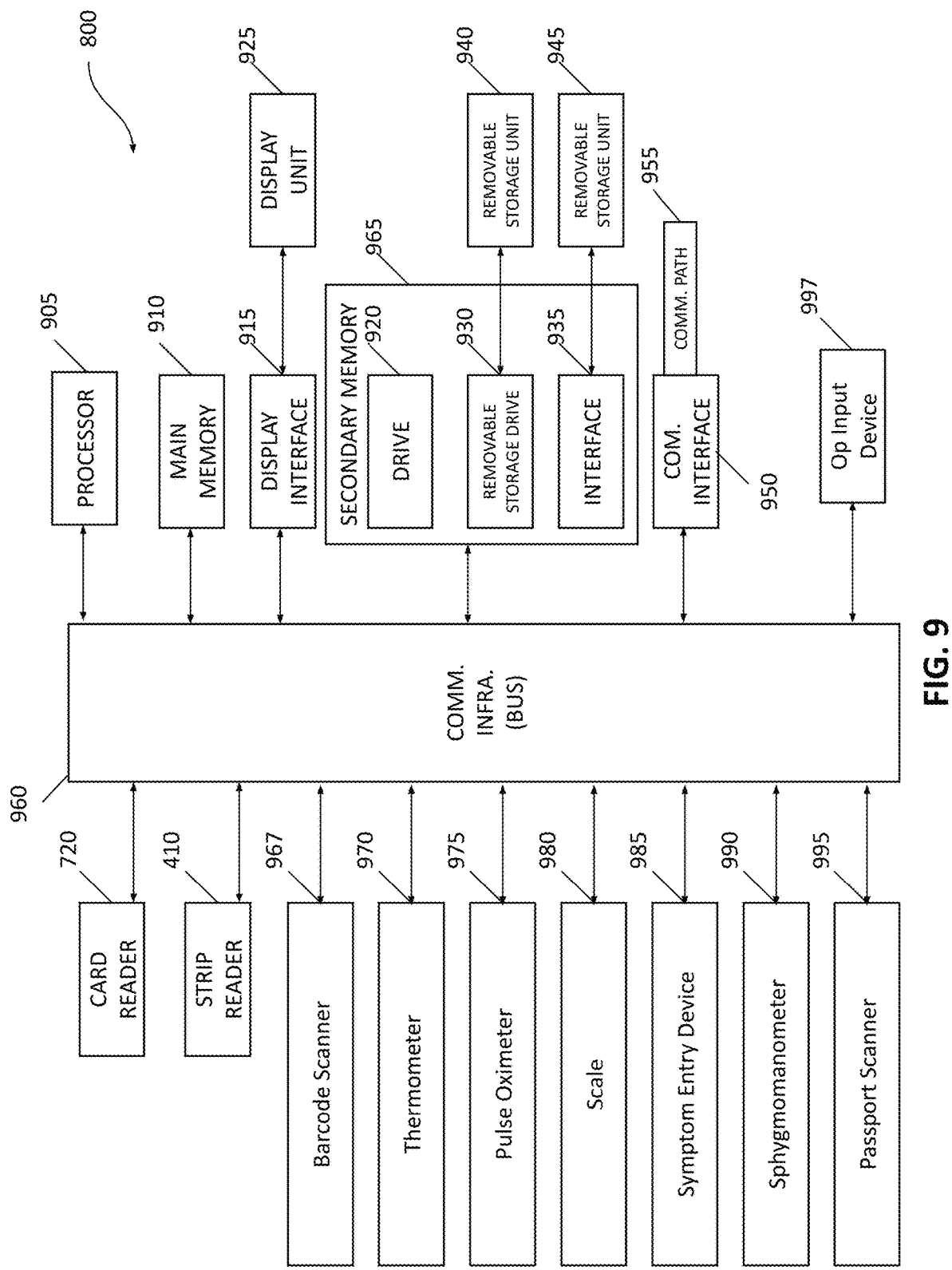
FIG. 9 depicts a block diagram of the computer used in the testing device according to an embodiment of the present invention.
Figure 12:
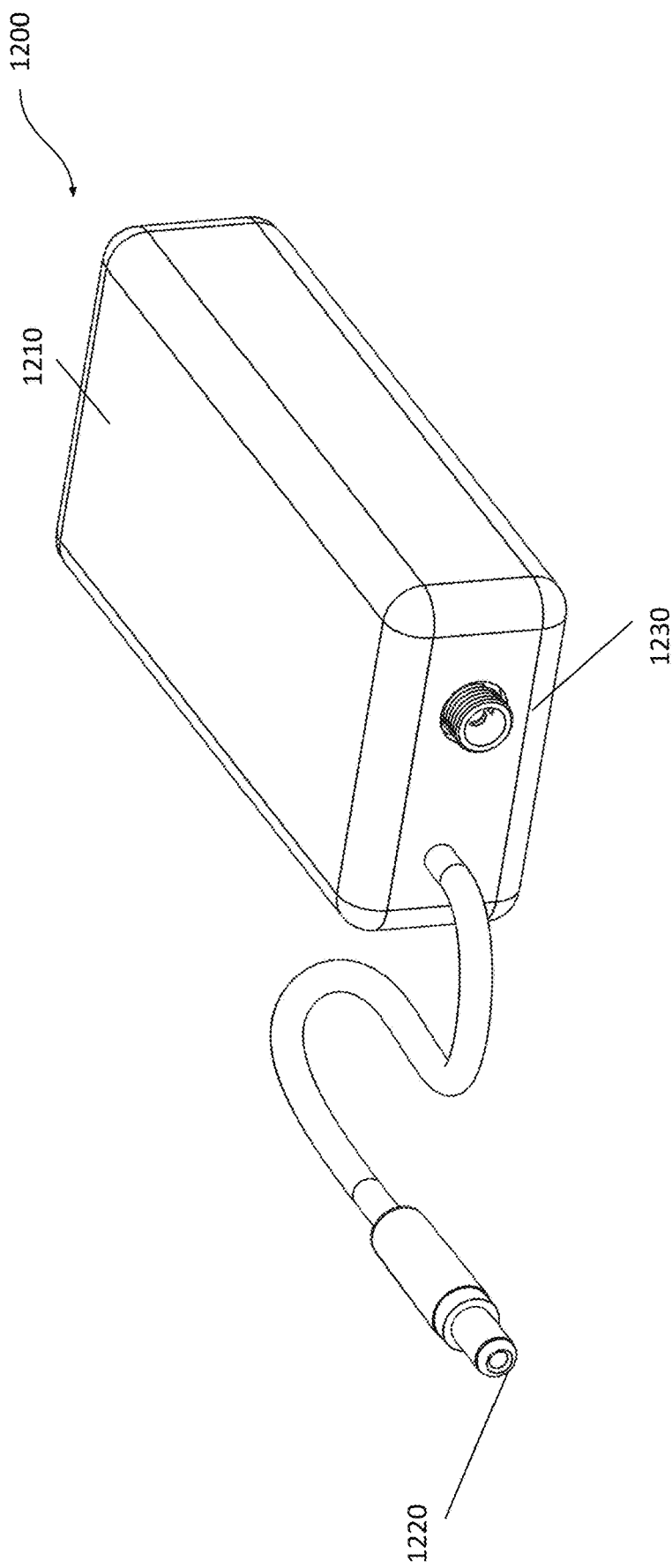
FIG. 12 depicts an orthogonal view of a battery pack for the testing device according to an embodiment of the present invention.

FIG. 9 depicts a block diagram of the computer 800 used in the testing device according to an embodiment of the present invention. FIG. 9 depicts a high-level block diagram computer system 800, which can be used to implement one or more aspects of the present invention. More specifically, computer system 800 can be used to implement some hardware components of embodiments of the present invention. Although one exemplary computer system 800 is shown, those skilled in the art after reading this disclosure will understand that other implementations are also possible. Computer system 800 includes a communication path 955, which connects computer system 800 to additional systems (not depicted) and can include one or more wide area networks (WANs) and/or local area networks (LANs) such as the Internet, intranet(s), and/or wireless communication network(s). In one exemplary embodiment, communication path 955 includes wireless local area network communication, mobile or cellular wireless communication, and wired (such as Ethernet) communication. Computer system 800 is in communication via communication path 955, e.g., to communicate data between them. The computer system 800 may also contain an optional internal battery and battery charger that allows the unit to be charged. Alternatively, an external battery with a power cord connected to the unit may be used, where the external battery unit features the same input connector as the computer system, and the external battery unit may then be installed in the field to provide robustness against power outages or to be used in the field where wall power is not available. An example of such a device is shown in FIG. 12.

Computer system 800 includes one or more processors, such as processor 905. Processor 905 is connected to a communication infrastructure 960 (e.g., a communications bus, cross-over bar, or network). Computer system 900 can include a display interface 915 that forwards graphics, text, and other data from communication infrastructure 960 and receives touch input (or from a frame buffer not shown) for display on a display unit 925, acting as an LFA test result display, which may include a touchscreen for receiving input from a user. Display unit 925 will be discussed in more detail with respect to FIGS. 17-24. In a headless device, such as testing device 100, no display unit is present 925, although one may be added by connecting to HDMI port 320. Computer system 900 also includes a main memory 910, preferably random access memory (RAM), and can also include a secondary memory 965. Secondary memory 965 can include, for example, a hard disk or solid-state drive 920 and/or a removable storage drive 930, representing, for example, a floppy disk drive, a magnetic tape drive, or an optical disk drive. Removable storage drive 930 reads from and/or writes to a removable storage unit 940 in a manner well known to those having ordinary skill in the art. Removable storage unit 940 represents, for example, a floppy disk, a compact disc, a magnetic tape, solid state, or an optical disk, etc. which is read by and written to by removable storage drive 930. As will be appreciated, removable storage unit 940 includes a computer readable medium having stored therein computer software and/or data.

A barcode scanner 967 coupled to the processor 905 via communication infrastructure 960 provides the ability to read, for example, QR codes and provide the read information to testing device 100. Through the barcode scanner 967, a QR code that uniquely identifies one or more of a testing service, testing location, and operator identification is provided to the testing device 100. Those skilled in the art will appreciate that codes other than QR codes can be used, such as bar codes and data matrices. These codes may be read from printed material or off of a monitor or display, such as a patient's mobile device.

A body temperature thermometer 970 coupled to the processor 905 via communication infrastructure 960 provides patient body temperature to the testing device 100. A pulse oximeter 975 coupled to the processor 905 via communication infrastructure 960 provides pulse, blood oxygen saturation, respiration rate to the testing device 100. A scale 980 coupled to the processor 905 via communication infrastructure 960 provides patient weight to the testing device 100. The scale 980 may be embedded within or below a chair or gurney in which the patient rests to provide patient weight. A sphygmomanometer 990 coupled to the processor 905 via communication infrastructure 960 provides blood pressure to the testing device 100. A passport scanner 995 is coupled to the processor 905 via communication infrastructure 960. The passport scanner 995 may be used to read optical or near field communication information from patient identification, such as a passport.

A symptom entry device 985 is coupled to the processor 905 via communication infrastructure 960. The symptom entry device 985 can be a touch panel, for example, that has buttons that can be depressed by a patient or by a doctor, nurse, or technician where each button represents a patient symptom. To avoid language dependency, the buttons may have icons representing the symptoms in place of words, although words can also be used. In place of a dedicated touchpad, a tablet type computer or any other type of computer or keypad or keyboard can be used to enter patient symptoms.

An operator input device 997 receives input from an operator to the processor 905 via communication infrastructure 960. The operator input device 997 may be in the form of a keypad, touchpad, or panel that receives input from an operator. For example, in one embodiment of the invention, the operator input device 997 is in the form of a keypad with a plurality of keys, each of which may be associated with, for example, a test result, such as positive, negative, or invalid, observed and determined by the operator. In an alternative embodiment of the invention, a touch enabled display unit 925 can serve as an operator input device.

In alternative embodiments, secondary memory 965 can include other similar means for allowing computer programs or other instructions to be loaded into the computer system. Such means can include, for example, a removable storage unit 945 and an interface 935. Examples of such means can include a program package and package interface (such as that found in video game devices), a removable memory chip (such as an EPROM, or PROM) and associated socket, and other removable storage units 945 and interfaces 935 which allow software and data to be transferred from the removable storage unit 945 to computer system 800.

Computer system 800 can also include a communications interface 950. Communications interface 950 allows software and data to be transferred between the computer system and external devices. Examples of communications interface 950 can include a mobile modem using, for example, 3G, 4G/LTE, 5G, and future mobile standard networks, a network interface (such as an Ethernet card), a communications port, or a PCI, Mini PCI, or PCIe slot and card, for example. Software and data transferred via communications interface 950 are in the form of signals which can be, for example, electronic, electromagnetic, optical, or other signals capable of being received by communications interface 950. These signals are provided to communications interface 950 via communication path (i.e., channel) 935. Communication path 935 carries signals and can be implemented using wire or cable, fiber optics, a phone line, a cellular or mobile phone link, an RF link, and/or other communications channels.

In the present description, the terms "computer program medium," "computer usable medium," and "computer readable medium" are used to generally refer to media such as main memory 910 and secondary memory 965, removable storage drive 930, and a hard disk installed in hard disk drive 920. It may also refer to flash storage options, such as USB thumb drives or SD cards. Computer programs (also called computer control logic) are stored in main memory 910 and/or secondary memory 965. Computer programs can also be received via communications interface 950. Such computer programs, when run, enable the computer system to perform the features of the present invention as discussed herein. In particular, the computer programs, when run, enable processor 905 to perform the features of the computer system. Accordingly, such computer programs represent controllers of the computer system.

Computer System 960 also communicates with card reader 720 for reading identification or credit/debit card information from a user or patient and a strip reader 410 for optically reading the results on a test strip.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
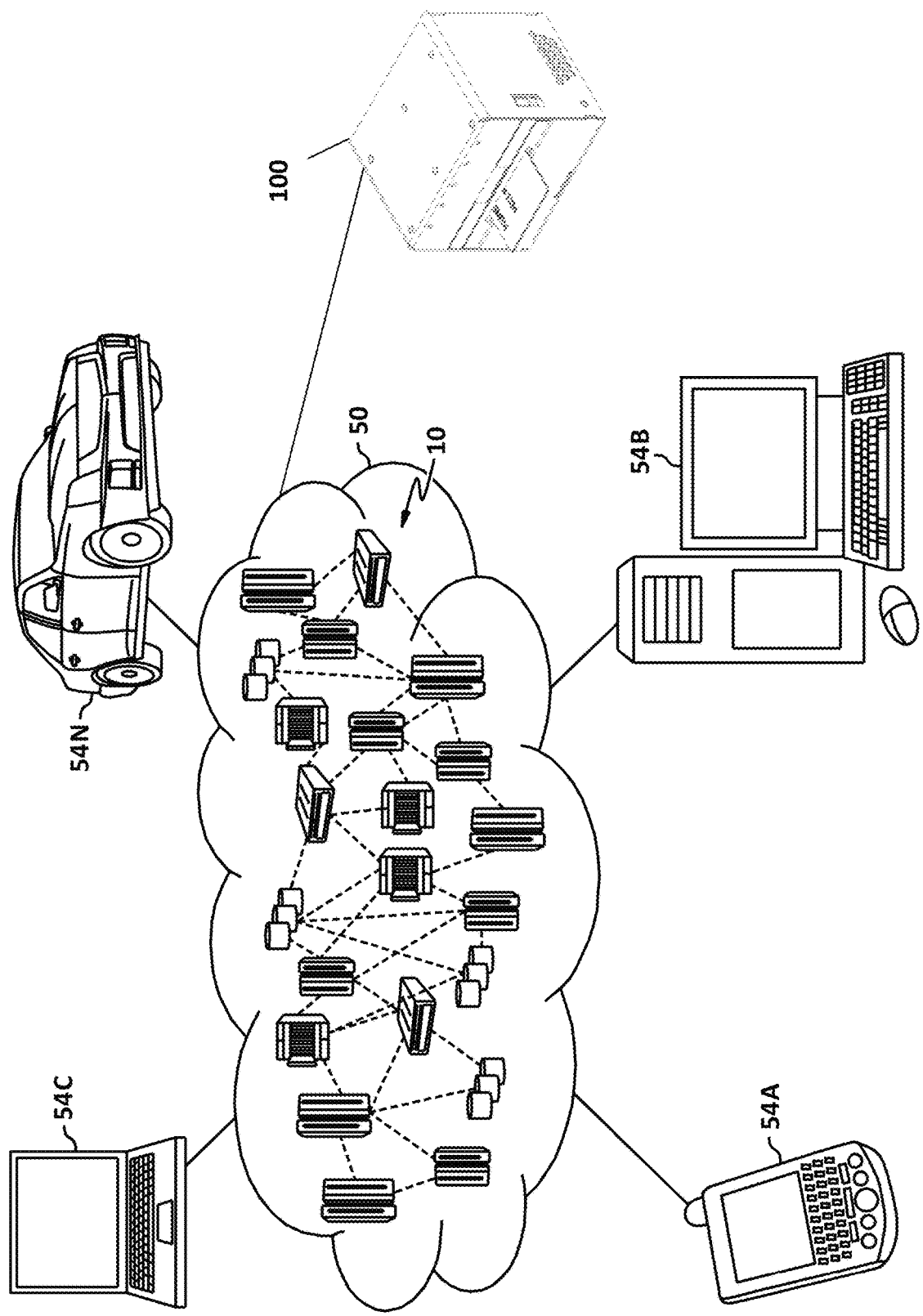
FIG. 10 depicts an environment for using a system in accordance with an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, testing device 100 and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N and 100 shown in FIG. 1 are intended to be illustrative only and that computing nodes 10 and cloud computing environment 50 can communicate with any type of computerized device over any type of network and/or network addressable connection (e.g., using a web browser).

Figure 11:
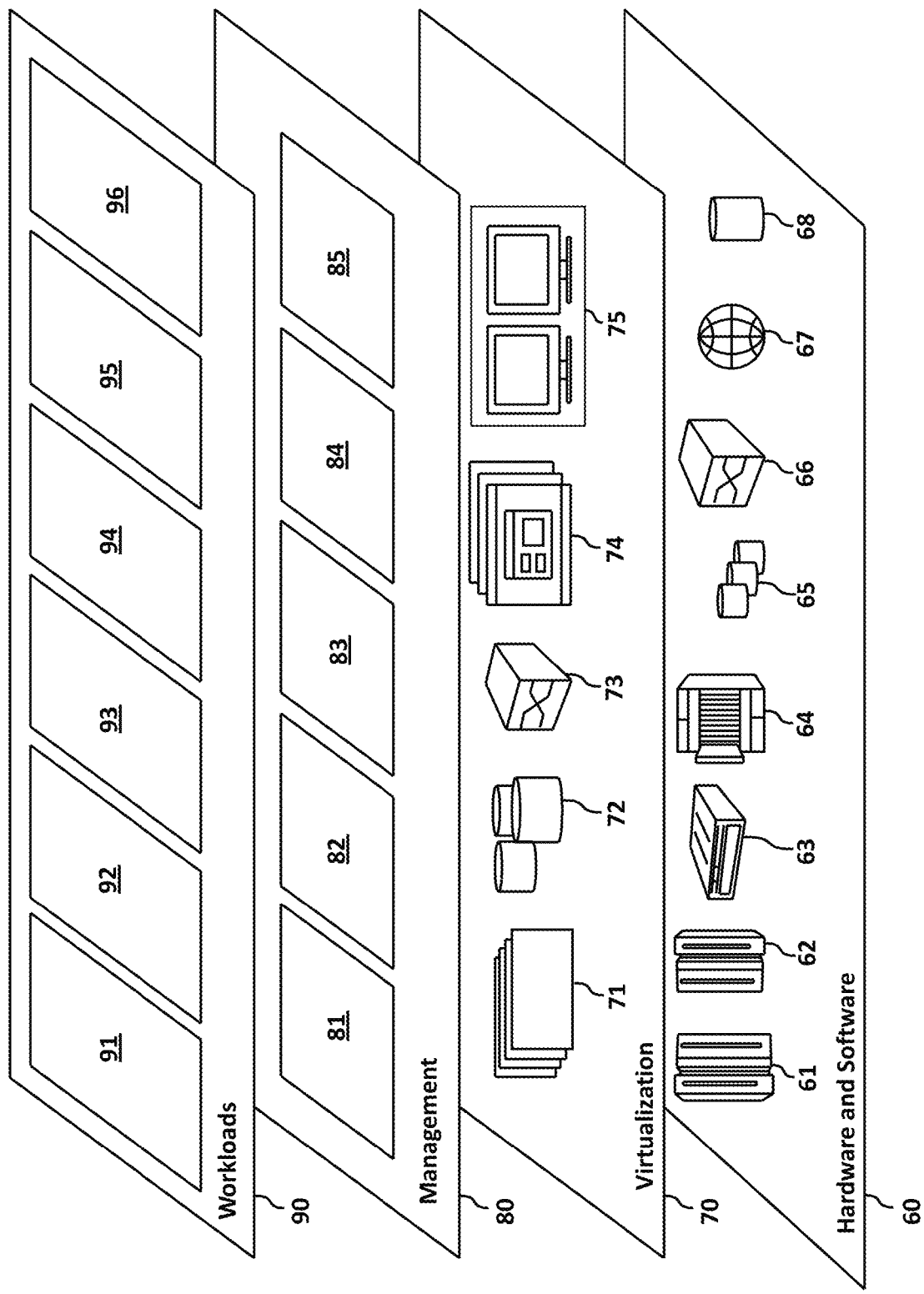
FIG. 11 depicts a high-level block diagram computer system, which can be used to implement one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65 storing test databases and results databases; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: data mining of test databases and results databases 91; software development and lifecycle management 92; machine learning of test strip analysis 93; headless testing device communications and control 94; computer (non-headless) communication and control 95; and testing analysis 96.

FIG. 12 depicts an orthogonal view of a battery pack 1200 for the testing device 100 according to an embodiment of the present invention. Battery pack 1200 includes an encased battery 1210 having a power input port 1230 for accepting a DC power supply and an output port 1220 for plugging in to a power input port of the testing device 100. By using battery pack 1200, testing device 100 may be used without needing an AC power source present.

Two threads that operate in parallel are described next. The first thread, discussed with respect to FIG. 13a generally describes the method of reading an LFA strip in a cassette, while the thread discussed with respect to FIG. 13b describes the method of receiving context and patient information regarding the testing site and operator.

Figure 13A:
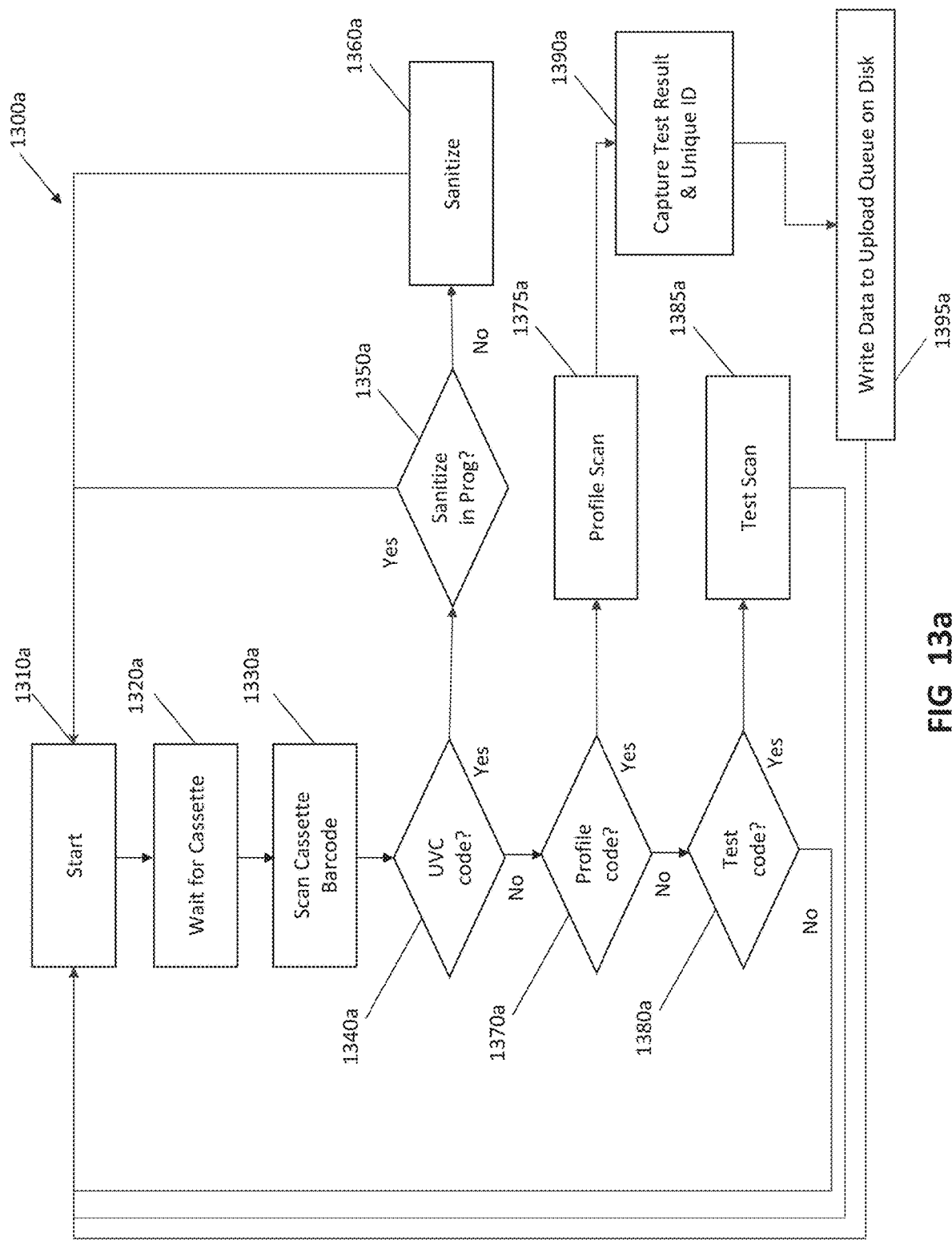
FIG. 13a depicts a flowchart of a method for reading a test strip and sterilization process in a clear assay or sample carrier and providing a result in accordance with an embodiment of the present invention.

FIG. 13a depicts a flowchart 1300a of a method for reading a test strip and sterilization process in a clear assay or sample cassette and providing a result in accordance with an embodiment of the present invention. The method starts (block 1310a) and waits for the detection of a clear assay, cassette, or card (block 1320a). The method uses an imaging source, such as, for example, a camera, data file or files, xerography device, video feed, data stream, or other source of image information, to detect visual features, such a visual feature may be the shape of the inserted cassette, text on the cassette, presence or absence of one or more barcodes, data matrices or QR codes, or one or more colors present on the cassette, for example. In an alternative embodiment, the method may use a mechanical switch to detect the presence of a clear assay, cassette, or card. If there is no clear assay, cassette, or card, the method waits in a loop that may be, for example, 1 second long, until the detection of the clear assay, cassette, or card.

The method scans a visual feature off of the clear assay, cassette, or card to identify a test that is being conducted and optionally a patient (block 1330a). Any reference to cassette herein also incorporates the use of a clear assay. Embodiments of the invention may use a visual feature, such as text, a shape of the cassette, or identifiers of the cassette to determine the test being conducted. A visual feature may also be a barcode, QR code, or data matrix. For example, a COVID test may be being performed, but other tests as previously described, such as a seasonal flu test may be being performed. The method uses the visual feature to determine the test being conducted regardless of the alignment of the cassette with respect to the carrier. Alignment may include orientation of the cassette. In other words, regardless of orientation or alignment of the cassette, see, for example, the skewed cassette illustrated in FIG. 17g, the visual feature is analyzed to determine the test being conducted.

In the case of a data matrix as the visual feature, information within the data matrix identifies a unique cassette identifier, a manufacturer code definition, supplier code definition, a profile code that together determine a test configuration profile to be used for this test. For other visual features, such as QR code, barcode, text, a shape of the cassette, identifiers of the cassette, or combinations thereof, in determining the test being conducted, the visual feature may initially be used to identify the test vendor. Once the test vendor is identified, if necessary, the specific test from that vendor is determined. Following identification of the vendor and specific test, the test configuration profile is determined.

The method checks to determine if the visual feature present in the view of the imaging device is a UVC code (block 1340a). If so, a check is made to see if a sanitization process is already in progress or has completed within a predetermined time frame, for example, five minutes (block 1350a). If not, sanitization begins by, for example, turning on a UVC light source for a predetermined period of time, for example, 30 seconds. In an alternative embodiment, ionizing radiation may be used to perform the sterilization. In an alternative embodiment rather than sanitizing for a predetermined period of time upon reading a UVC code, the UVC code of the visual feature specifies the predetermined period of time to sanitize, for example, 30 seconds. Movement in the field of vision of the imaging device may halt sterilization and trigger an alert. Successful or failed sanitization results may be uploaded to a central database. After initiating sanitization, the method returns to block 1310a. Furthermore, if sanitization is occurring or has recently occurred (block 1350a), the method returns to block 1310a.

Figure 13B:
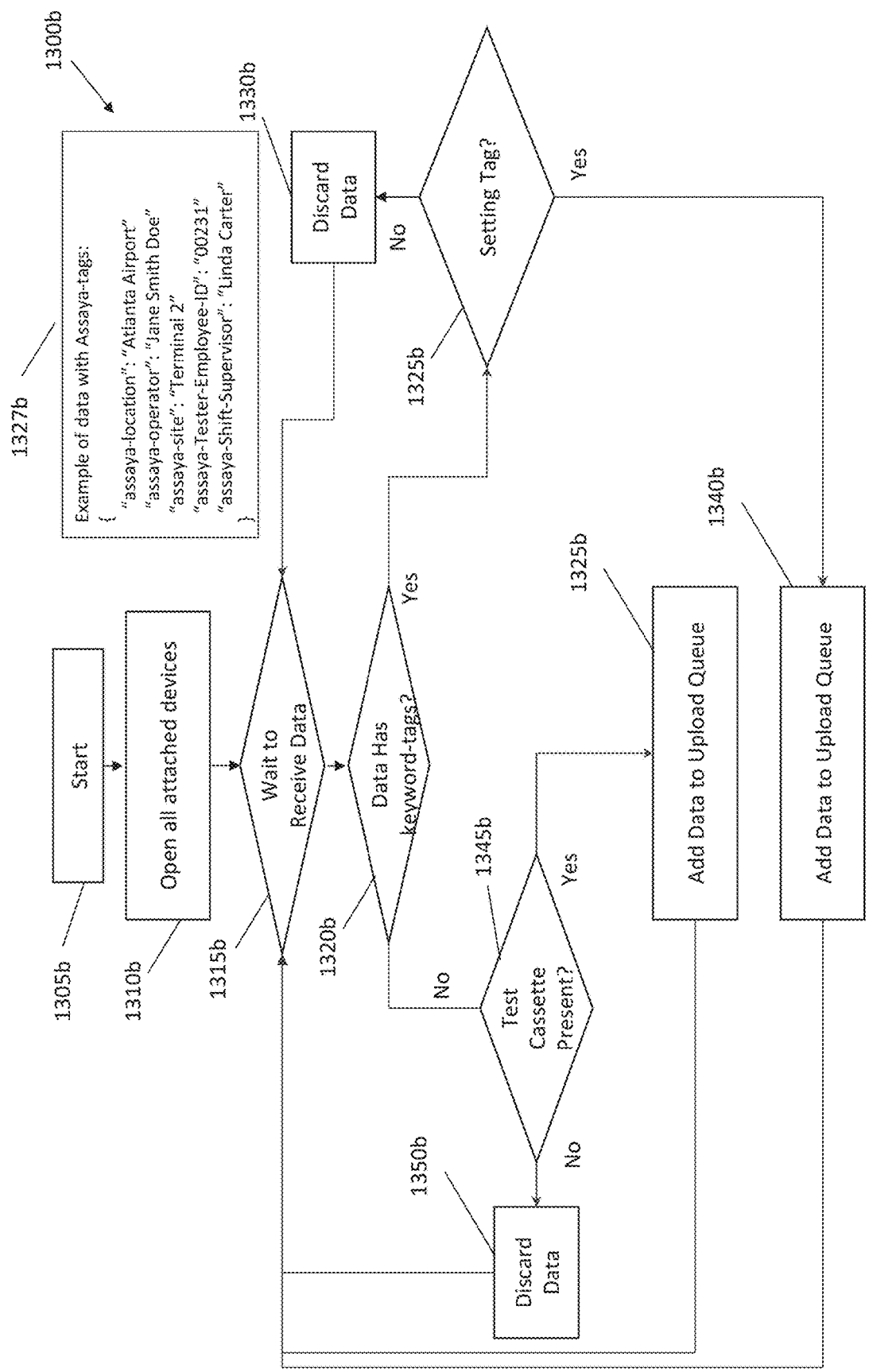
FIG. 13b depicts a flowchart of a method for receiving context and patient information regarding the testing site, operator, and patient information in accordance with an embodiment of the present invention.
Figure 14:
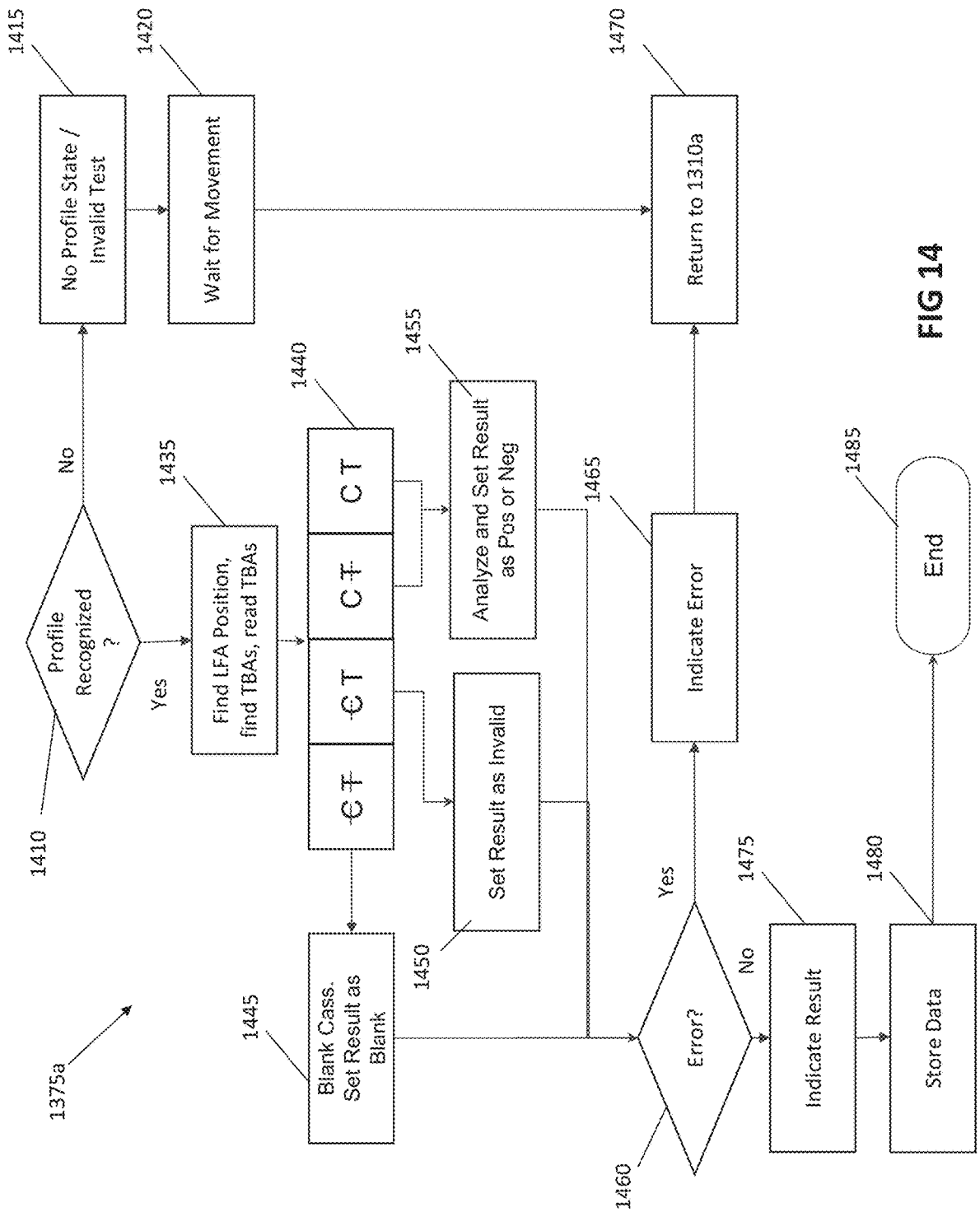
FIG. 14 depicts a flowchart of a method for performing a profile scan in accordance with an embodiment of the present invention.

If the visual feature is a profile code that indicates the presence of an actual test cassette (block 1370a), a profile scan is made to determine test results for that test cassette (block 1375*a*) (explained in further detail in FIG. 14). The test result is captured along with the test result's associated unique ID (block 1390*a*) and written to a cassette unique ID register and an upload queue for upload to the central database by a separate upload thread. The test result includes, for example, one or more of the testing device temperature, testing device humidity, time stamp, and unique ID of the testing device. In addition, header and metadata associated with the test cassette is built up and placed in the upload queue in association with the unique ID as described in parallel process 1300*b* described in FIG. 13*b* (block 1395*a*). The unique ID of the cassette being scanned is retained within the cassette unique ID register, until, for example, the cassette is moved or removed from the test device 100. Thus, the unique ID is associated with each piece of header information and metadata received until such time that the unique ID is cleared by movement or removal of the cassette.

Data is uploaded from the upload queue by an upload thread when data is present in the upload queue while the testing device 100 is in communication with the central patient database. If the test device 100 is offline, the data from the queue is uploaded typically when the test device 100 is next online. Alternatively, the data from the queue may be downloaded to portable media, such as a thumb drive or SD card, and uploaded to the central patient database from another system.

Figure 15:
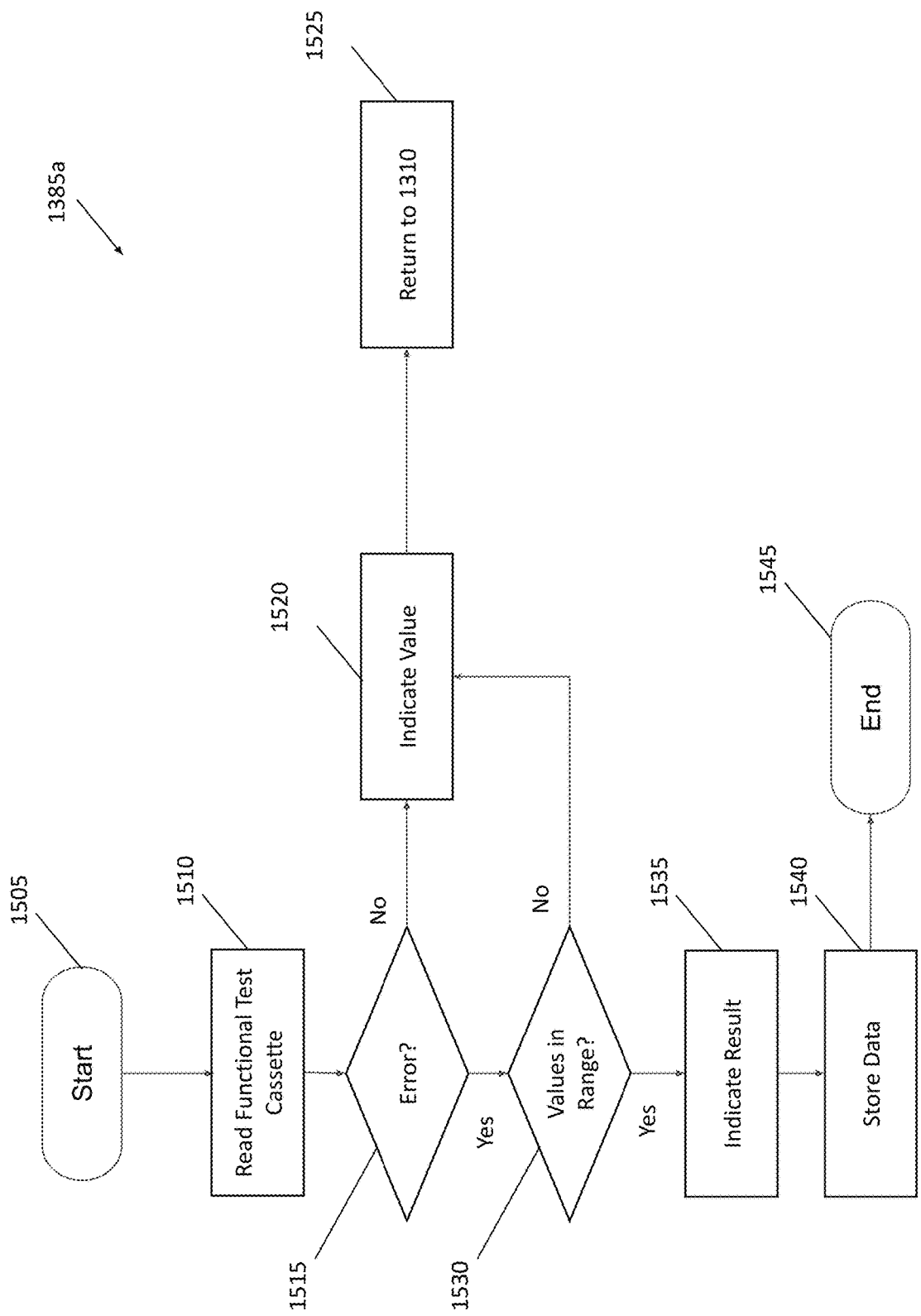
FIG. 15 depicts a flowchart of a method for performing a functional test scan in accordance with an embodiment of the present invention.

If the visual feature is a functional test profile code that indicates the presence of a functional test cassette (block 1380*a*), a functional test cassette scan is made to test the test system 100 (block 1385*a*) (explained in further detail in FIG. 15). Control then returns to block 1310*a*.

FIG. 13*b* depicts a flowchart of a method 1300*b* for receiving context and patient information regarding the testing site, operator, and patient information in accordance with an embodiment of the present invention. Patient information includes patient component information including, for example, patient name, patient gender, patient ID, patient birth date, and patient contact information. The method starts (block 1305*b*) and opens communications with all devices in communication with communication infrastructure 960 (block 1310*b*). This permits the method to receive data from devices, such as, barcode scanner 967, body temperature thermometer 970, pulse oximeter 975, scale 980, symptom entry device 985, sphygmomanometer 990, and passport scanner 995. The method waits to receive data from one of these input devices (block 1315*b*), and when data is received the received data is checked to see whether it contains tags with a designated keyword, such as "assaya," in the data (block 1320*b*).

Designated keywords may be used and embedded in generated code, such as QR codes, in order to allow an operator of the testing device 100 to provide setting data to the central patient database. Setting data includes, for example, location and operator information, in which any particular testing device 100 is set. The generated codes are scanned in order to associate a given testing device 100 with, for example, a particular location or site or associate, for example, an upload queue contents with an operator, or some other predesignated field, such as, for example, employee ID or supervisor. If the designated keyword is in the data, the method checks whether the keyword is associated with setting data, and if not the data is discarded (block 1330*b*) and flow returns to block 1315*b* where further data is awaited.

If the designated keyword is associated with setting data, the data is added to the upload queue as payload associated with a unique test device ID (block 1340*b*). Thus, tagged data representing, for example, site, operator, location, and other test information is placed in the upload queue in association with the unique test device ID for upload to the central database. Flow then returns to wait for more data in block 1315*b*.

Returning to block 1320*b*, if the received data does not have the designated keyword, such as "assaya", and a test cassette is present in the testing device 100 (block 1345*b*), the received data (which is commonly patient related data such as blood pressure or symptoms) is added to the upload queue and associated with the cassette unique ID currently located in testing device 100 (block 1325*b*) and flow returns to block 1315*b* while waiting for more data to be received. If the test cassette is not present in the testing device 100, any data received from devices attached to communications infrastructure 960 is discarded (block 1350*b*), unless it has the keyword tag as described above.

FIG. 14 depicts a flowchart of a method 1375*a* for performing a profile scan in accordance with an embodiment of the present invention. A check is made to determine if a test configuration profile associated with the profile code on the visual feature is present in a local database (block 1410). Test configuration profiles and equivalence curves are stored locally in, for example, an XML or JSON file. Each XML or JSON file may contain multiple test configuration profiles with associated equivalence curves.

In a first embodiment of the invention, if no test configuration profile is present (block 1410), a no profile state is entered, and a no profile message is indicated by, for example, flashing an invalid result (block 1415). The method waits until there is movement caught by the imaging device (block 1420), and then flow returns to block 1310*a* (block 1430). In a second embodiment of the invention, if the test configuration profile is not present in the local database, a fetch may be made to pull the appropriate test configuration file from a central test database for storage in the local database. Thus, new tests that are used in the field will cause the local database to update itself with information from the remote database.

If the test configuration profile is present in the local database (block 1410), the LFA position, test bar area ("TBA") for each of the control line and the test line are located, and measured intensity values of the control line and test line in each respective TBA are determined (block 1435) based on the imaging source. The imaging source is, for example, a camera, data file or files, xerography device, video feed, data stream, or other source of image information. To scan the LFA strip, the test configuration profile corresponding to the profile number provides brightness settings for LEDs that provide light at various wavelengths that will shine upon the LFA strip. The LEDs are turned on to that appropriate brightness level, and after a delay to permit the LEDs to arrive at the proper brightness and a camera to stabilize to take an image at that brightness level, images are taken by the camera. The number of images taken is indicated by the test configuration profile. The areas of the LFA strip indicated by the test configuration profile to contain control and test lines, i.e. the test bar areas, are analyzed for color and intensity, and results are averaged between several images taken to determine measured intensity values to be presented as results of the LFA strip scan.

Measured intensity values of the test lines and control lines are calculated as follows. Each of the plurality of images is straightened as carriers can be inserted askew, the area around the test lines and control lines is selected, and the intensity of the image is intensity normalized so that the blank part of the paper is set to zero. Please note that the intensity values of 0-255 are inverted in that pure white is 0 and pure black is 255. The test bar areas of both the test line and the control line are found, which may be between 3 and 10 pixels width of lines depending on the test kit manufacturer. The median intensity lines within the lines are then averaged together by summing the intensity values of each pixel comprising both median lines and averaging the pixel intensity to determine a measured intensity value of each of the test lines and control lines.

The measured intensity value of the test bar area for the control line and measured intensity values of the test bar area for the test line is used to make a determination of the appropriate next actions in the method 1375a (block 1440). A control line measured intensity values that is about the control line measured intensity values of the paper comprising the LFA strip indicates that there is no control line present, indicated in the flow chart as "$\in$." Presence of a control line is indicated in the flow chart a "C." A test line measured intensity values that is about the test line measured intensity value of the paper comprising the LFA strip indicates that there is no test line present, indicated in the flow chart as "$\mp$." Presence of a control line is indicated in the flow chart a "T."

If there is no control line present and no test line present, this indicates a blank, i.e., an unused, cassette (block 1445). The result of the test is set as blank and flow continues to error checking block 1460. If there is no control line present but a test line is present, this indicates an invalid test (block 1445). It may be invalid because the applied reagent has reached all or part of the test line portion of the LFA strip, but has not flowed through to the control line that is beyond the test line. When this happens, the test result is not reliable. The result of the test is set as invalid and flow continues to error checking block 1460.

If the control line is present regardless of the presence or absence of a test line, the result of the test is valid and is analyzed with the result set to positive or negative depending upon whether the measured intensity values of the test line meets or exceeds the intensity threshold value for the test line retrieved from the test configuration profile (block 1455). Flow continues to error checking block 1460.

If the scan of the LFA strip detects an error, such as, for example, LFA strip damage, LFA strip missing, incorrect cassette, physically damaged cassette, contamination on the LFA strip, oversaturated LFA strip, barcode defects, or an obstructed LFA strip (block 1460), an error result is indicated (block 1465) and the result indicating a fault is returned for placement in the upload queue along with the cassette unique ID with control returning block 1310a (block 1470).

If there is no error, the test result is indicated (positive/negative/invalid/blank) (block 1475), and the actual value data of each line, i.e., intensity values of the control line and one or more test lines, is passed on to block 1390a (block 1480). In an exemplary embodiment consistent with the present invention, a positive result causes the red LED to light, a negative result causes the green LED to light, an invalid result causes the yellow LED to light, and a blank cassette causes the yellow LED to light. This process ends (block 1485) and flow returns to block 1390a.

FIG. 15 depicts a flowchart of a method 1385a for performing a functional test scan in accordance with an embodiment of the present invention. The functional test cassette's purpose is to test the test system with a cassette having an LFA with, for example, three test lines with respective expected ranges that reflect the measured intensity values that should result from a scan. The functional test cassette is not generally used as a calibration tool, rather it is used to test the testing device 100 either in the field or during or after production. However, in an alternative embodiment of the invention, the functional test cassette may be used as a calibration tool. The functional test cassette is scanned using the methodology previously discussed with respect to block 1435. If the scan of the LFA strip is bad for any reason (block 1515), an error result with a value is indicated (block 1520) with control returning block 1310a (block 1430).

If the measured intensity values for any of the test lines on the functional test cassette read from the functional test cassette are not within the expected ranges (block 1530), the method goes to block 1520 where the error result is indicated.

If the measured intensity values read from the functional test cassette are all within the expected range, a pass result is indicated (block 1535), the data regarding the result is placed in the upload queue (block 1540) and the process ends (block 1545), returning flow to block 1310a.

Figure 16:
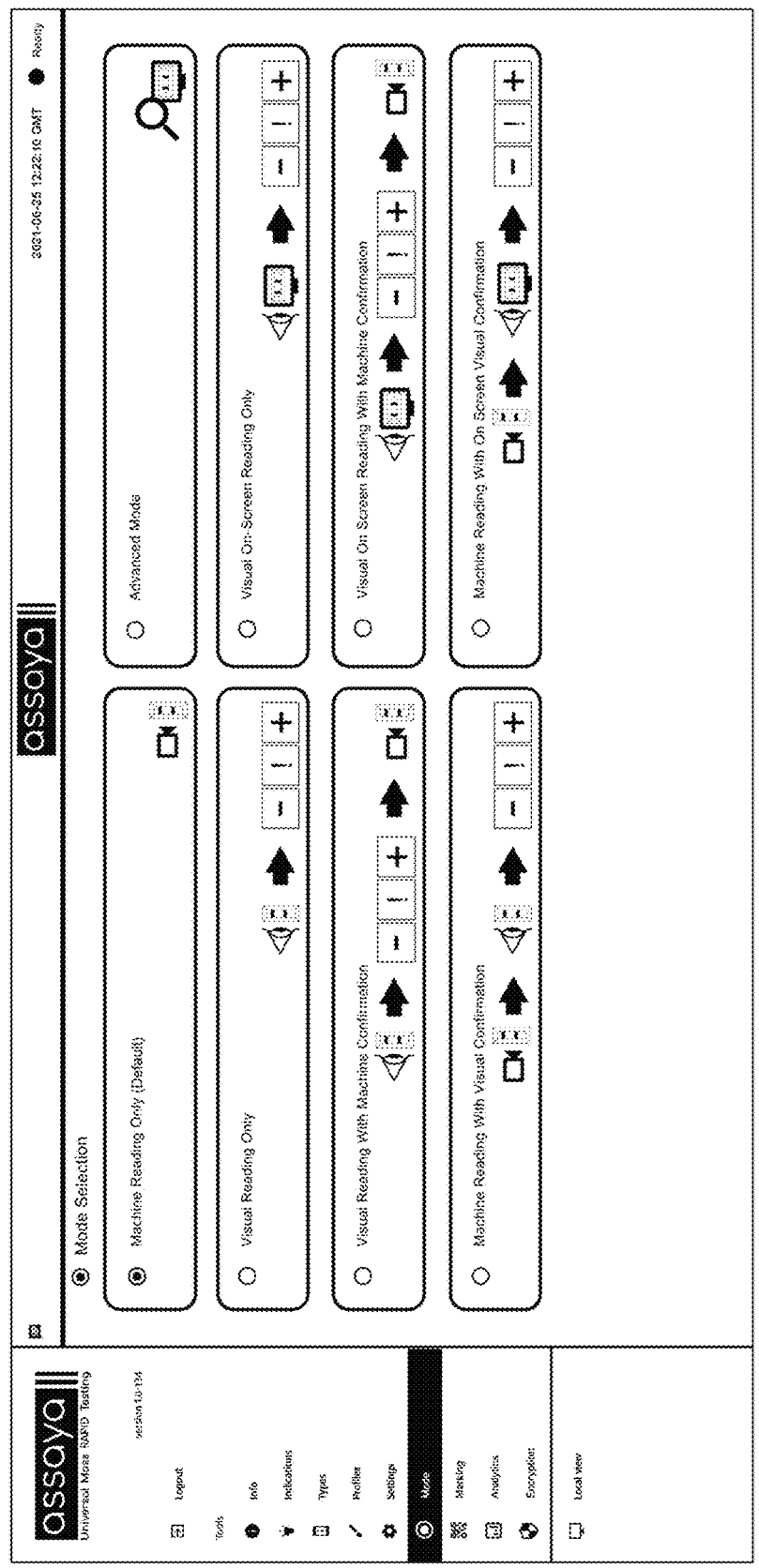
FIG. 16 depicts a supervisory interface screen ("SIS") to access supervisory functions within the testing device in accordance with an embodiment of the present invention.

FIG. 16 depicts a supervisory interface screen ("SIS") 1600 to access supervisory functions within the testing device 100 in accordance with an embodiment of the present invention. The SIS is provided on a web browser in communication with a web server operating on the testing device 100. The SIS may be accessed remotely via direct connection to the test device 100 or via the Internet cloud. Similarly, the SIS may be accessed using the display unit 925 in communication with the testing device 100. In an alternative embodiment, the SIS may be accessed by attaching a computer or mobile device to the testing device via a network connection, e.g., WiFi, Bluetooth, or Ethernet, in order to change options of the testing device 100.

The SIS provides authorized users access to the supervisory functions of the testing device 100 following a successful authentication from a web-based interface to the testing device 100. Authentication may be by password, authentication device or system (such as the RSA SecurID system), or by bio authentication, for example. The SIS permits a supervisor to select a mode in which to operate the testing device 100. The selected mode is the mode that the testing device 100 operates under and the mode that appears on display unit 925 of the testing device 100.

The modes can be selected from the following: Machine Reading Only (the default mode); Advanced Mode; Visual Reading Only; Visual On-Screen Reading Only; Visual Reading With Machine Confirmation; Visual ON-Screen Reading with Machine Confirmation; Machine Reading with Visual Confirmation; and Machine Reading With On Screen Visual Confirmation. The multiplicity of modes is to provide maximum flexibility in assessing test results by combinations of both or either human and machine reading in various orders, along with recordation of results. Each of these modes, along with several other settings, will be described with respect to FIGS. 17-25 that follow, except for FIG. 17g. Each mode will be described in turn, except with the Advanced Mode being discussed last.

In addition, the SIS also provides for gathering information about the testing device 100; changing operation of the indicator lights on the front of the testing device 100; loading profiles into the testing device 100; marking settings for marking cassettes using the testing device 100 on those testing devices 100 that have a marking system, for example, an inkjet or laser marking system; deriving analytical data from the testing device 100; and setting encryption for the testing device 100. The Local View option, visible for selection in the lower left corner of the SIS allows the supervisor to have a duplicate view of whatever is shown on any attached display 925 on the testing device 100.

While the various display units for the following modes are described in a particular order to describe an embodiment of the invention, it will be appreciated by those of ordinary skill in the art after reading this detailed description that different orders of operation are also contemplated. For example, patient identification may be received by test system 100 at earlier or later stages of mode operations than described below.

"Collected information" that will be discussed below includes one or more of any of the information gathered by the test device 100, including, but not limited to, test results determined by the testing device 100, such as positive, negative, and invalid, cassette information, patient information, visual images of the cassette, information input by an operator of the testing device 100, equivalents information, such as equivalent cycle time, control line and test line intensity, date, time, humidity, and temperature, along with time stamps associated with each. Collected information is gathered throughout the operation of each mode and may be stored locally and/or uploaded to a central database throughout each mode and not only when specifically mentioned below.

The testing device 100 has two settings, among many, which can be set in the SIS and changes the operation of the testing device 100: a first checkbox that toggles between providing or not providing one or more of the data items (such as, for example, equivalent test result, positive/negative/invalid, intensity of test and control lines) for the machine results to the operator; and, a second checkbox that toggles between permitting or not permitting the operator to change his input. These checkbox toggles are mostly useful in the modes of operation of the testing device 100 where there is an operator input.

When the testing device 100 settings are such that the operator is not provided the machine results prior to entering her visual results and the testing device settings are such that the operator cannot change her input following her initial input (positive/negative/invalid), this combination may be useful for comparing the quality of machine results as compared to an unbiased operator determined results. The modes which receive an operator input allow for statistical analysis of the quality of machine results versus human determined results. This also may impact the time frame within which an operator provides his result, and this time frame may be recorded in the collection information and provided for further analysis.

When the testing device 100 settings are such that the operator is provided the machine results prior to entering her visual results and the testing device settings are such that the operator cannot change her input following her initial input (positive/negative/invalid), this combination allows a study to investigate whether a biased operator is merely following the machine results rather than making a completely independent assessment of test results. This also may impact the time frame within which an operator provides his result, and this time frame may be recorded in the collection information and provided for further analysis.

When the testing device 100 settings are such that the operator is not provided the machine results prior to entering her visual results and the testing device settings are such that the operator can change her input following her initial input (positive/negative/invalid), the recorded operator inputs may demonstrate that an operator changes his answer following receipt of machine results and the number of times that an operator may change her answer. In other words, it may be used to demonstrate bias in an operator following being provided with machine results.

When the testing device 100 settings are such that the operator is provided the machine results prior to entering her visual results and the testing device settings are such that the operator can change her input following her initial input (positive/negative/invalid), the recorded operator inputs may demonstrate that an operator's bias following receipt of machine results and the number of times that an operator may change her answer. In other words, it may be used to demonstrate bias in an operator being provided with machine results prior to entering his input.

FIGS. 17*a-f* illustrate the interface on the display unit 925 during operation of the testing device 100 when in the default Machine Reading Only ("MRO") mode in accordance with an embodiment of the present invention. MRO mode is the default setting for the testing device 100. It provides for insertion of a cassette, registration of the unique identifier of the cassette, receipt of the patient identification which is paired with the unique identifier of the cassette; viewing of the cassette, and display of the test device 100 determined test result to the operator.

Figure 17A:
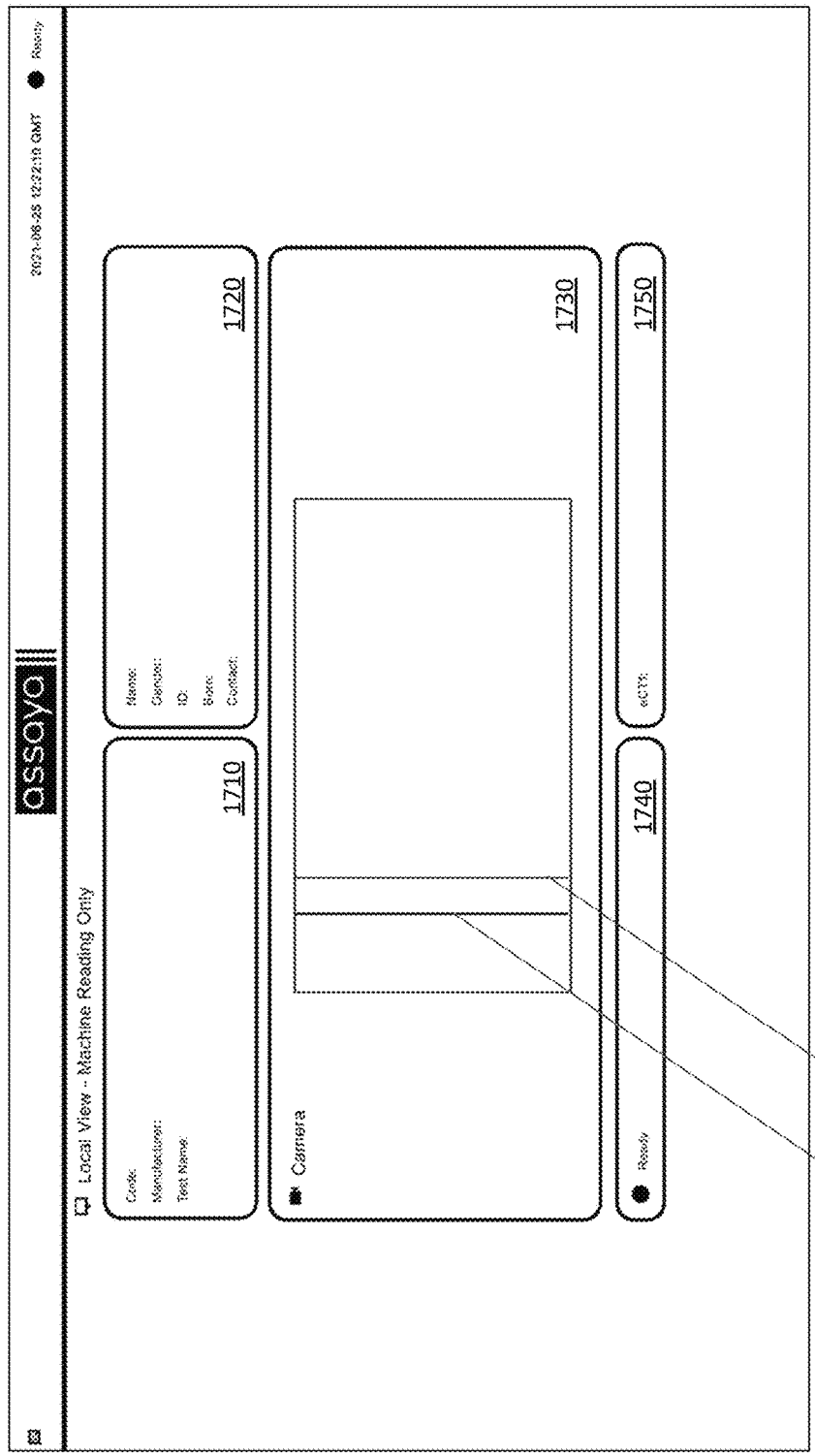
FIGS. 17a-g illustrate the interface on the display unit during operation of the testing device when in the default Machine Reading Only ("MRO") mode in accordance with an embodiment of the present invention.

In FIG. 17*a* a display unit 925 displays the MRO mode upon startup of the testing device 100 and when a cassette is not in testing device 100. In MRO mode, a cassette panel 1710 displays information about a cassette inserted into testing device 100. Cassette panel 1710 displays the unique identifier code of the cassette, manufacturer of the cassette, and the name of the test, or tests, present on the cassette.

An identification panel 1720 displays patient identification information. Patient identification information displayed in identification panel 1720 may include, for example, one or more of: name, gender, ID (for example social security number), date of birth, and contact information, such as a phone number. Depending upon a setting of the testing device 100 that is set via the SIS, one or more fields of the patient identification may be obscured, either partially or entirely. The camera panel 1730 displays an image taken from the camera located in the testing device 100; typically this will be a picture of the inserted cassette. The line 1732 in the image is a representation of the carrier backstop 512 of the carrier 120. The line 1734 in the image is a representation of the minimum insertion point of a cassette that would trigger a reading of the cassette. Result panel 1740 displays test results. Equivalents panel 1750 displays a standardized result of the test. For example, for COVID-19 testing, equivalents panel 1750 displays an equivalent cycle time value that is the equivalent cycle time that would result if the test was performed by a PCR test.

Figure 17B:
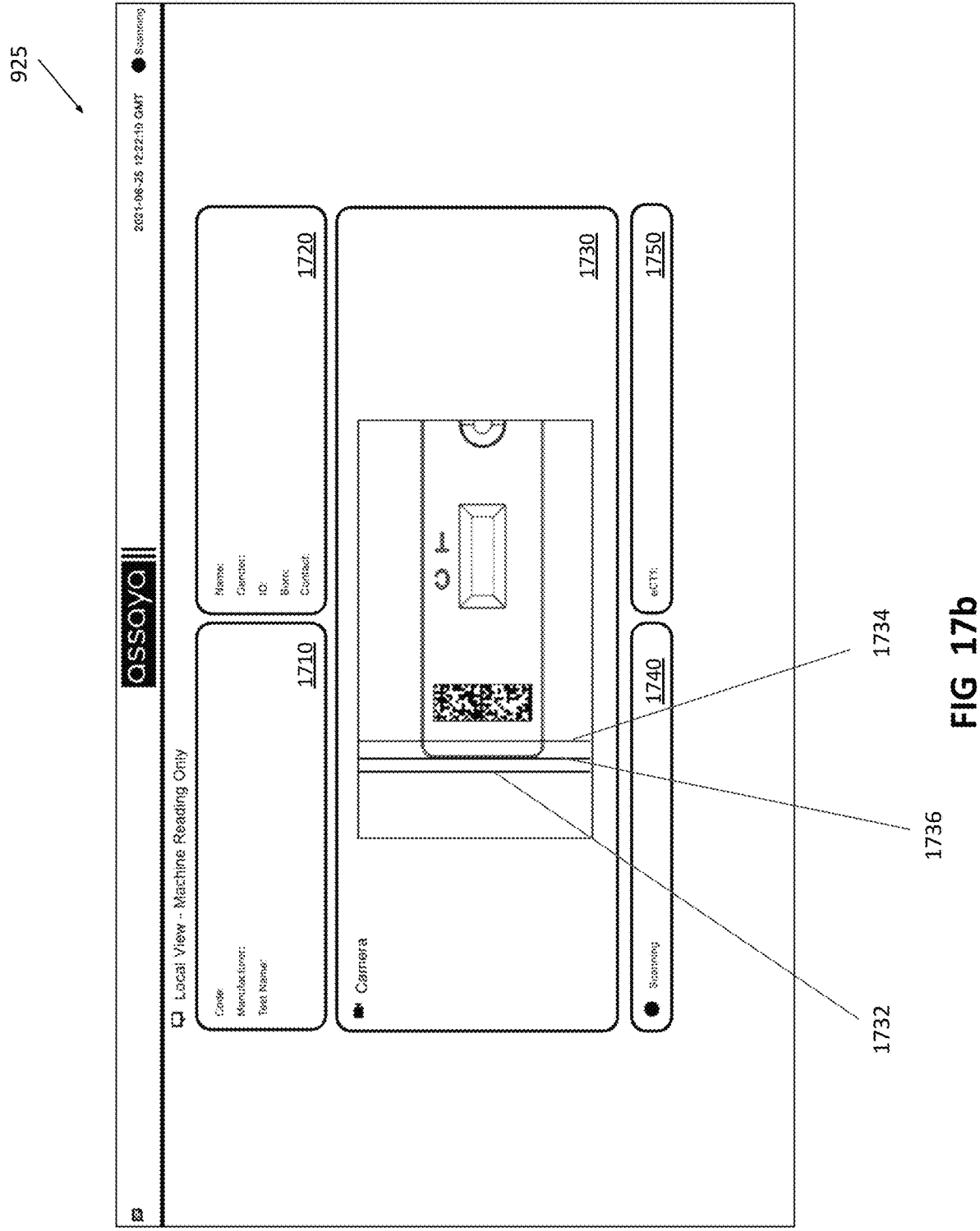

FIG. 17*b* illustrates display unit 925 in MRO mode following insertion of a cassette that had not been previously inserted into the machine and that has not yet had a patient sample placed on the cassette. As the cassette is inserted into the carrier 120, line 1736 represents the edge of the cassette. Inserting past line 1734 triggers a scan of the cassette. As can be seen in the figure, the image of the cassette is displayed in camera panel 1730 and the result panel 1740 displays a message that reads "Scanning" as the test device 100 scans the information from the code on the cassette.

"Scanning" means a cassette is being analyzed by the testing device to determine one or more of: a unique identifier of the cassette where a barcode, QR code or data matrix is present on the cassette; manufacturer; test name or test type; an identity of the cassette and manufacturer where no codes are present on the cassette, in other words by visual feature; test results based on control lines and one or more test lines on the cassette; and any equivalents value appropriate for that particular test cassette.

Figure 17C:
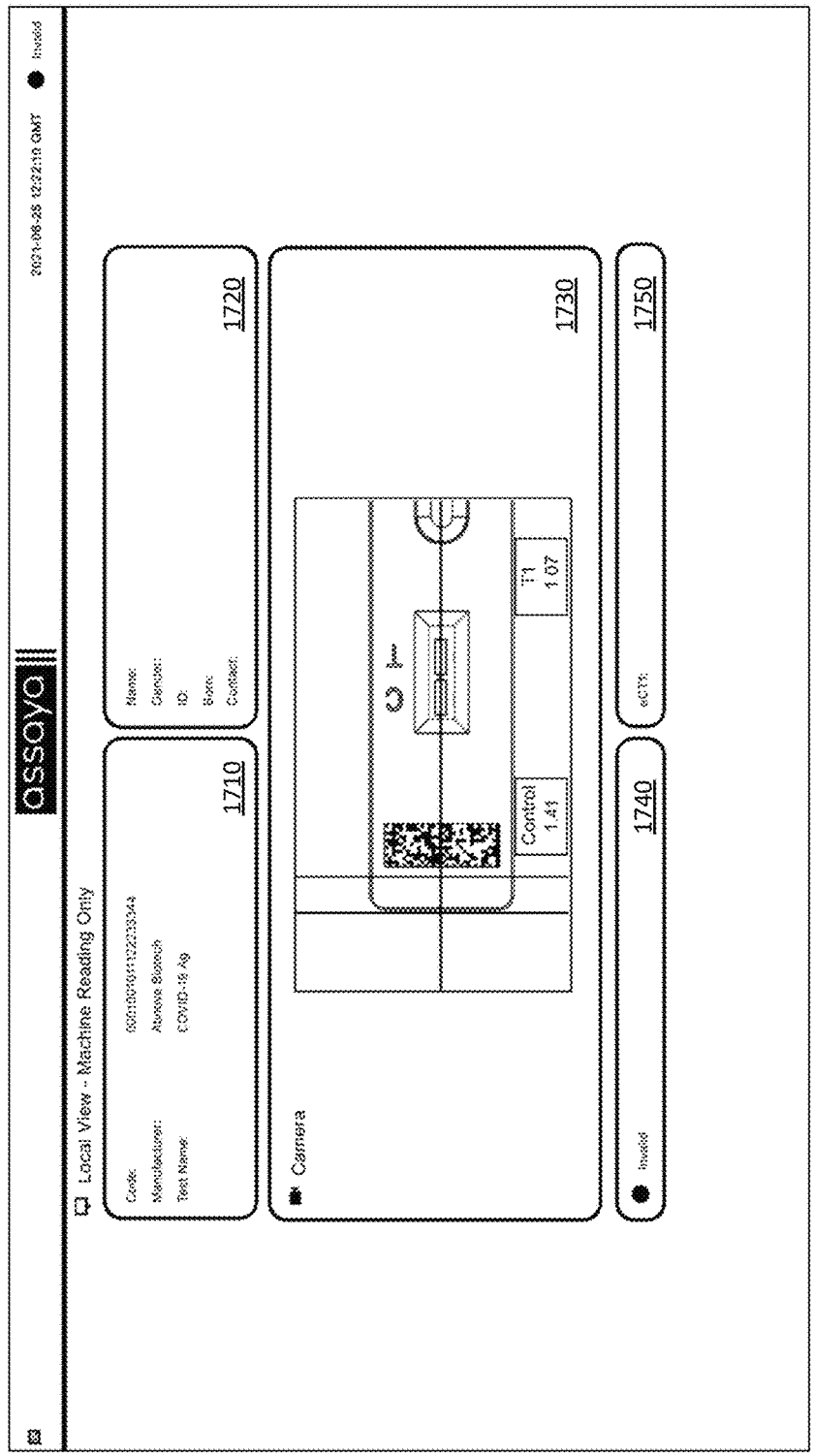

Following the scan, FIG. 17c displays the result of the initial scan of the cassette. The unique code, manufacturer, and test name are displayed in the cassette panel 1710. The camera panel 1730 displays a horizontal line that bisects the LFA test strip in the cassette with two boxes respectively placed over the anticipated control line and test line. As a patient sample has not yet been placed on the cassette, in other words the cassette is unused, values displayed of the intensity of the control line and test line in the camera panel 1730 are low (close to zero), and an invalid test message is displayed in the result panel 1740.

Figure 17D:
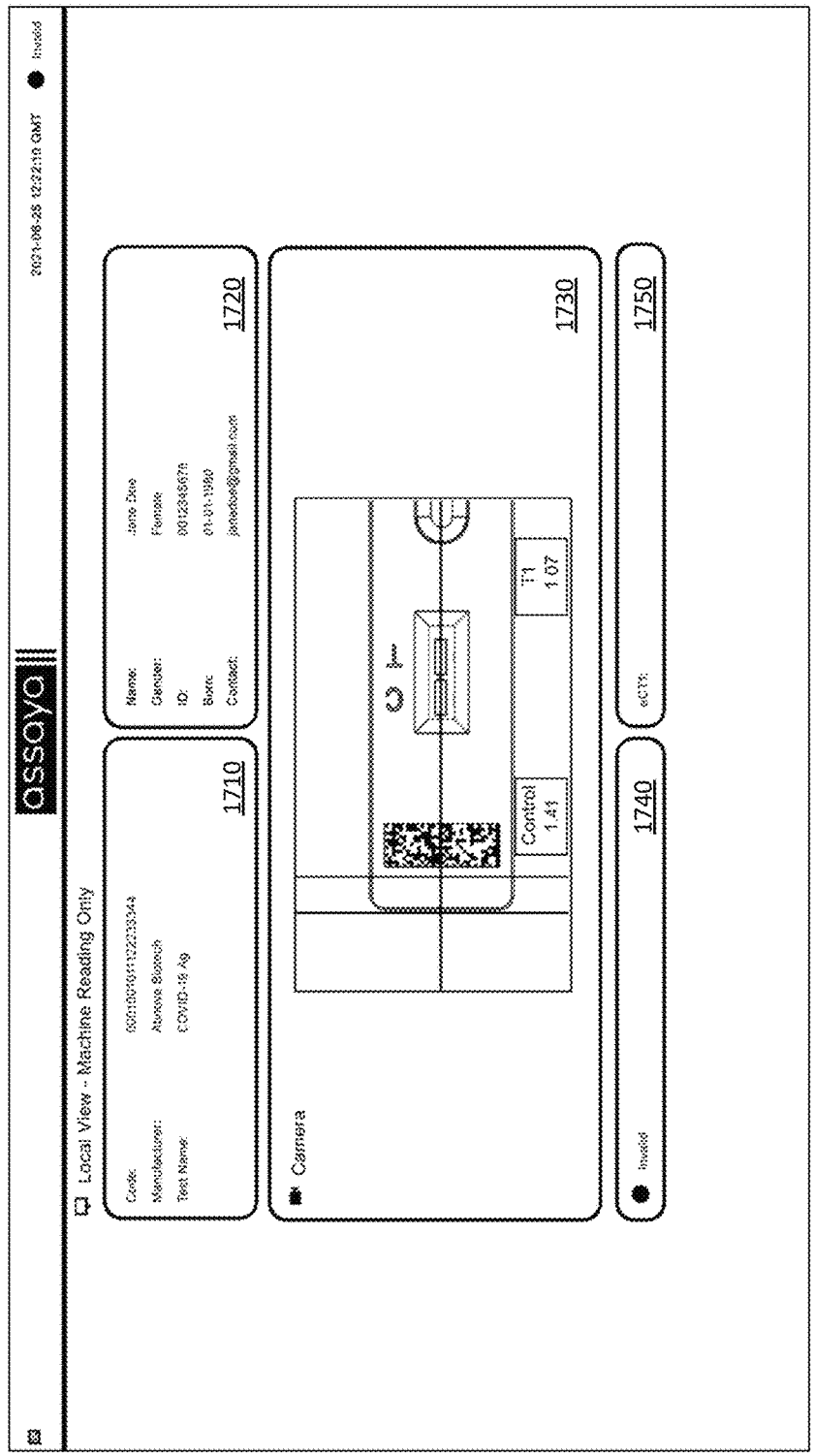

When a patient ID is read by the test device 100, the patient information is propagated and displayed in the identification panel 1720. This is seen in FIG. 17d. As previously discussed, some or all of this information may be obfuscated, so that an operator of the test device 100 does not see some or all of the information. However, test device 100 links the patient information with the unique identifier of the cassette.

Figure 17E:
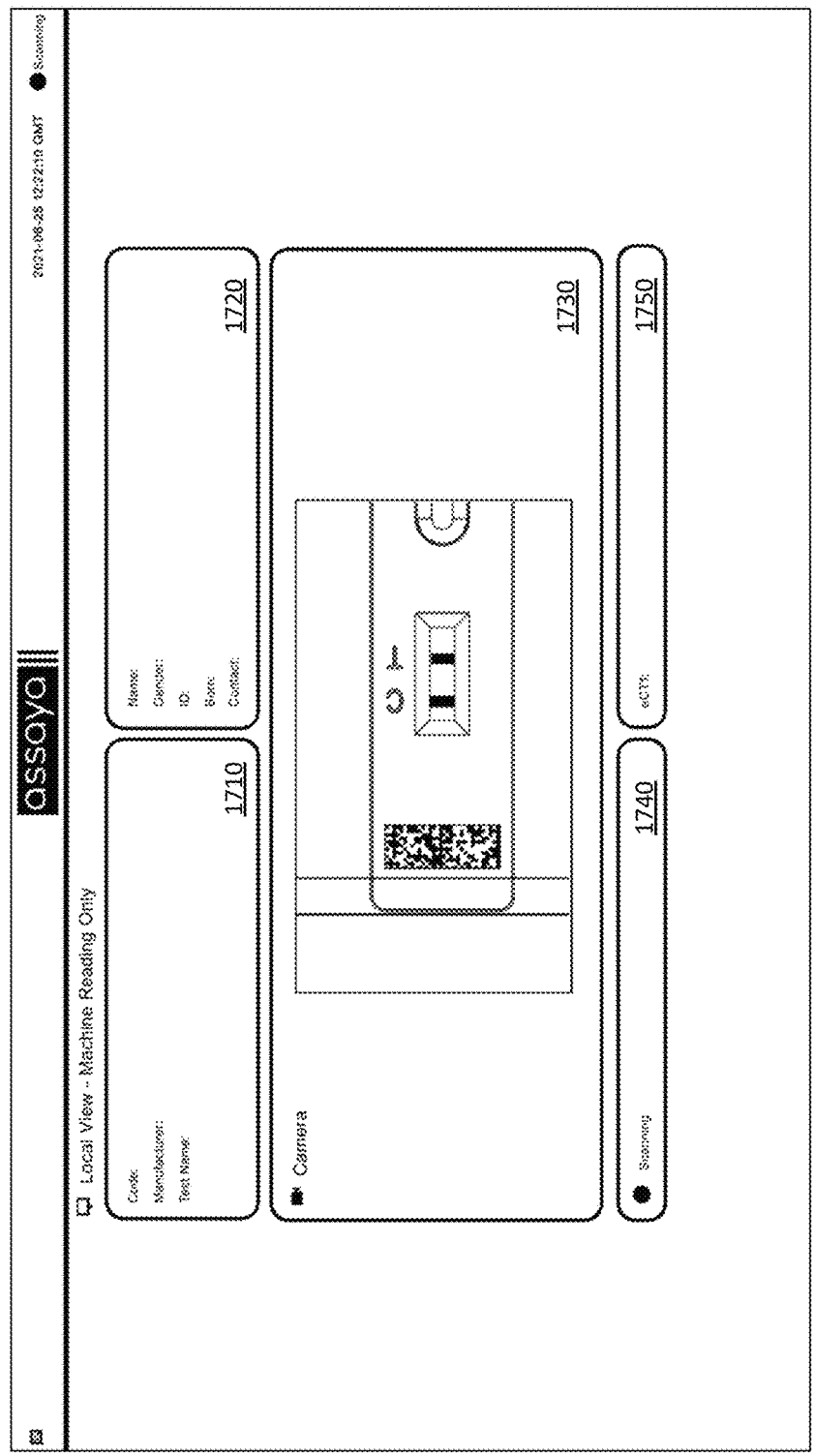
Figure 17F:
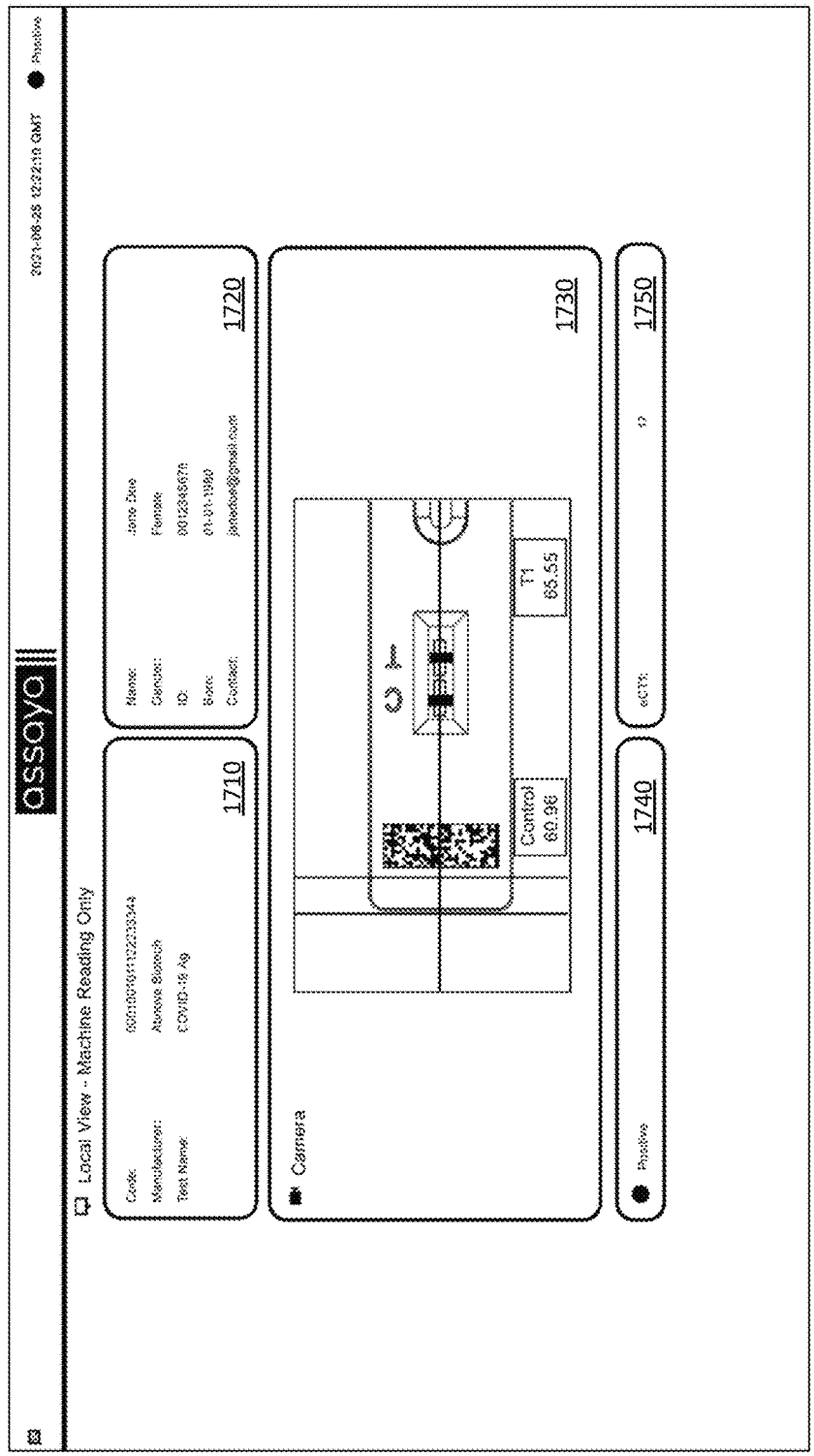

An operator removes the cassette from test device 100 (triggering return of display 925 to the state shown in FIG. 17a), places a sample on the cassette, waits for an incubation period, and then reinserts the cassette into test device 100. This state is shown in FIG. 17e where the test device 100 scans the cassette ("Scanning" message seen in result panel 1740) and begins to determine test results. Test results are provided as shown in FIG. 17f. The operator of test device 100 can see the cassette information in cassette panel 1710, the patient information in identification panel 1720, the results of the test ("Positive" in this case) in result panel 1740, and an equivalent cycle time in equivalents panel 1750. Camera panel 1730 displays the image of the cassette, along with overlays showing position of the test lines and intensity of the control line and test line. Once the cassette is removed from the test device 100, the collected information and results are stored locally and uploaded to the central database.

While the above is all shown with respect to a COVID-19 test that tests for a single disease, test device 100 and its associated display unit 925 also has the ability to read cassettes that have multiple test lines and display results for all of the test lines.

Figure 17G:
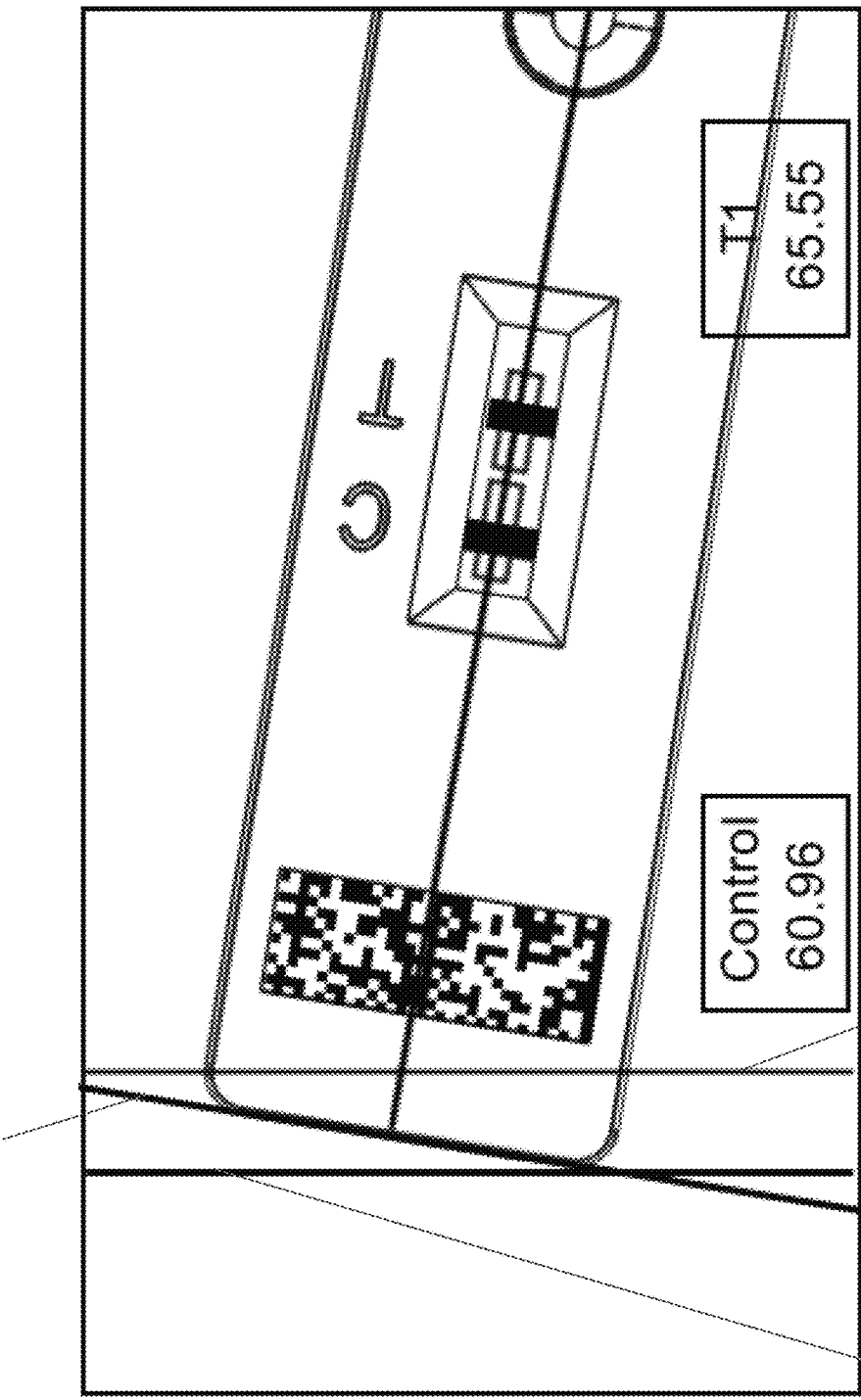

FIG. 17g, illustrates a camera panel 1730 view feature from the test device 100, that shows when a cassette is inserted into test device 100 that is askew, test device 100 is still able to read the code printed on the cassette, as well as the control and test lines, and provide a result.

Figure 18A:
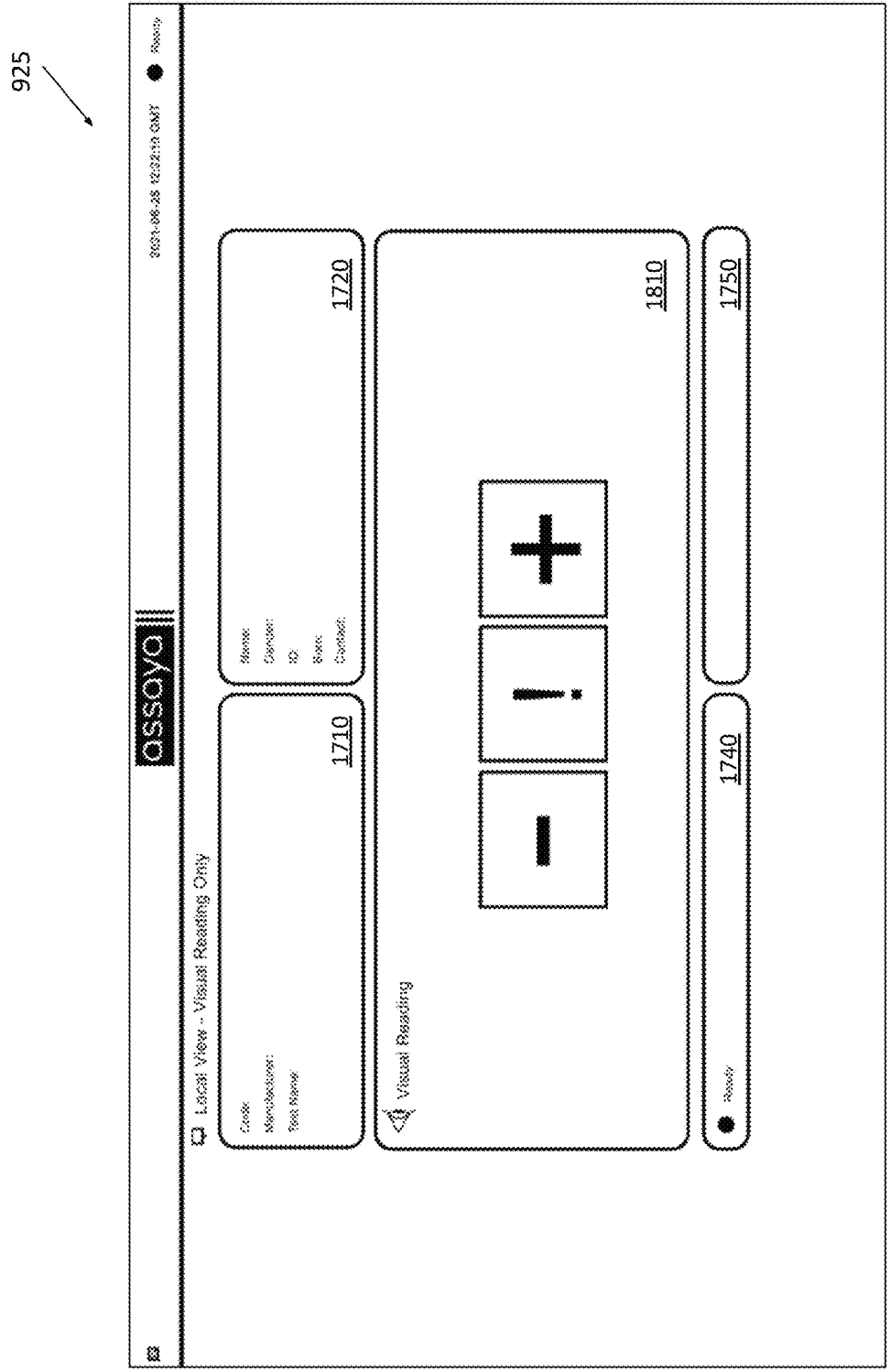
FIGS. 18a-e illustrate the interface on the display unit 925 during operation of the testing device 100 when in the default Visual Reading Only ("VRO") mode in accordance with an embodiment of the present invention.

FIGS. 18a-e illustrate the interface on the display unit 925 during operation of the testing device 100 when in the default Visual Reading Only ("VRO") mode in accordance with an embodiment of the present invention. In VRO mode, the test device 100 does not analyze the cassette to determine test results; instead, the test results are provided by an operator who visually reads the control and test lines of the cassette and pushes a button in operator result panel 1810 corresponding to the test result. FIG. 18a is the image on the display unit 925 when no cassette is in the test device while in VRO mode.

Figure 18B:
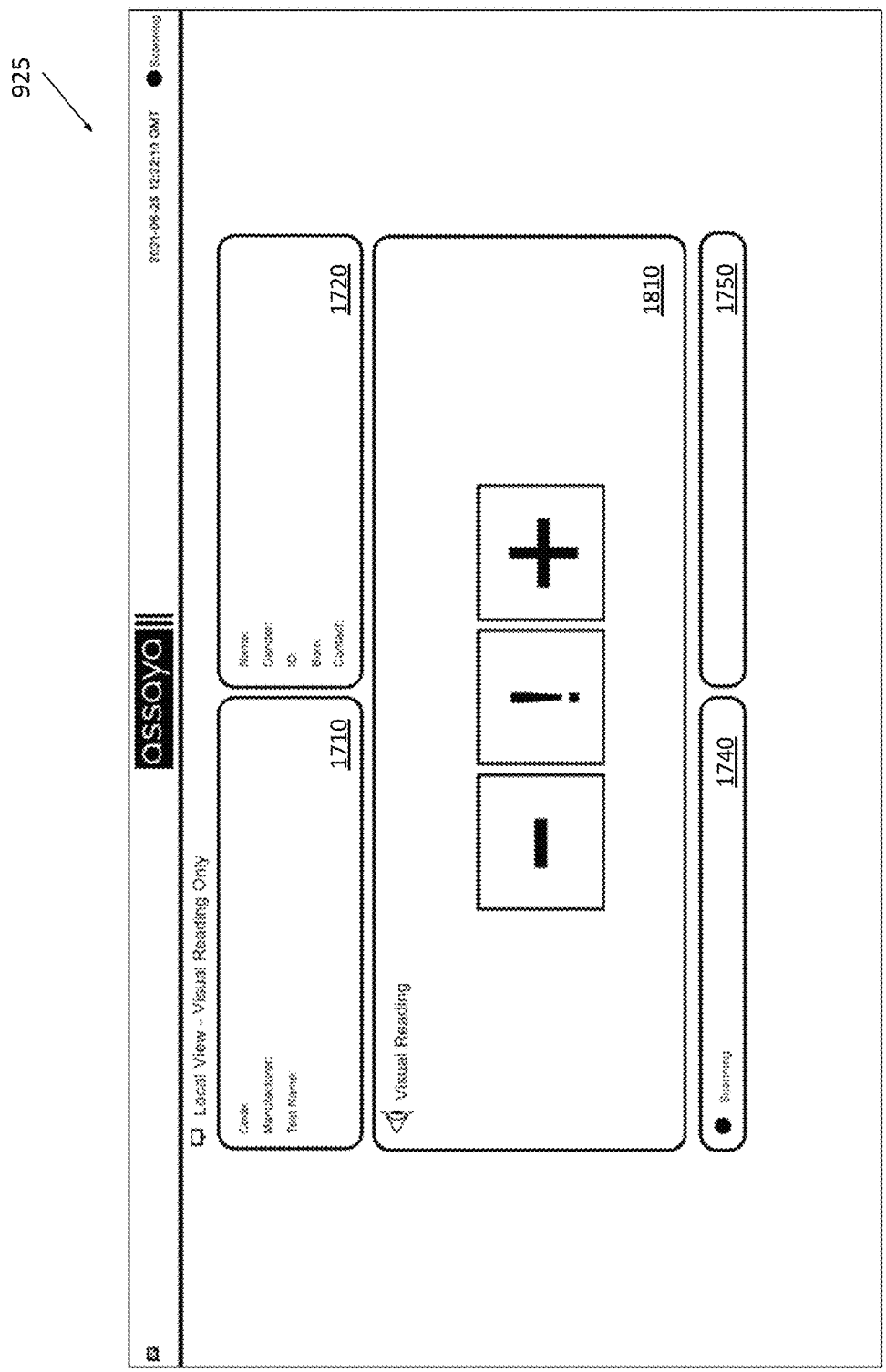
Figure 18C:
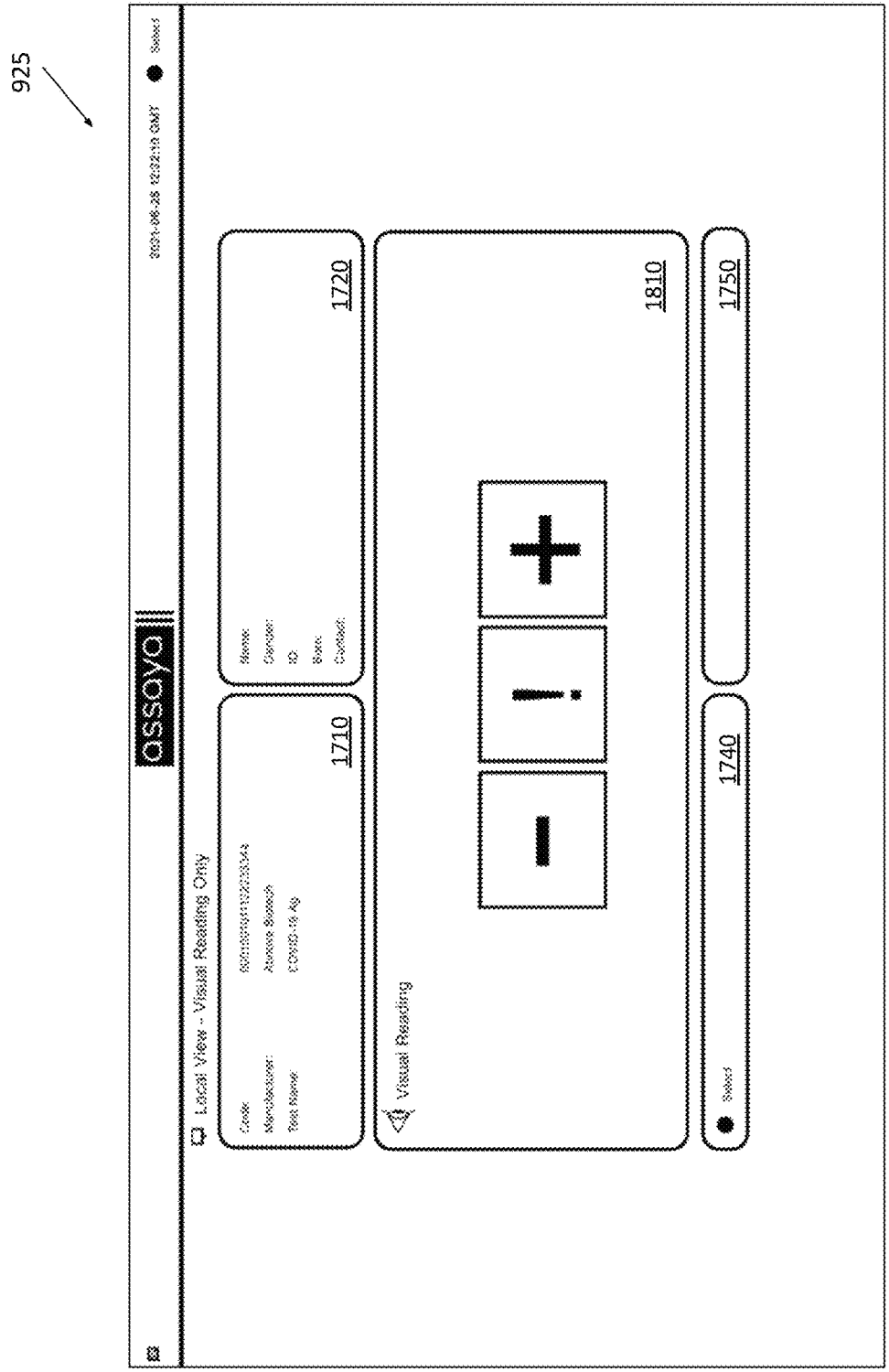

Upon insertion of a cassette, "Scanning" appears on display unit 925 in result panel 1740 and is shown in FIG. 18b. After scanning is complete, the cassette panel 1710 is populated with information derived from scanning the code on the cassette. This is shown in FIG. 18c.

Figure 18D:
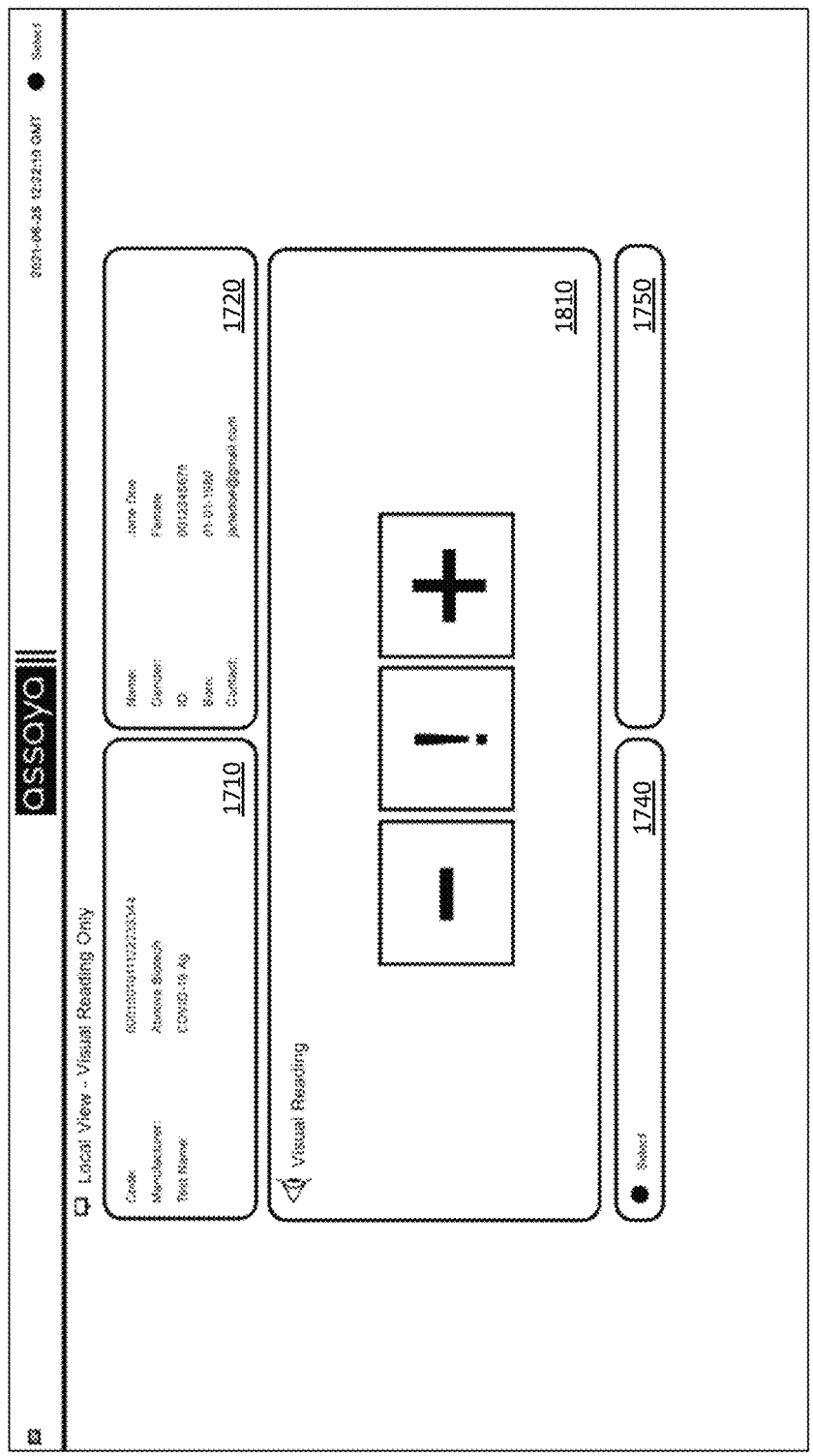
Figure 18E:
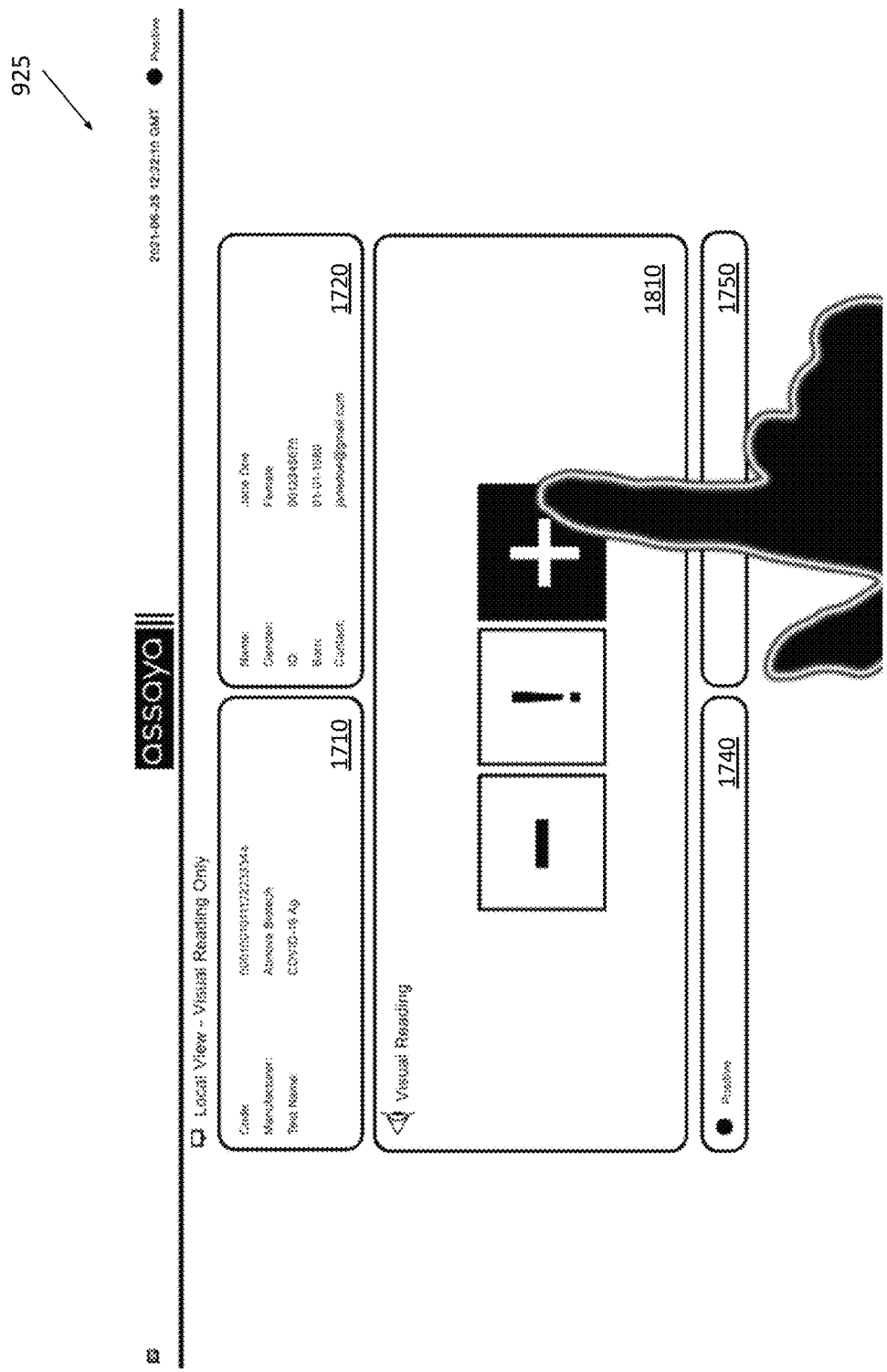

After a patient ID is read by test device 100, patient information panel 1720 has its fields propagated and displayed (FIG. 18d). Again, display of patient information in whole or in part is determined by test device 100 settings. Shown in FIG. 18e is an operator selecting a positive test result that the operator has determined by visually inspecting the test and control lines of the cassette. The operator may change his input, so long as the cassette remains inserted in the test device 100, unless an option in the testing device 100 has been selected using the SIS that prevents an operator from changing her selection once it has been made. Each operator input is stored as collected information, such that, for example, if an operator repeatedly changes his input each change is stored in the collected information. Therefore, even though an operator changes his input, all the inputs from the operator are stored and collected as collected information. They may be analyzed later through statistical analysis. Once the cassette is removed from the test device 100, the collected information and results are stored locally and uploaded to the central database.

While the above functionality is described with respect to a display unit 925, on a headless testing device 100, i.e., one without a display unit 925, similar functionality can be achieved through use of an operator input device 997 previously described that receives the operator determination of positive, negative, or invalid in place of the display unit 925.

Figure 19A:
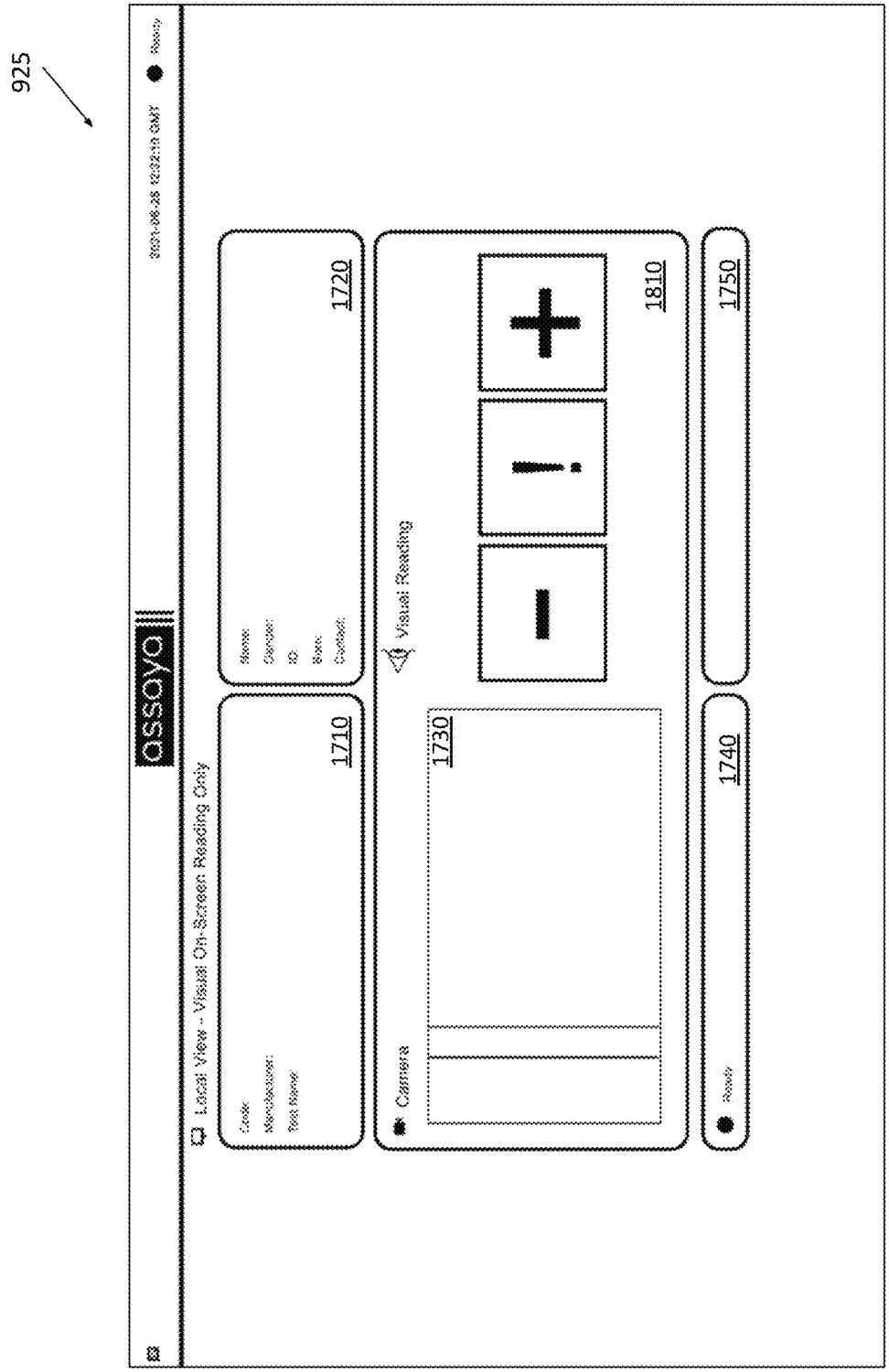
FIGS. 19a-h illustrate the interface on the display unit 925 during operation of the testing device 100 when in the default Visual On-Screen Reading Only ("VORO") mode in accordance with an embodiment of the present invention.

FIGS. 19a-h illustrate the interface on the display unit 925 during operation of the testing device 100 when in the default Visual On-Screen Reading Only ("VORO") mode in accordance with an embodiment of the present invention. In VORO mode, the operator takes advantage of the magnified camera view in panel 1730 provided by the test device 100 to better see the control and test lines on the cassette and renders her judgment of the results by inputting the results in operator result panel 1810. FIG. 19a is the startup image on display unit 925 in VORO mode and the image displayed when there is no cassette in test device 100.

Figure 19B:
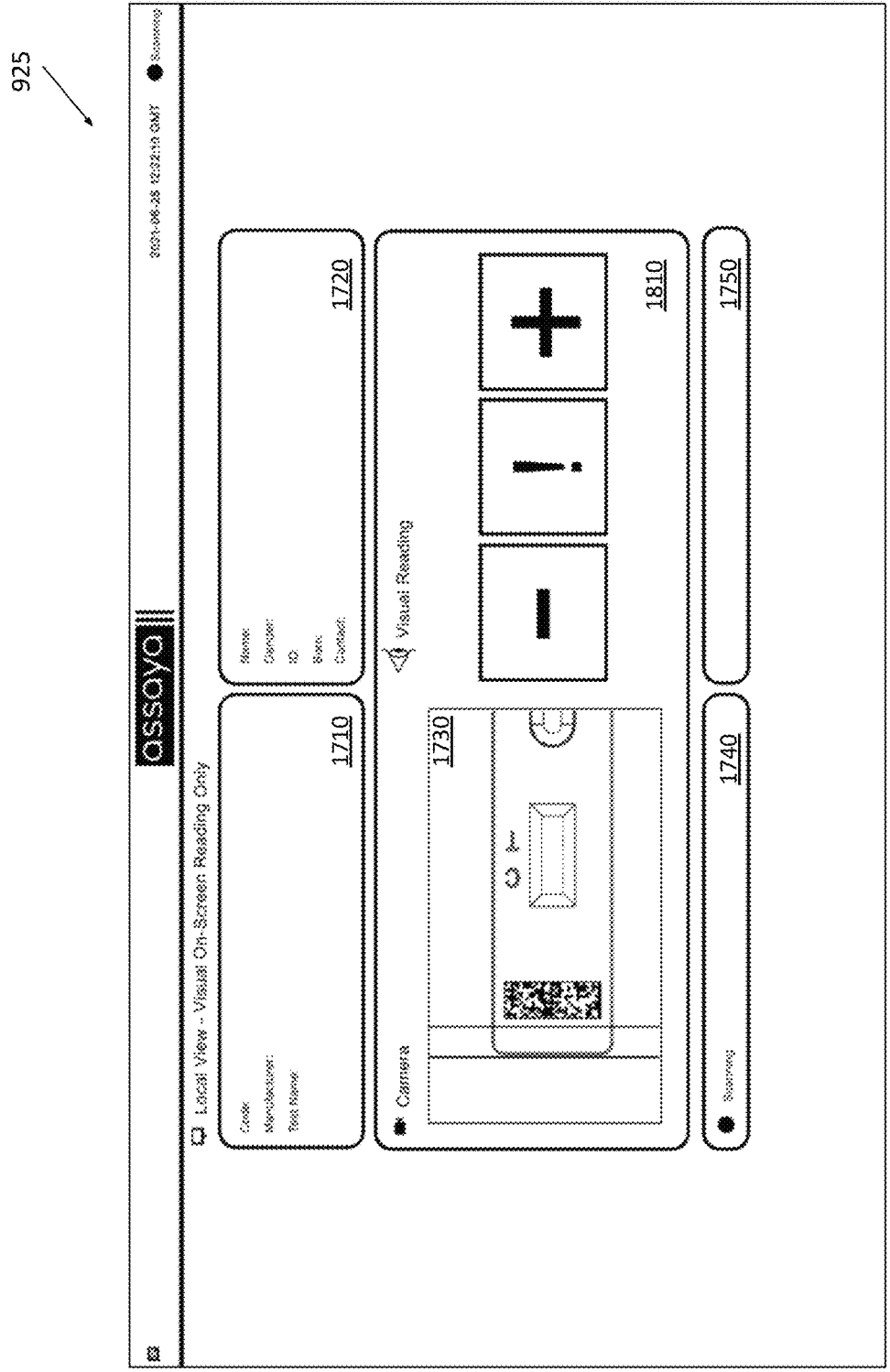
Figure 19C:
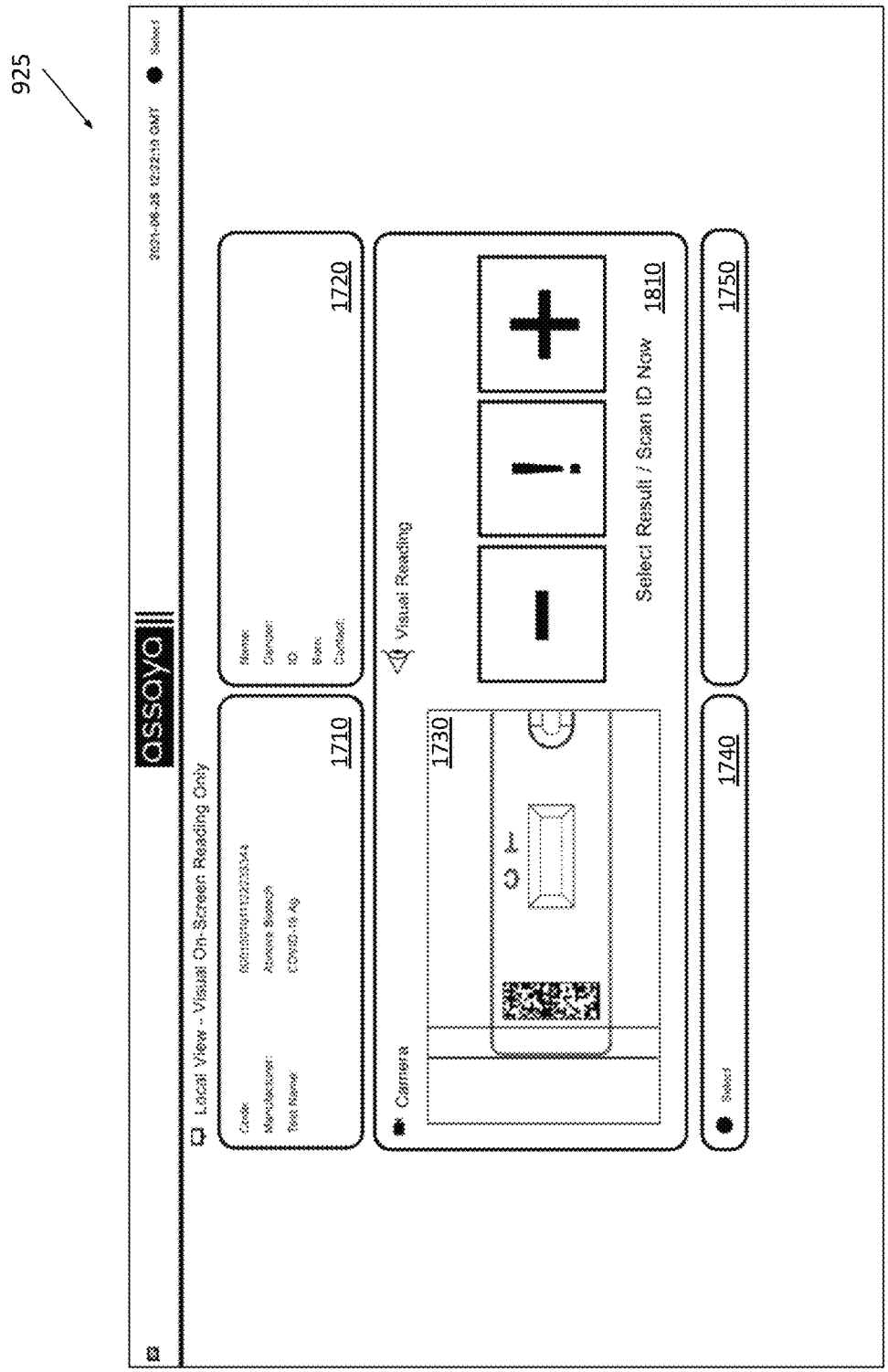
Figure 19D:
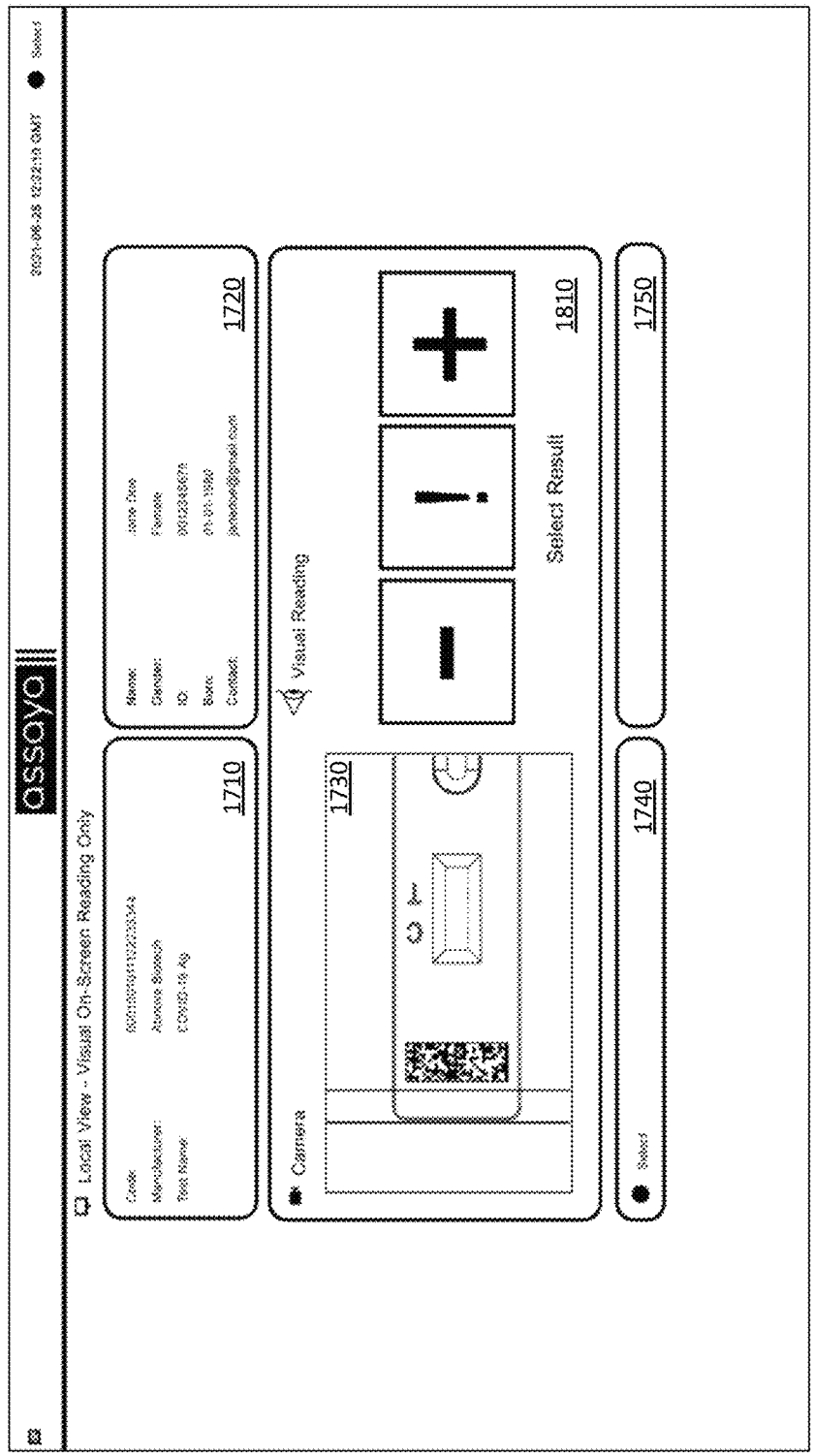
Figure 19E:
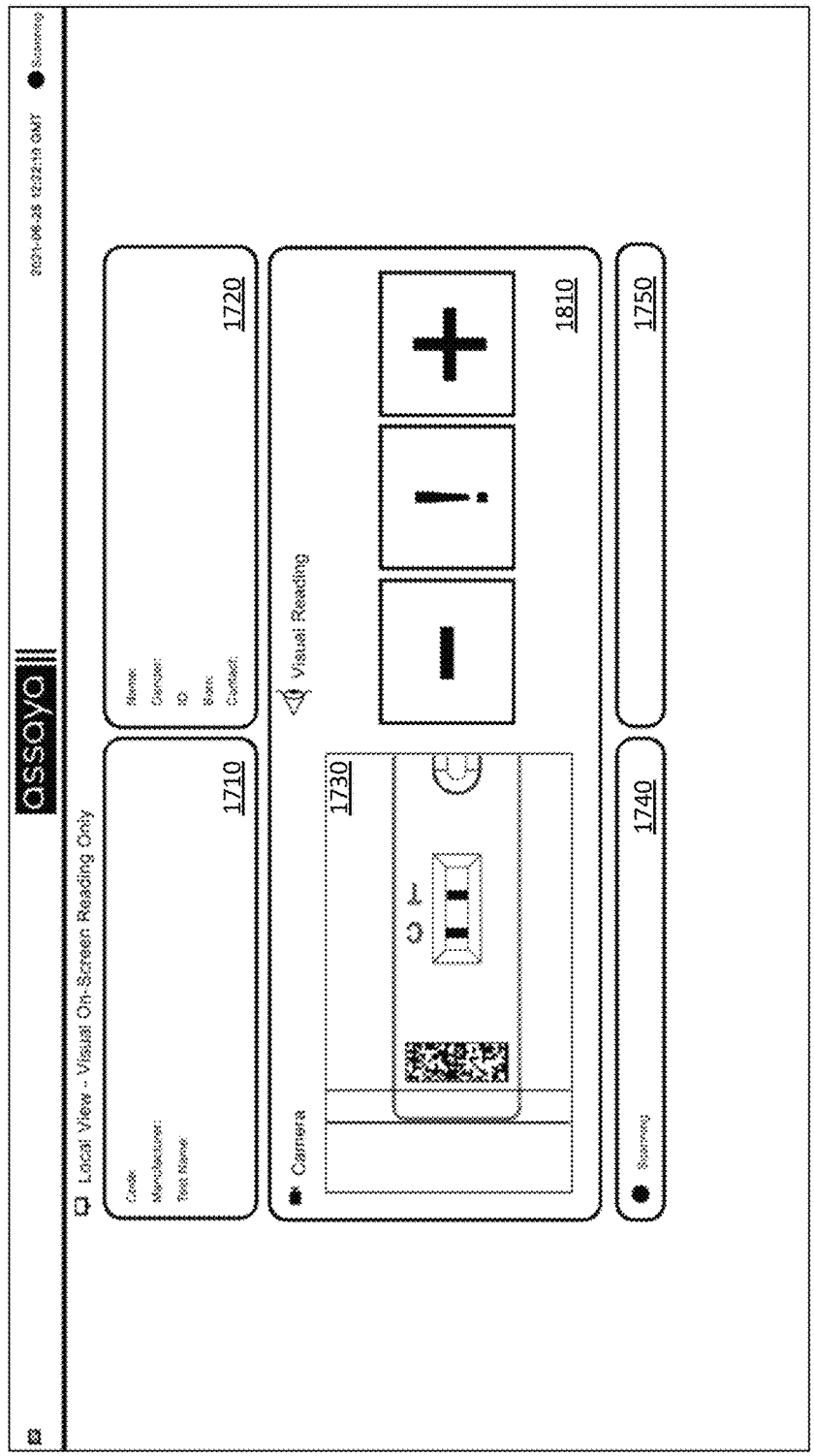
Figure 19F:
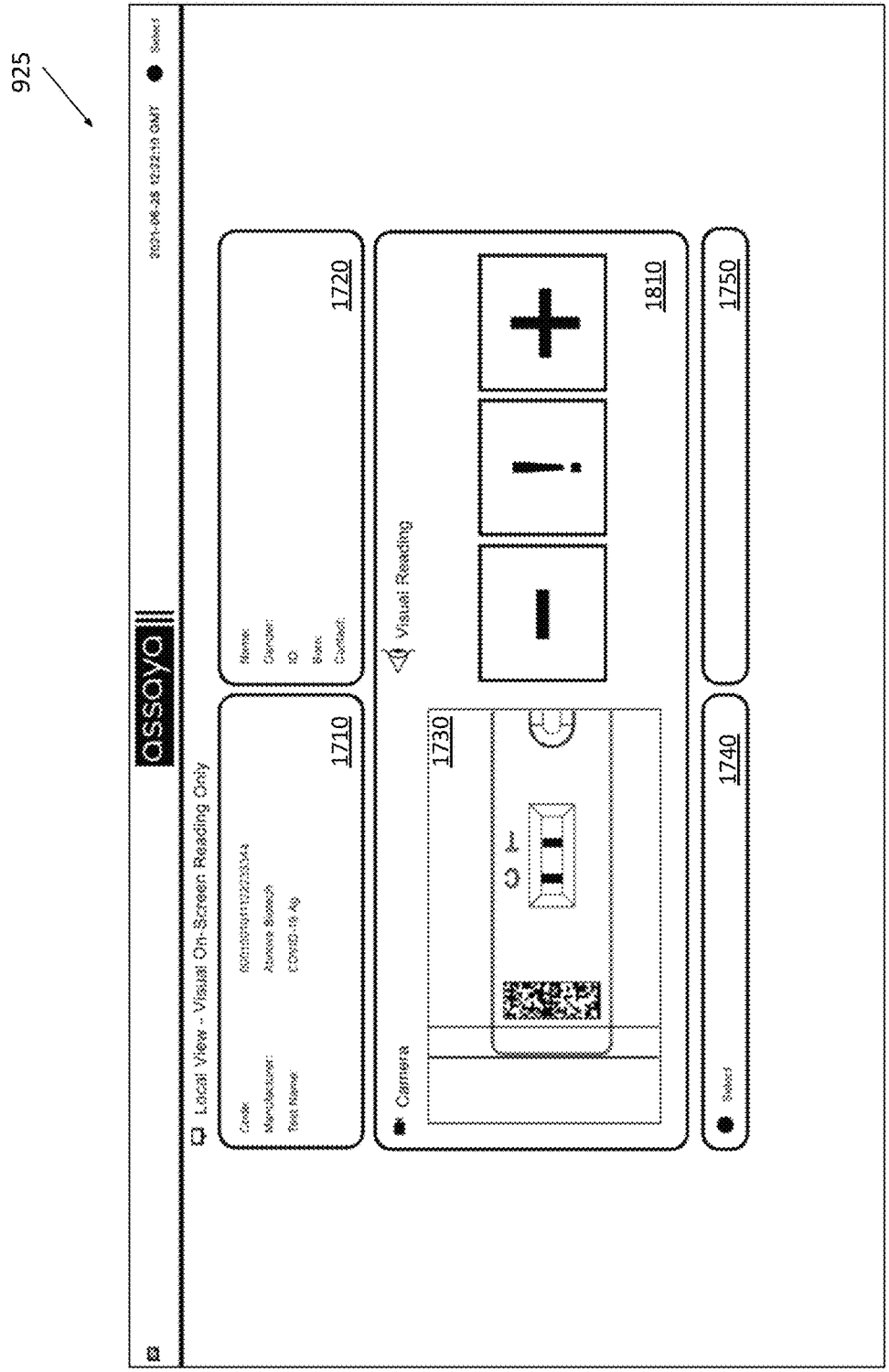
Figure 19G:
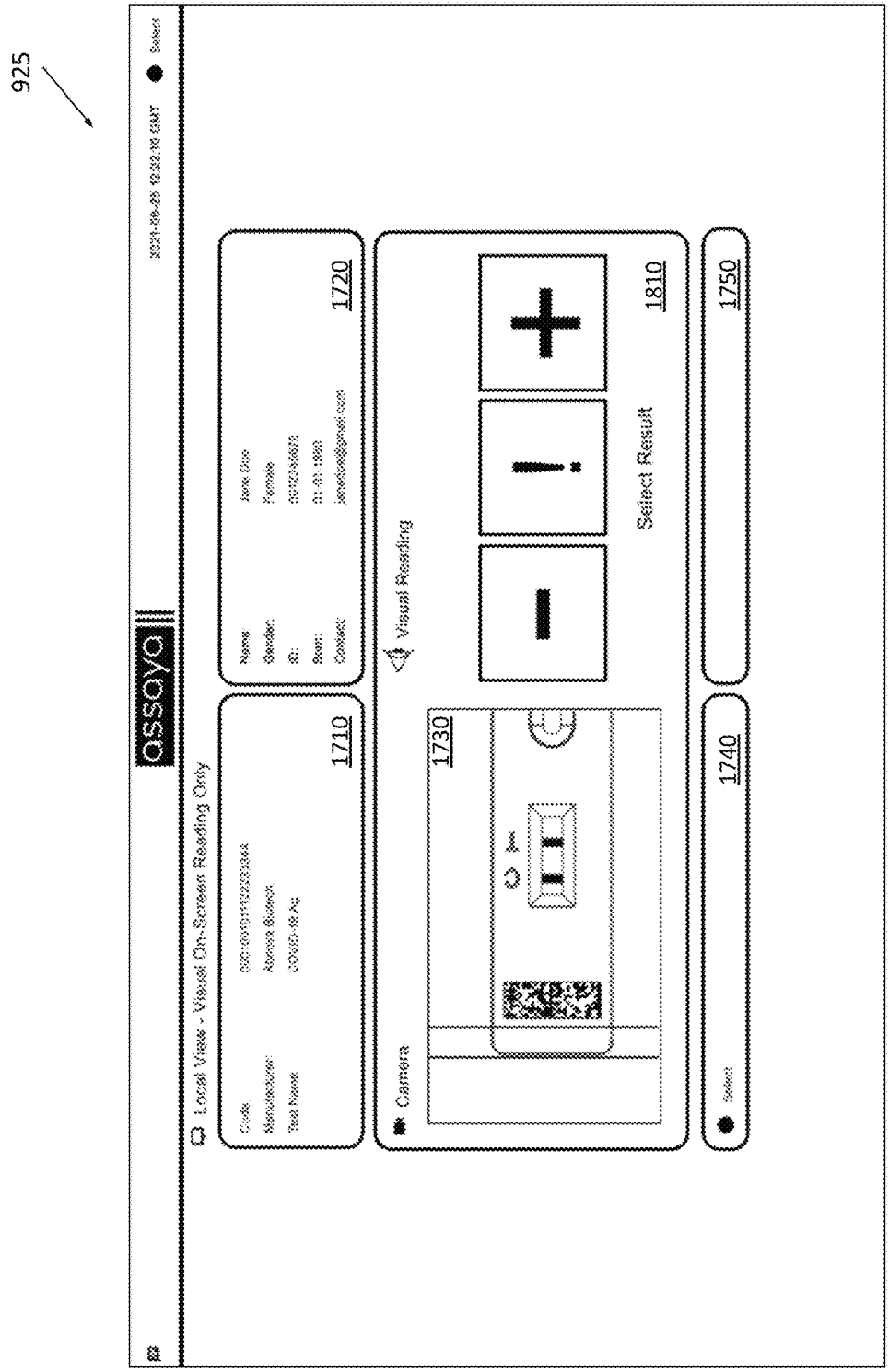
Figure 19H:
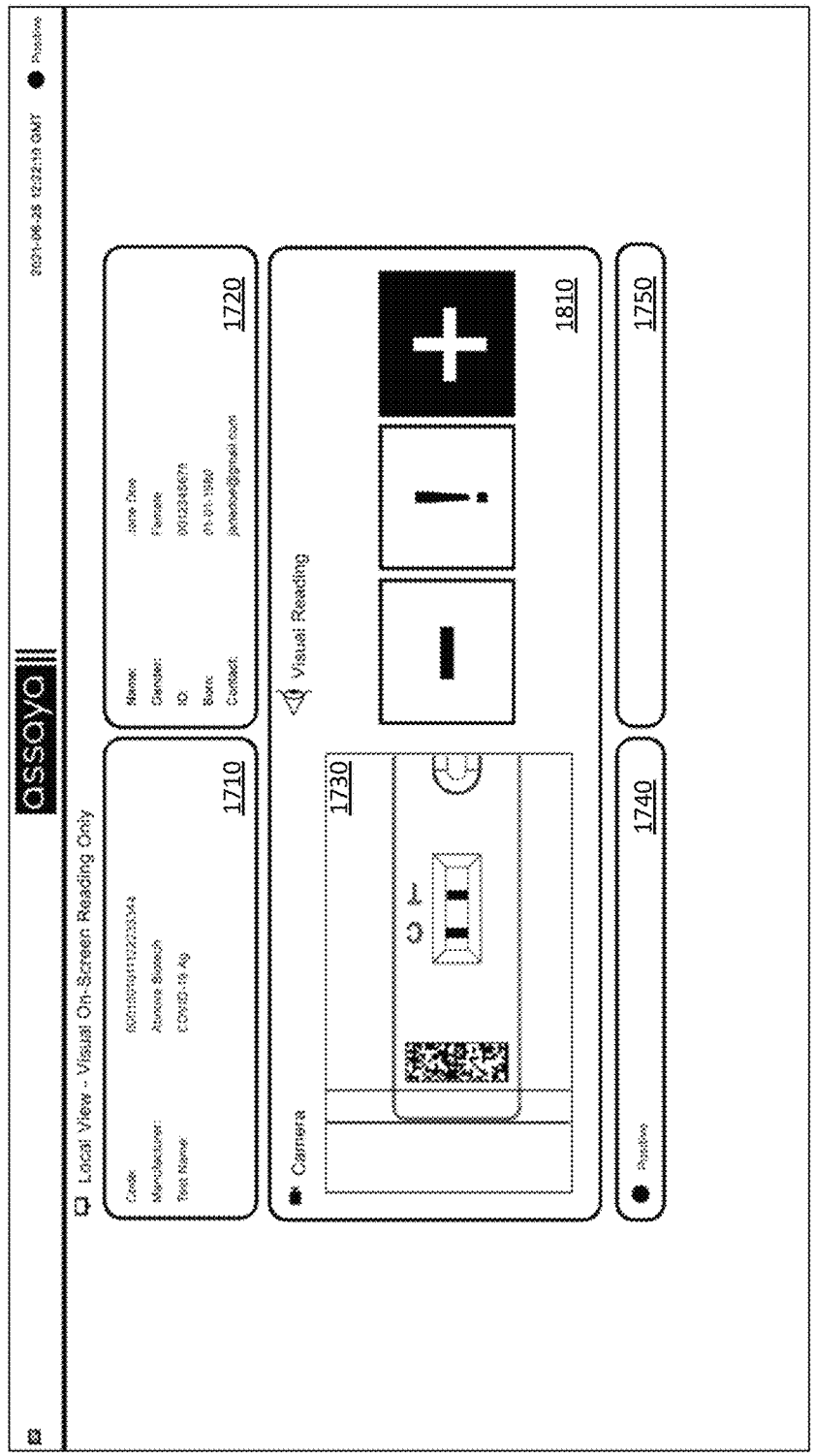

Like the modes previously discussed, upon insertion of a cassette into test device 100, test device 100 begins scanning which is displayed in result panel 1740 with the image of the cassette shown in camera panel 1730 (shown in FIG. 19b). The cassette panel is populated with information from the code on the cassette (FIG. 19c), and patient information is propagated in identification panel 1720 when the patient ID is read by test device 100 (FIG. 19d). After the cassette is removed and reinserted, test device 100 again scans the cassette (FIG. 19e), with the cassette information displayed in cassette panel 1710 (FIG. 19f) and the patient identification retrieved and displayed in identification panel 1720 (FIG. 19g). The operator is prompted to select a result of the test based on her visual reading of the cassette in camera panel 1730. In this example, the operator selects a positive result because she sees a clear test line present on the LFA test strip and Positive is displayed in result panel 1740 (FIG. 19h). The operator may change his input, so long as the cassette remains inserted in the test device 100 and so long as the option to disable changes has not been selected through the SIS. As previously described, each operator input is stored as collected information. Once the cassette is removed from the test device 100, the collected information and results are stored locally and uploaded to the central database.

While the above functionality is described with respect to a display unit 925, on a testing device 100 having a display unit 925 lacking touch input, similar functionality can be achieved through use of an operator input device 997 previously described that receives the operator determination of positive, negative, or invalid in place of the display unit 925.

FIGS. 20*a-e* illustrate the interface on the display unit 925 during operation of the testing device 100 when in the Visual On-Screen Reading with Machine Confirmation ("VORM") mode in accordance with an embodiment of the present invention. In VORM mode, an operator reads a cassette using the on-screen image from the camera panel 1730, makes a selection for the test result that she determines, enters the result in the operator result panel 1810, and test device 100 also analyzes the cassette to provide its calculated result. The VORM mode is useful for comparing the quality of machine results as compared to operator determined results. Using VORM mode allows for statistical analysis of the quality of test device results versus human determined results aided by the enhanced LFA image seen in the camera panel 1730 when the machine results are provided last.

Figure 20A:
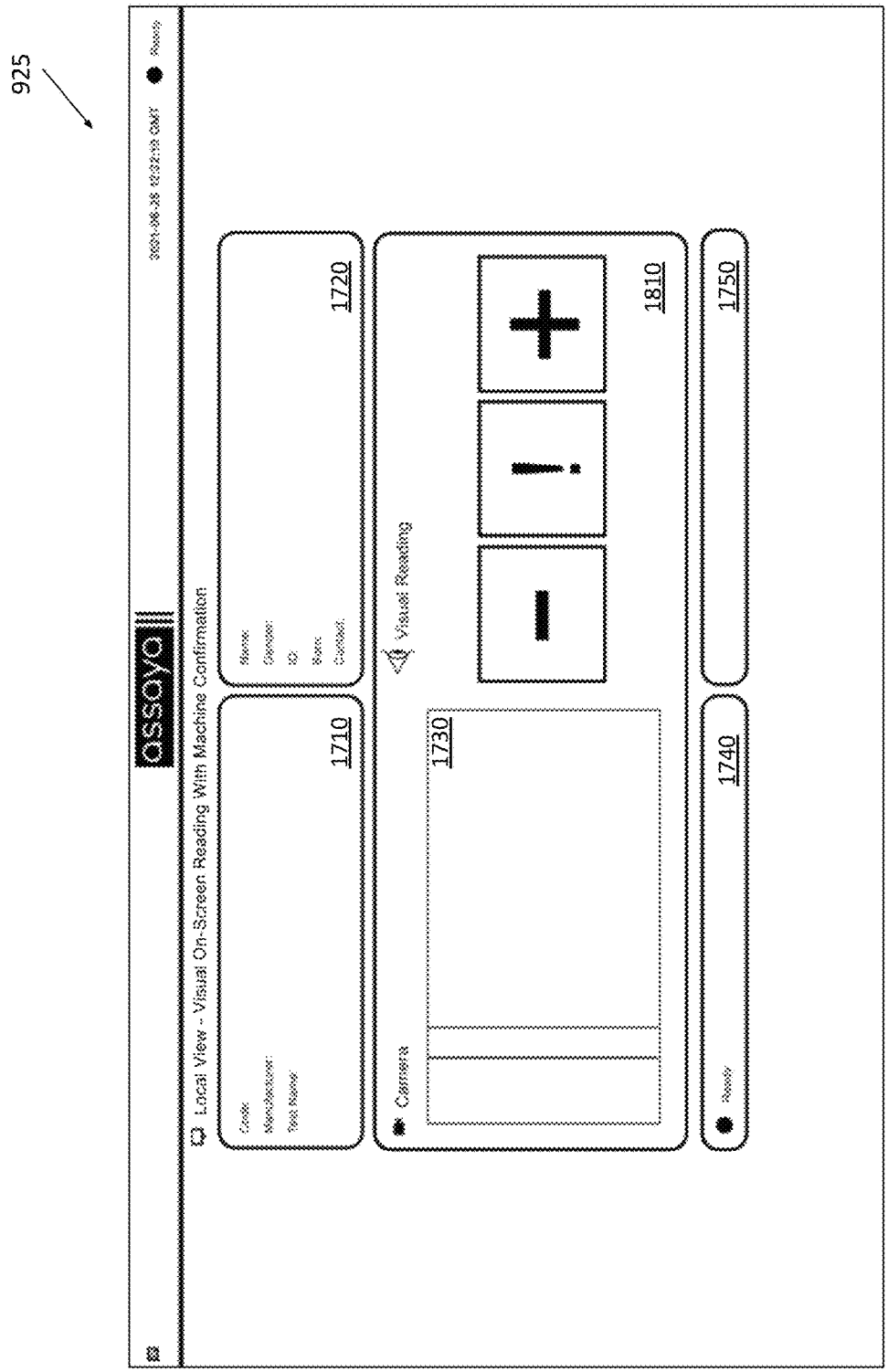
FIGS. 20a-e illustrate the interface on the display unit during operation of the testing device 100 when in the Visual On-Screen Reading with Machine Confirmation ("VORM") mode in accordance with an embodiment of the present invention.
Figure 20B:
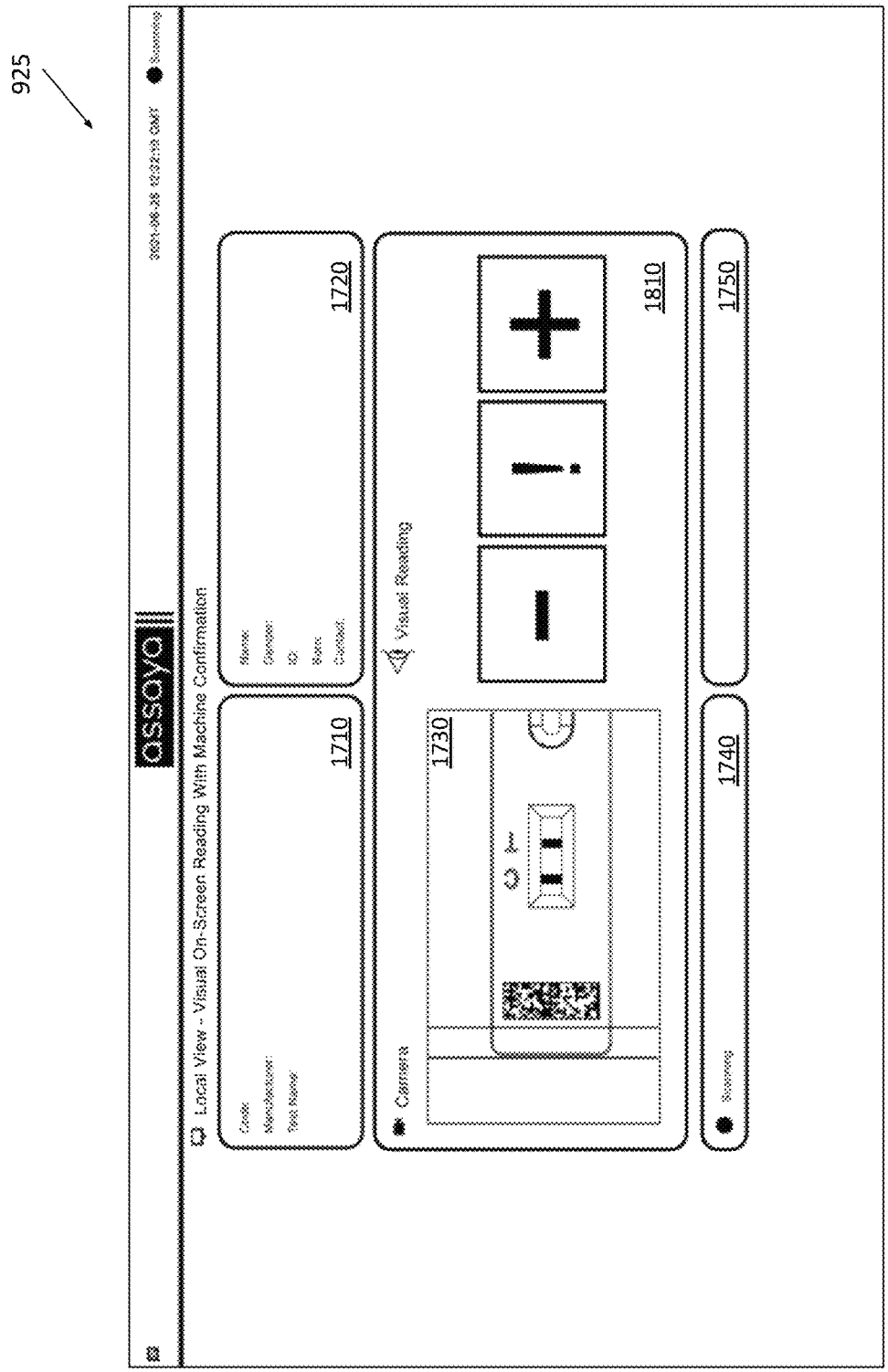
Figure 20C:
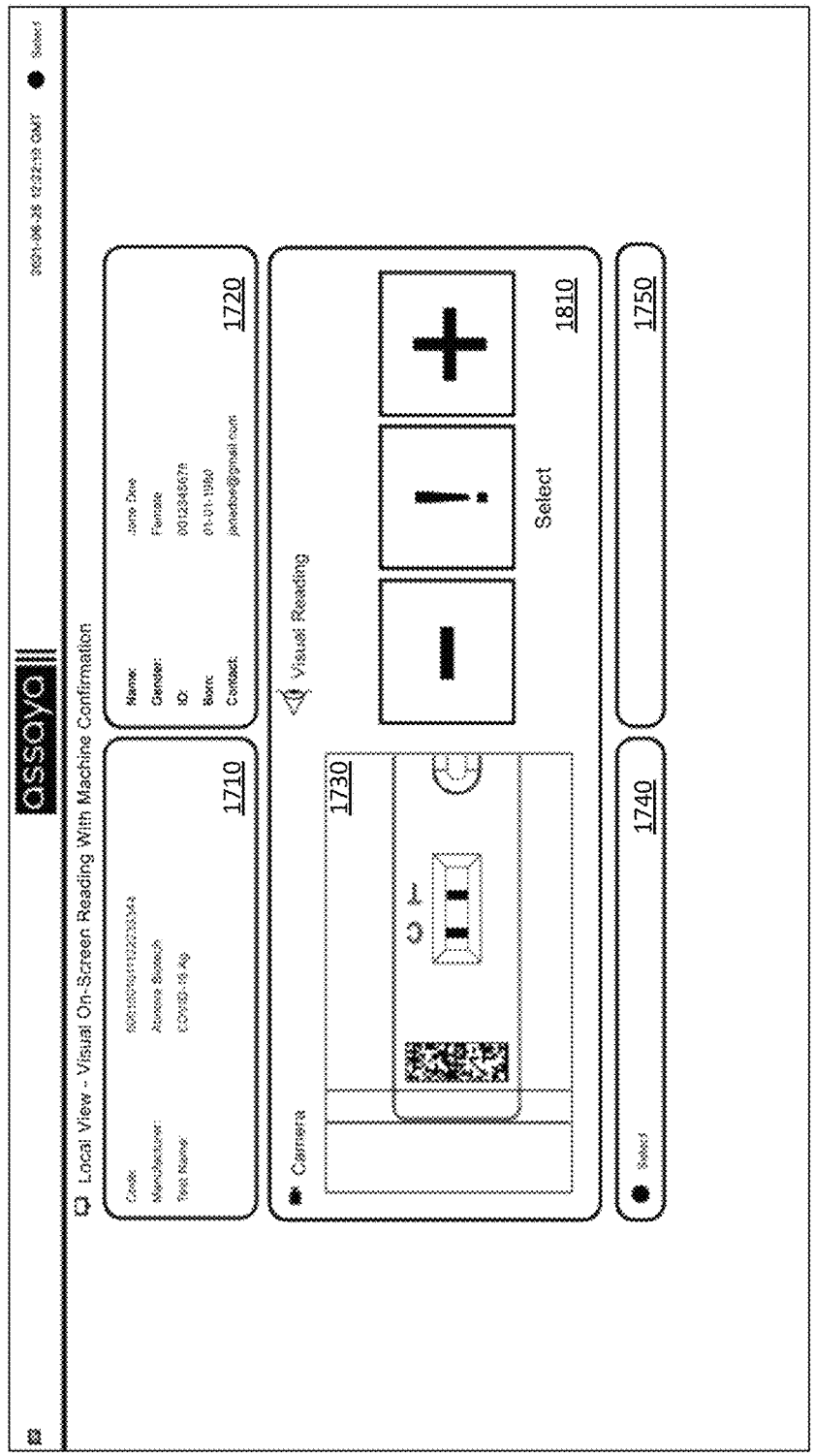

FIG. 20*a*. illustrates display unit 925 when test device 100 is in VORM mode upon startup and when no cassette is in test device 100. The initial steps of scanning a blank cassette, scanning patient identification and pairing the two is not repeated herein, but functions as previously described. As in previously described modes, upon insertion of a previously developed cassette, i.e., a cassette that has had a sample placed upon the sample pad and allowed to incubate, test device 100 begins scanning (FIG. 20*b*). Following scanning, the cassette panel 1710 and identification panel 1720 are populated based on the cassette scan (FIG. 20*c*).

Figure 20D:
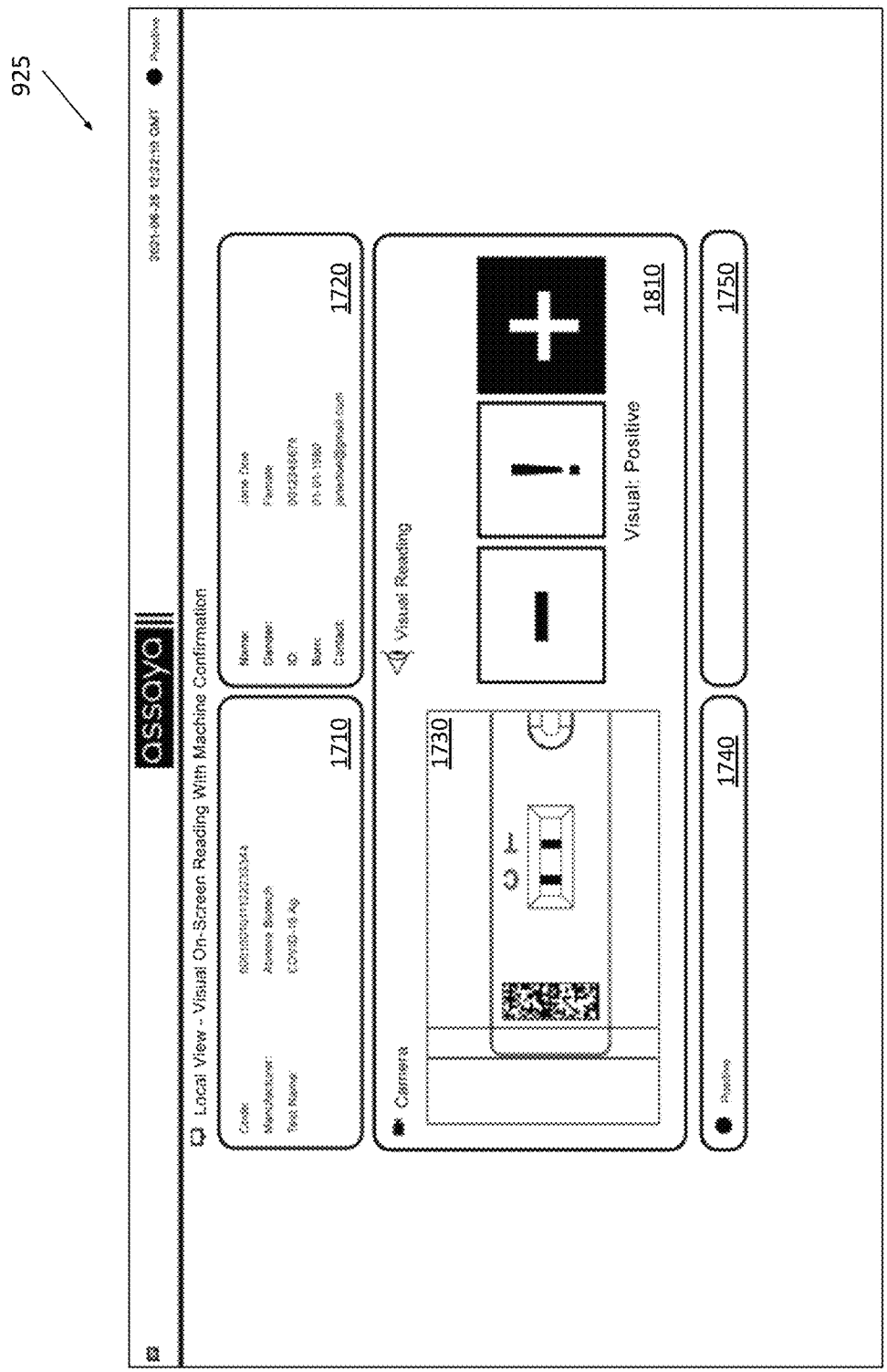
Figure 20E:
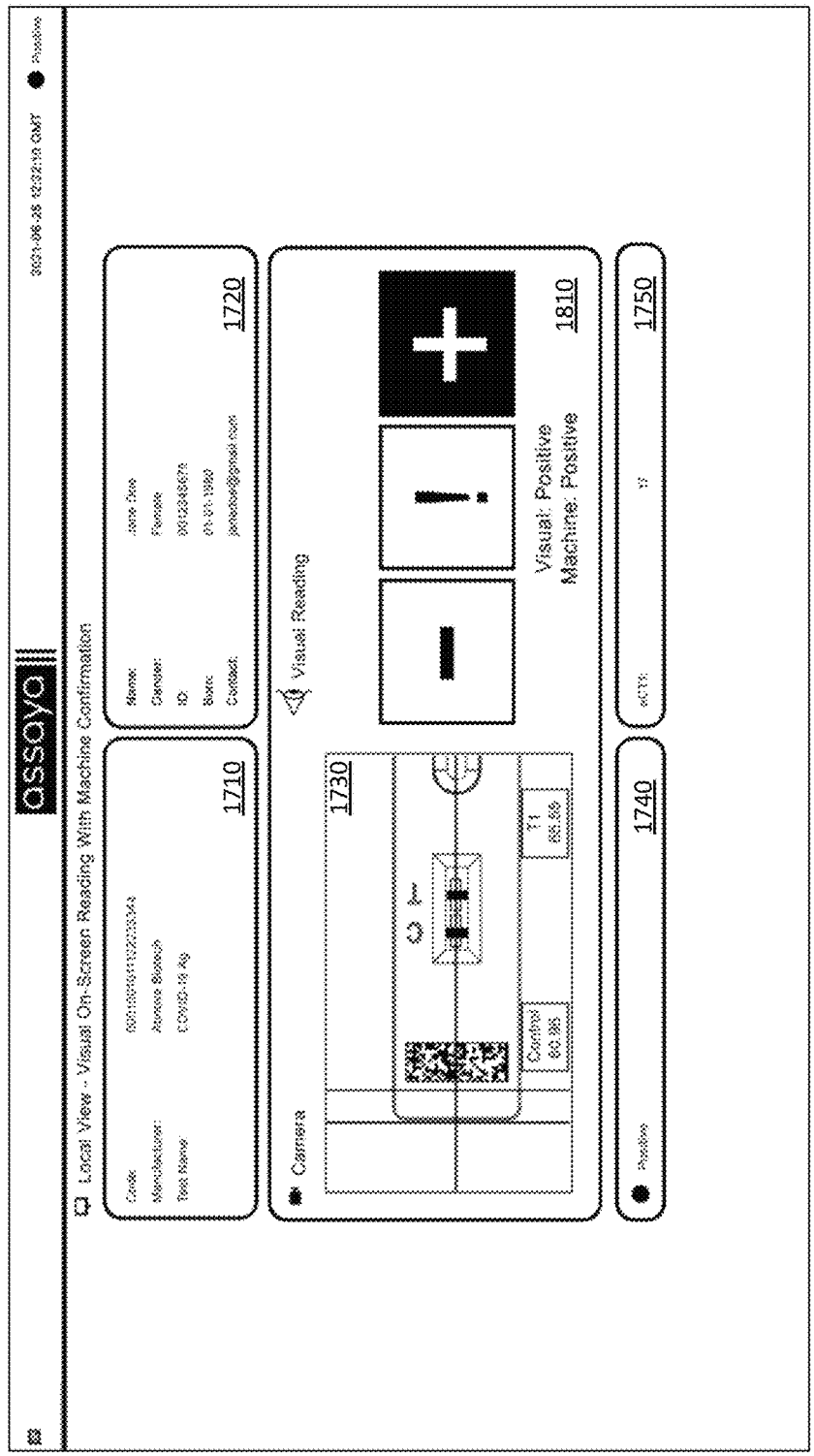

The operator then enters the test result in operator result panel 1810 that she determines by looking at the image of the cassette in the camera panel 1730 (FIG. 20*d*). Once the test device 100 receives the operator input, test device 100 displays the test device 100 calculated results based on its analysis of the image of the cassette if the calculated results (FIG. 20*e*) have not been barred from being viewed in the options of the testing device 100 set through the SIS. The operator may be permitted to change her input up until the time the cassette is removed or may be barred from making changes following display of the machine result depending upon a setting for the test device 100 set through the SIS. Again, operator inputs are stored locally as collected information. Once the cassette is removed from the test device 100, the collected information and results are stored locally and uploaded to the central database.

FIGS. 21*a-d* illustrate the interface on the display unit 925 during operation of the testing device 100 when in the Machine Reading with On-Screen Visual Confirmation ("MROV") mode in accordance with an embodiment of the present invention. In MROV mode, test device 100 analyzes the cassette to provide its calculated result, an operator reads the cassette using the on-screen image from the camera panel 1730, makes a selection for the test result that she determines, and enters the result in the operator result panel 1810.

Figure 21A:
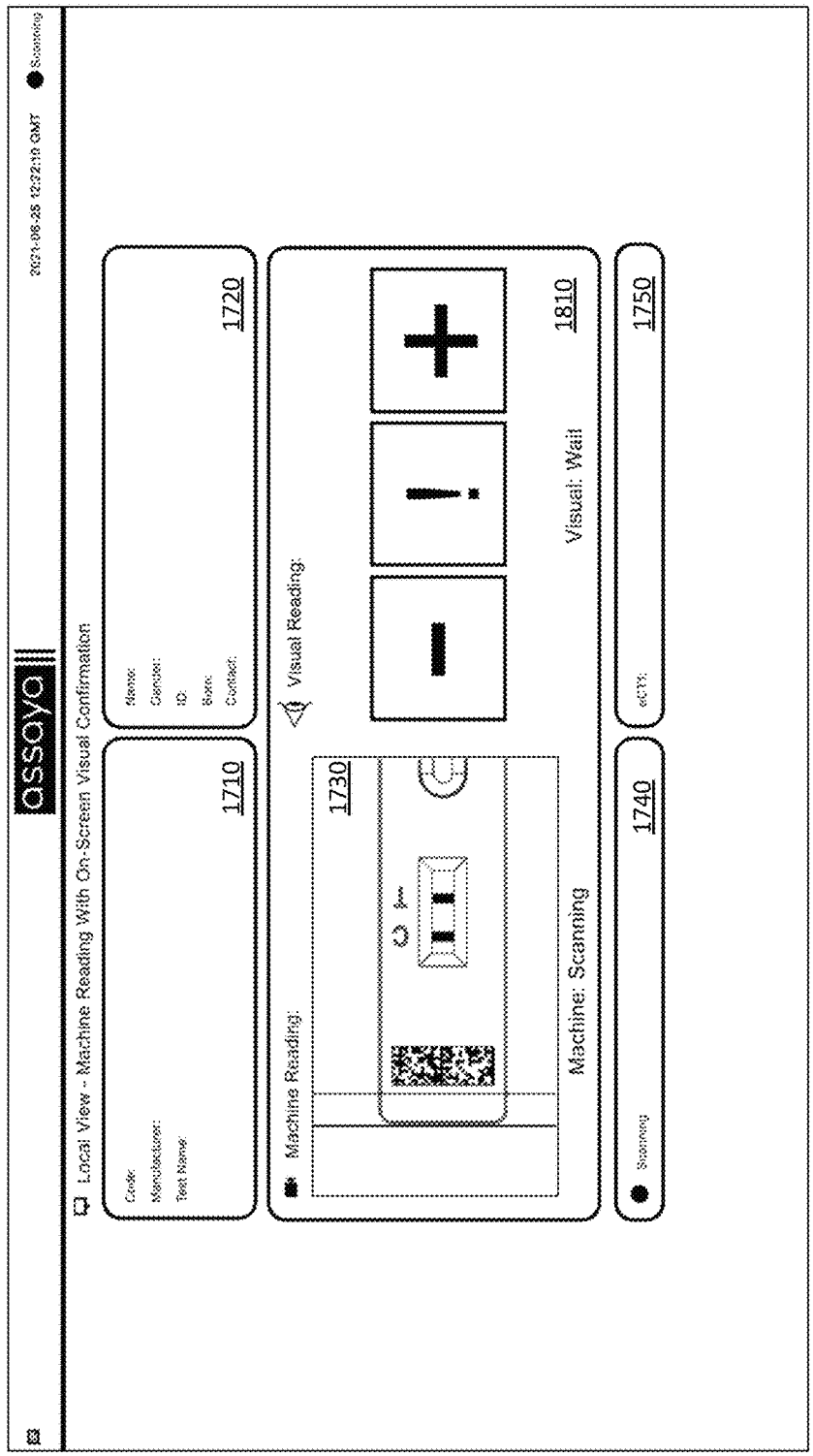
FIGS. 21a-d illustrate the interface on the display unit during operation of the testing device when in the Machine Reading with On-Screen Visual Confirmation ("MROV") mode in accordance with an embodiment of the present invention.

As it has been repeatedly discussed, the initial scanning of an unused cassette and linking to a provided patient ID is not shown in this sequence as it follows the same sequence previously provided. As in previously described modes, upon insertion of a developed cassette, test device 100 begins scanning (FIG. 21*a*). Following scanning, the cassette panel 1710 is populated based on the cassette scan, and the test device 100 determines the machine results which are displayed to the operator in result panel 1740 (FIG. 21*b*).

Figure 21B:
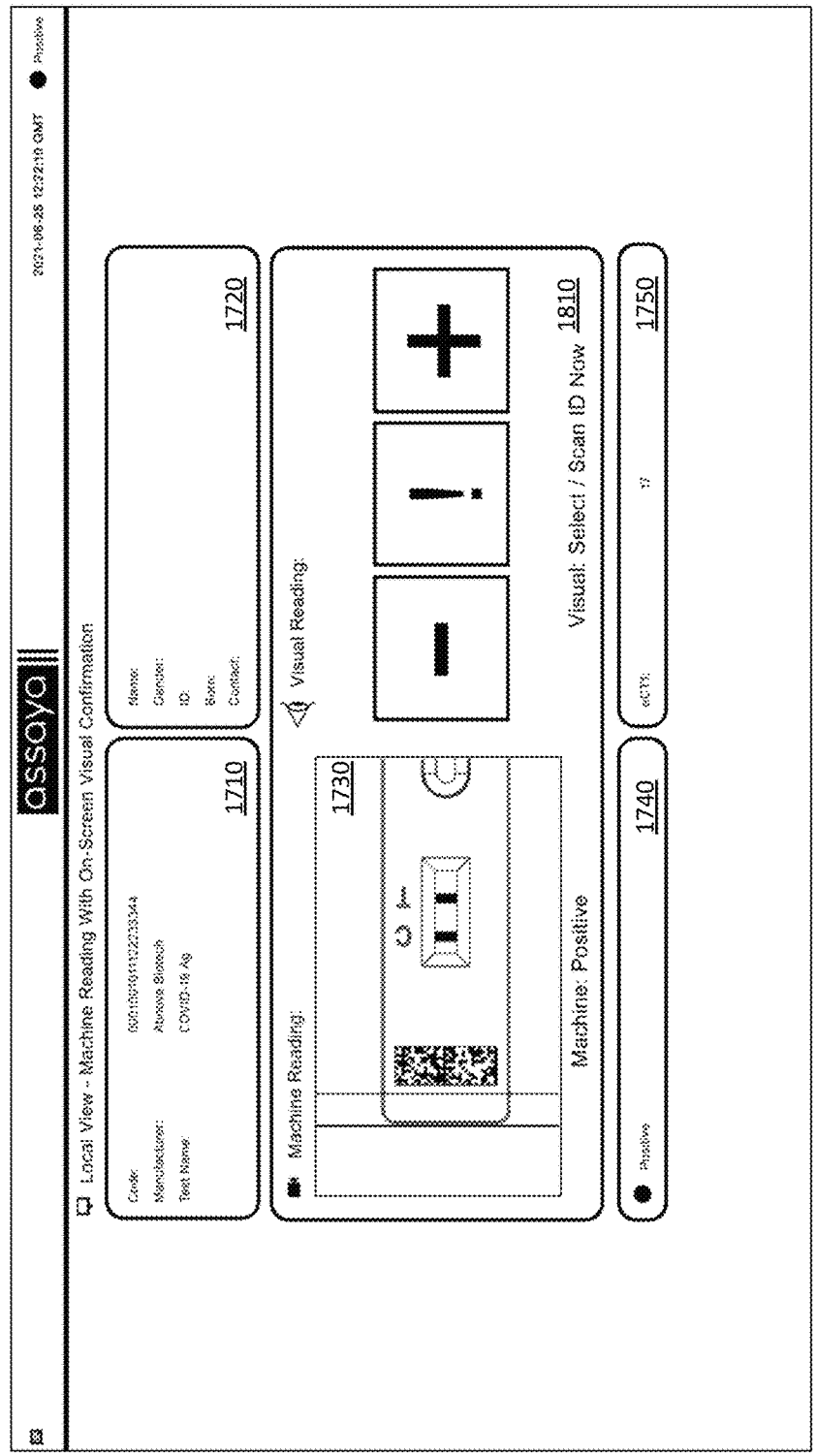
Figure 21C:
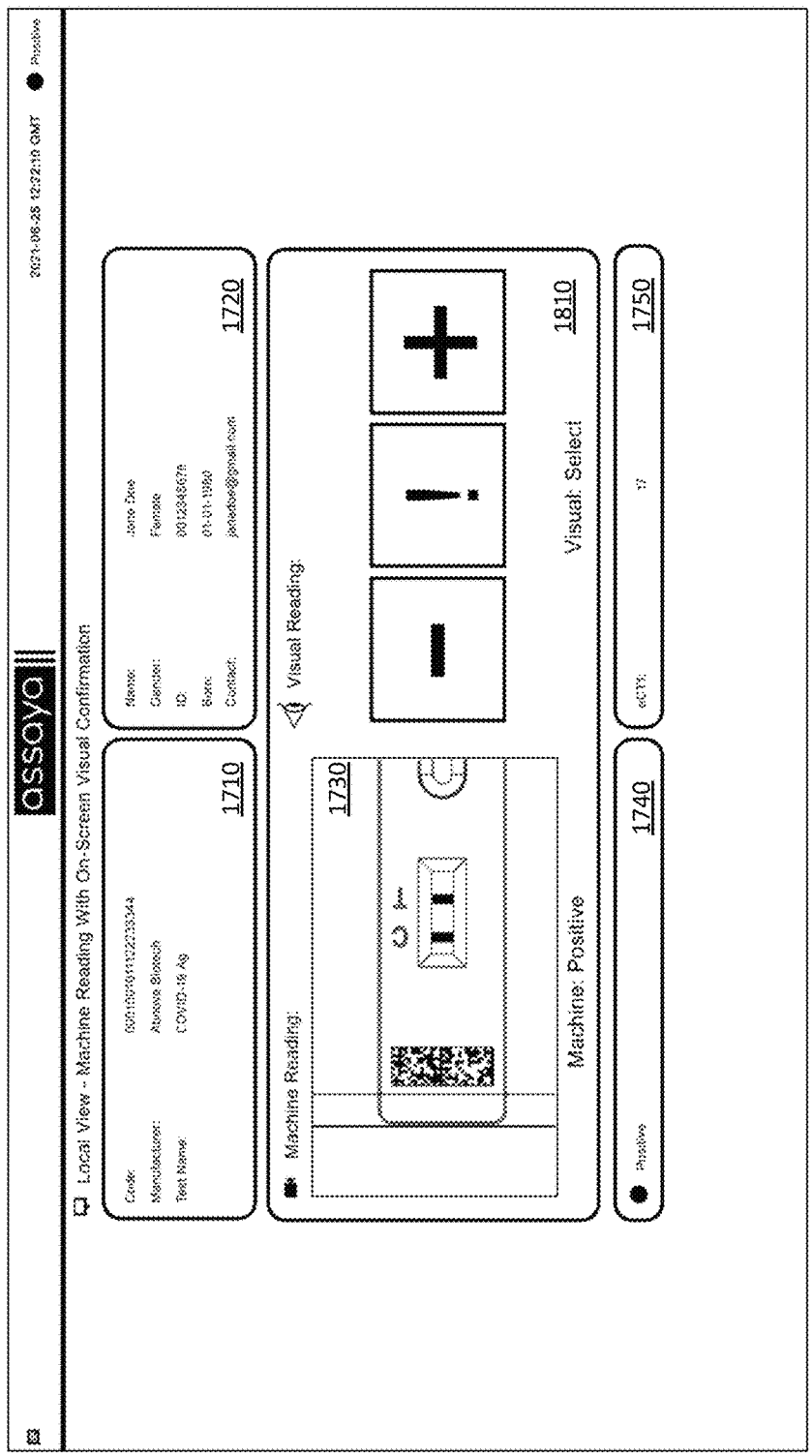

The operator then enters the test result in operator result panel 1810 that she determines by looking at the image of the cassette in the camera panel 1730 or scans patient identification if that has not yet occurred and been paired with the cassette (FIG. 21*b*). Note that in the example in FIG. 21*b* the patient identification has not yet been scanned and linked with the cassette. Should the operator scan the patient identification, the patient identification is linked to the cassette and patient identification appears in the identification panel 1720 if the obfuscation option has not been selected (FIG. 21*c*).

Figure 21D:
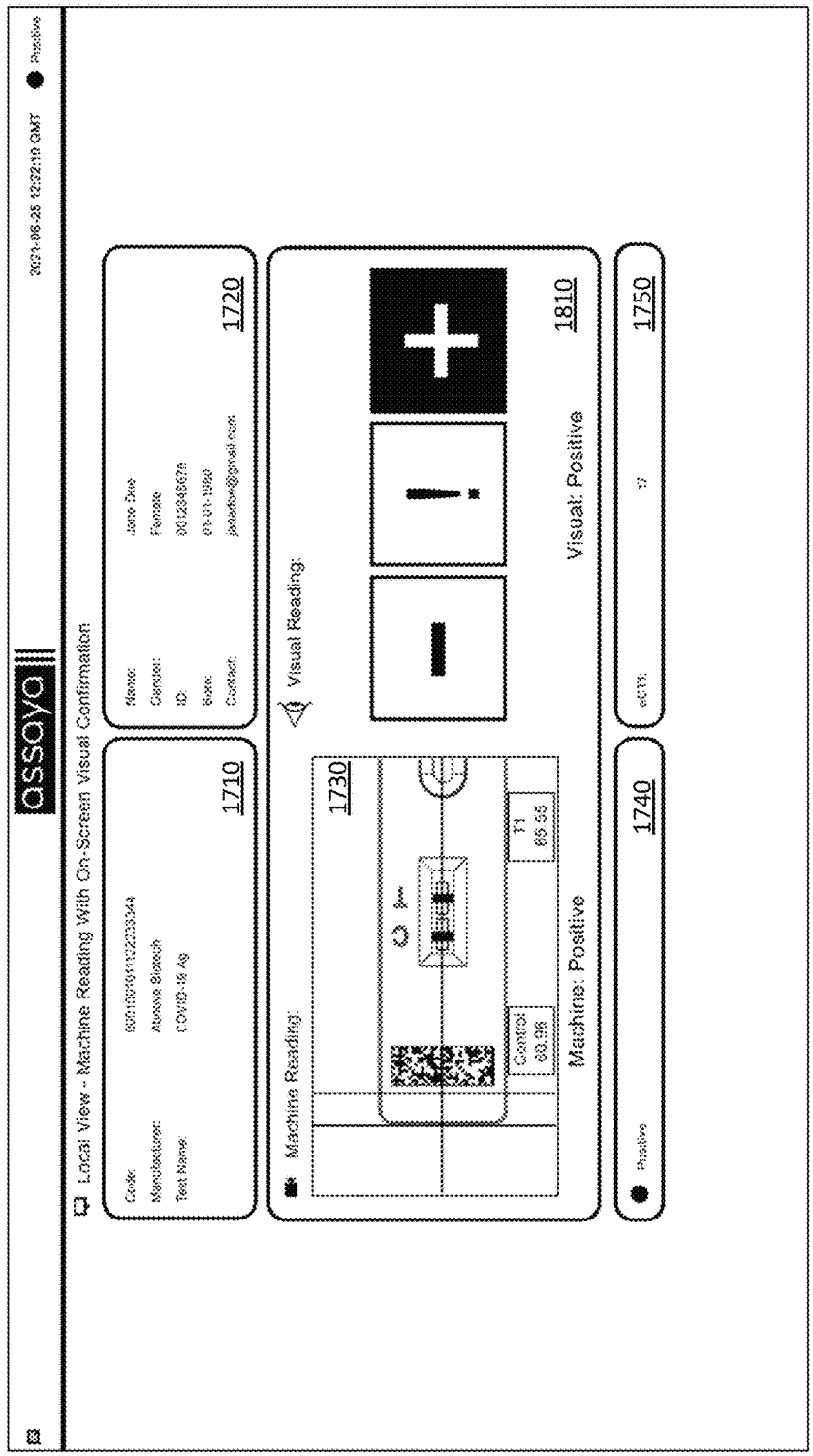

Once the test device 100 receives the operator input, test device 100 displays the test device 100 calculated results based on its analysis of the image of the cassette along with the equivalent cycle time result in equivalent panel 1750 (FIG. 21*d*). The operator may be permitted to change her input up until the time the cassette is removed or may be barred from making changes following display of the machine result depending upon a setting for the test device 100 set through the SIS. Once the cassette is removed from the test device 100, the collected information and results are stored locally and uploaded to the central database.

While the above functionality is described with respect to a display unit 925, on a testing device 100 having a display unit 925 lacking touch input, similar functionality can be achieved through use of an operator input device 997 previously described that receives the operator determination of positive, negative, or invalid in place of the display unit 925.

FIGS. 22*a-d* illustrate the interface on the display unit 925 during operation of the testing device 100 when in the Machine Reading with Visual Confirmation ("MRV") mode in accordance with an embodiment of the present invention. In MRV mode, test device 100 analyzes the cassette to provide its calculated result, an operator reads the cassette by viewing the cassette without use of any test device 100 image, makes a selection for the test result that she determines, and enters the result in the operator result panel 1810. The MRV mode is useful for comparing the quality of machine results as compared to operator determined results when an operator views the cassette with her naked eye. Using MRV mode allows for statistical analysis of the quality of test device results versus human determined results unaided by the enhanced LFA image seen in the camera panel 1730 when the machine results are provided first.

Figure 22A:
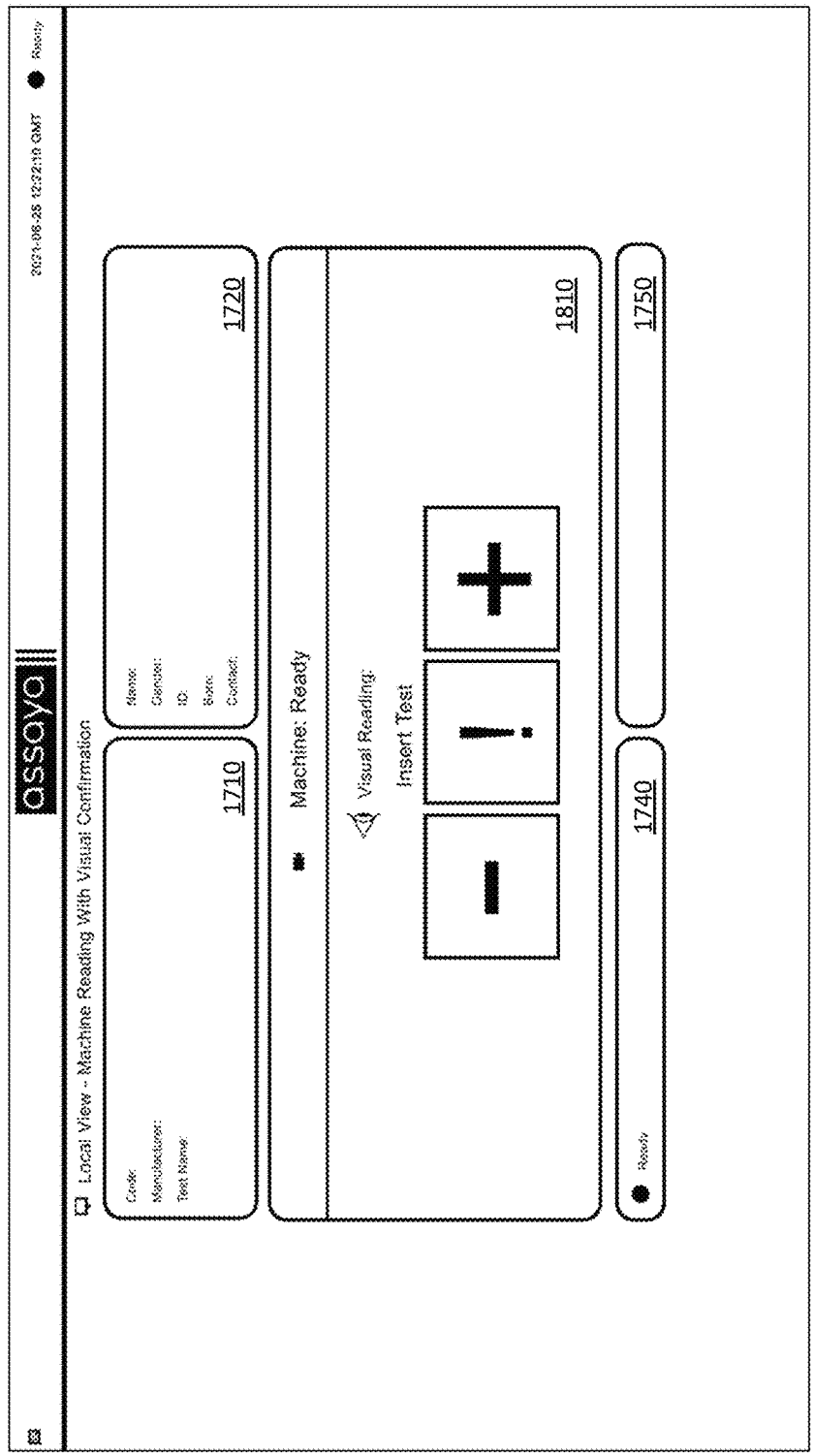
FIGS. 22a-d illustrate the interface on the display unit during operation of the testing device when in the Machine Reading with Visual Confirmation ("MRV") mode in accordance with an embodiment of the present invention.
Figure 22B:
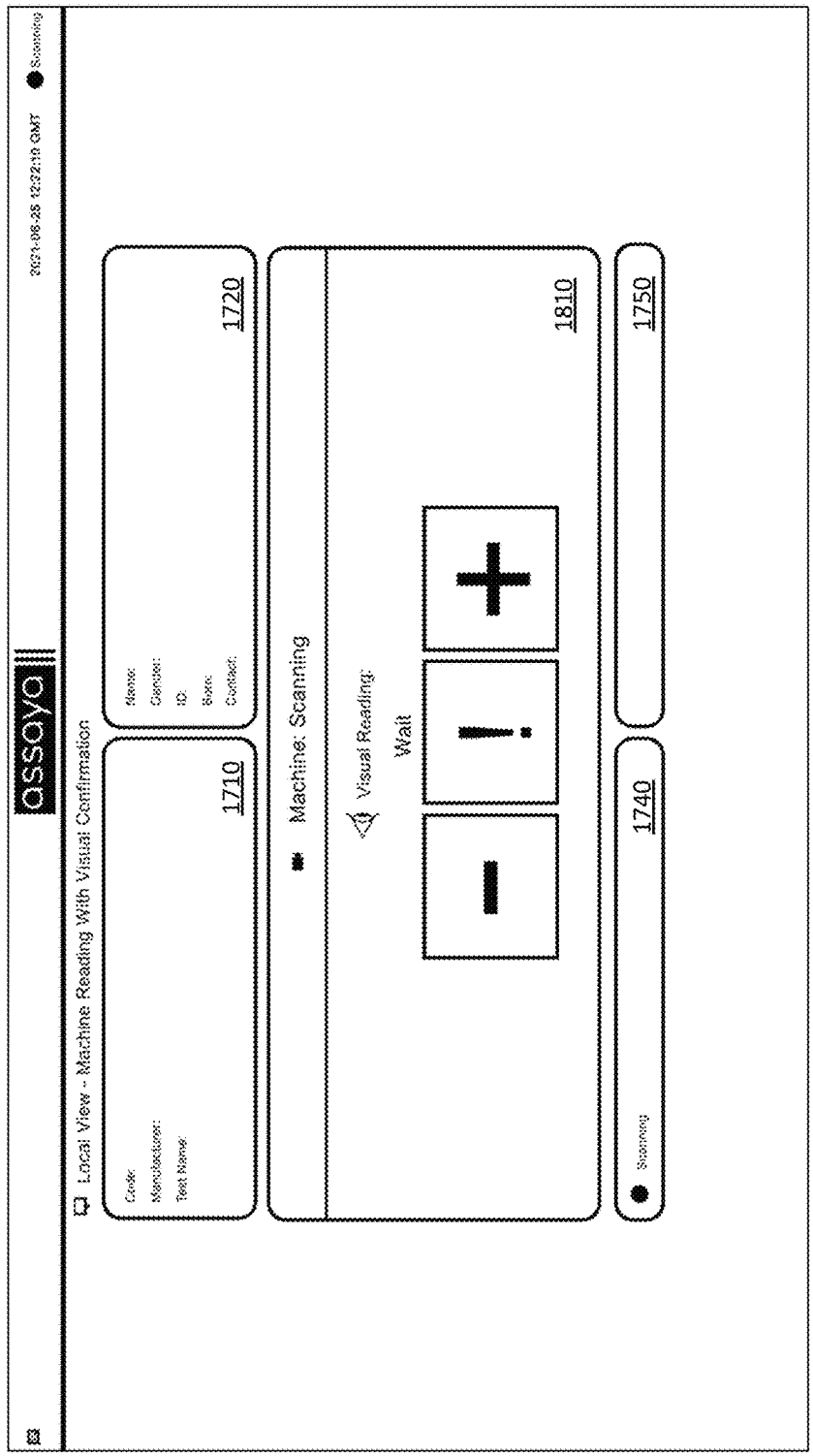
Figure 22C:
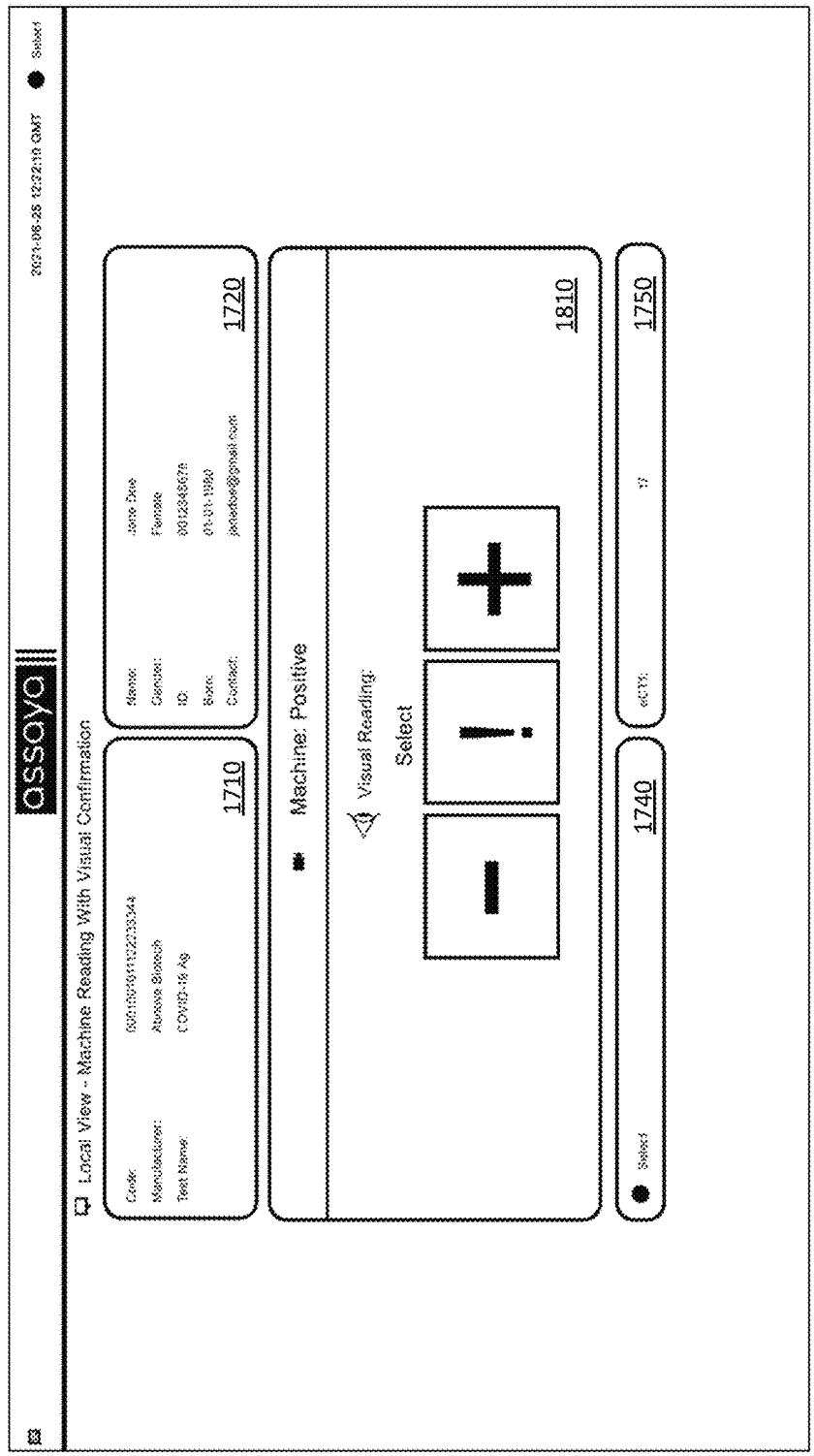

FIG. 22*a* illustrates display unit 925 when test device 100 is in MRV mode upon startup and when no cassette is in test device 100. As it has been repeatedly discussed, the initial scanning of an unused cassette and linking to a provided patient ID is not shown in this sequence as it follows the same sequence previously provided. As in previously described modes, upon insertion of a used cassette, test device 100 begins scanning (FIG. 22*b*). Following scanning, the cassette panel 1710 is populated based on the cassette scan and the test device 100 determines the machine results which are displayed to the operator above operator panel 1810 (FIG. 22*c*). The patient information is provided in identification panel 1720 (if this feature has not been disabled as to obfuscate the patient information from the operator).

Figure 22D:
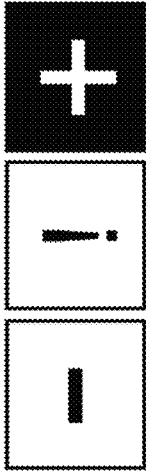

The operator then enters the test result in operator result panel 1810 that she determines by looking at the cassette with her naked eye (FIG. 22*d*). Once the test device 100 receives the operator input, test device 100 displays the test device 100 calculated results based on its analysis of the image of the cassette along with the equivalent cycle time result in equivalent panel 1750. The operator may be permitted to change her input up until the time the cassette is removed or may be barred from making changes following display of the machine result depending upon a setting for the test device 100 set through the SIS. Once the cassette is removed from the test device 100, the collected information and results are stored locally and uploaded to the central database.

While the above functionality is described with respect to a display unit 925, on a headless testing device 100, i.e., one without a display unit 925, similar functionality can be achieved through use of an operator input device 997 previously described that receives the operator determination of positive, negative, or invalid in place of the display unit 925.

FIGS. 23*a-d* illustrate the interface on the display unit 925 during operation of the testing device 100 when in the Visual Reading with Machine Confirmation ("VRM") mode in accordance with an embodiment of the present invention. In VRM mode, an operator reads the cassette by viewing the cassette without use of any test device 100 image, makes a selection for the test result that she determines, enters the result in the operator result panel 1810, and test device 100 analyzes the cassette to provide its calculated result. The VRM mode is useful for comparing the quality of machine results as compared to operator determined results when an operator views the cassette with her naked eye. Using VRM mode allows for statistical analysis of the quality of test device results versus human determined results unaided by the enhanced LFA image seen in the camera panel 1730 when the machine results are provided last.

Figure 23A:
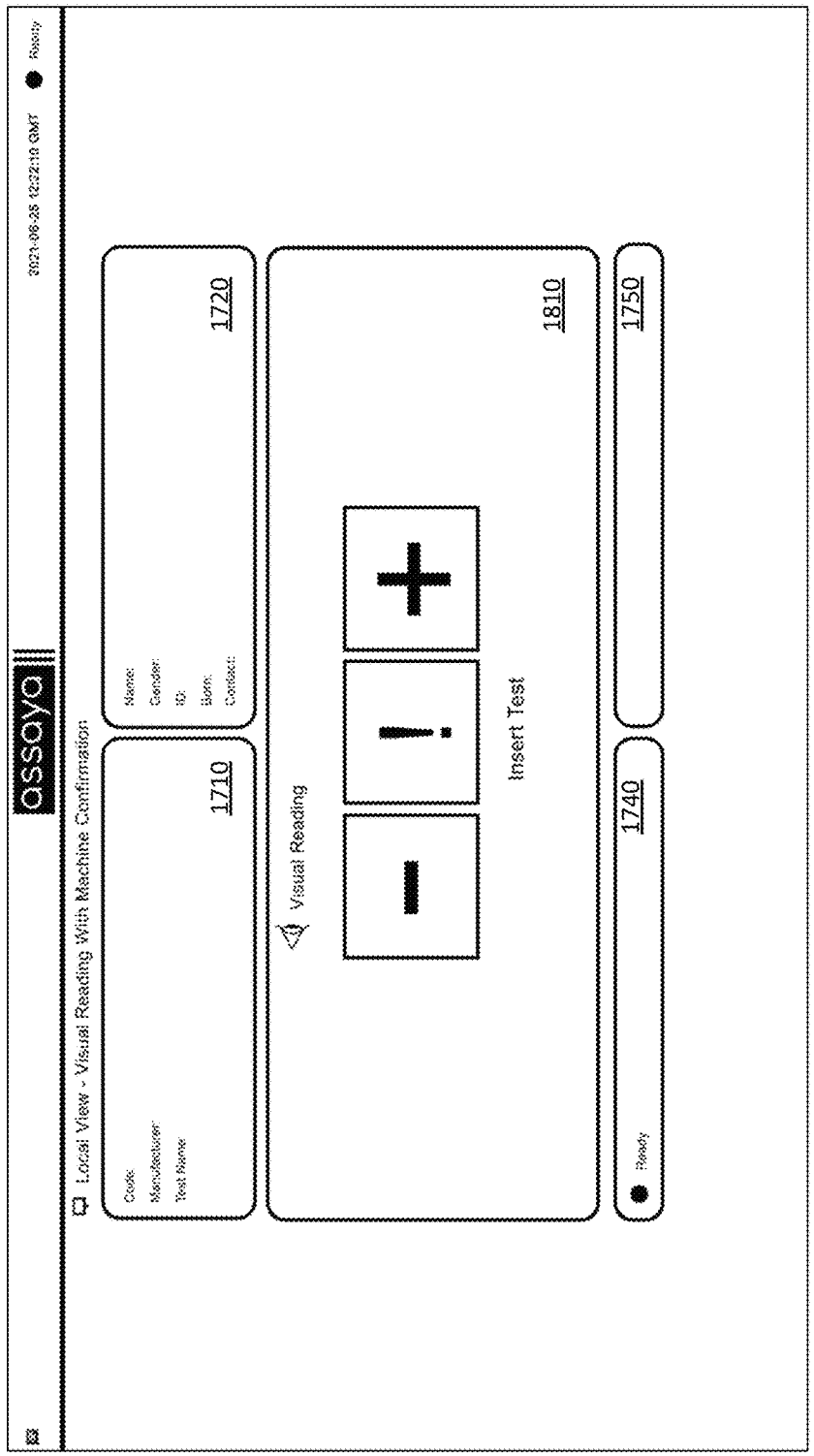
Figure 23B:
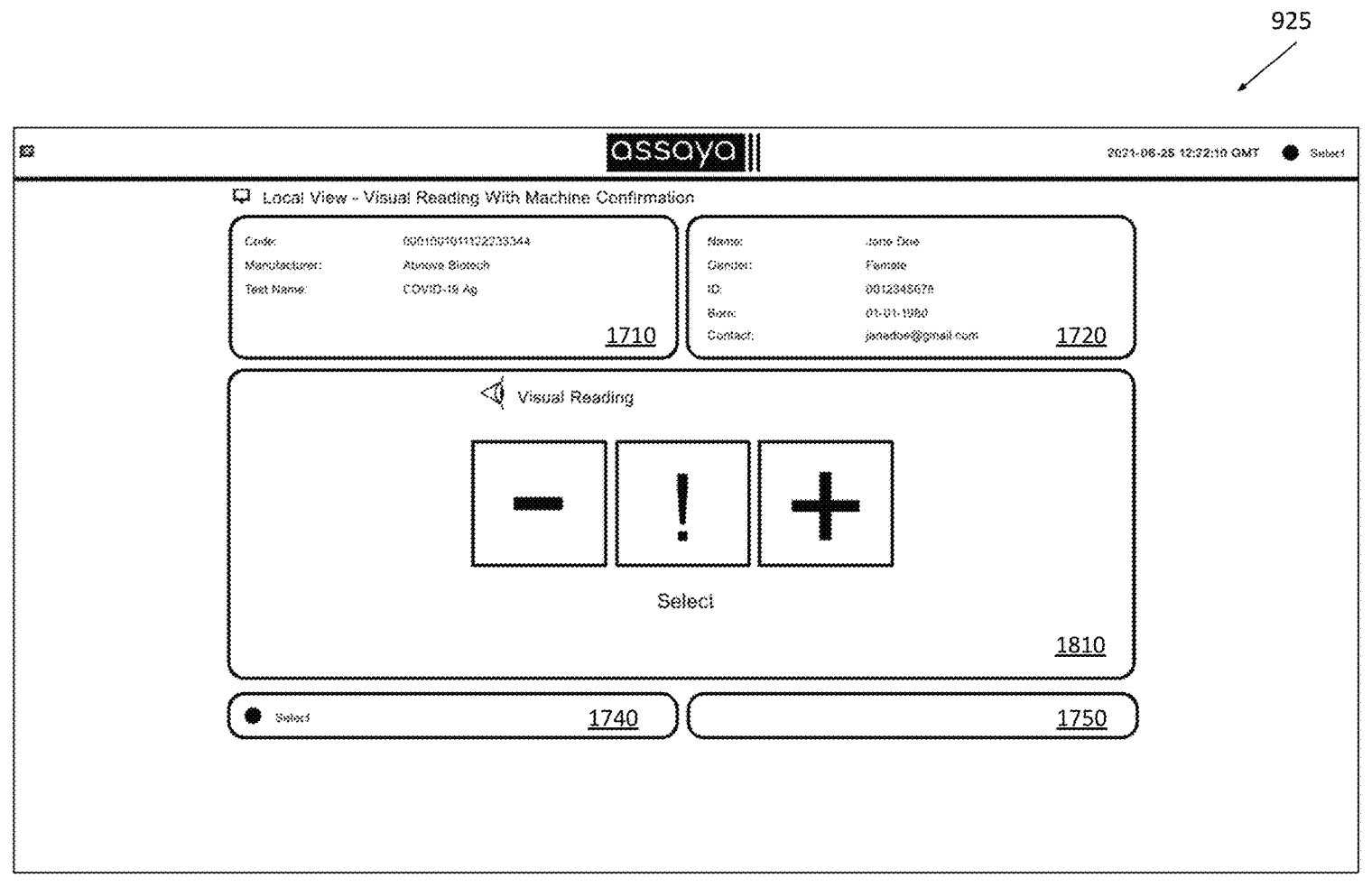
Figure 23C:
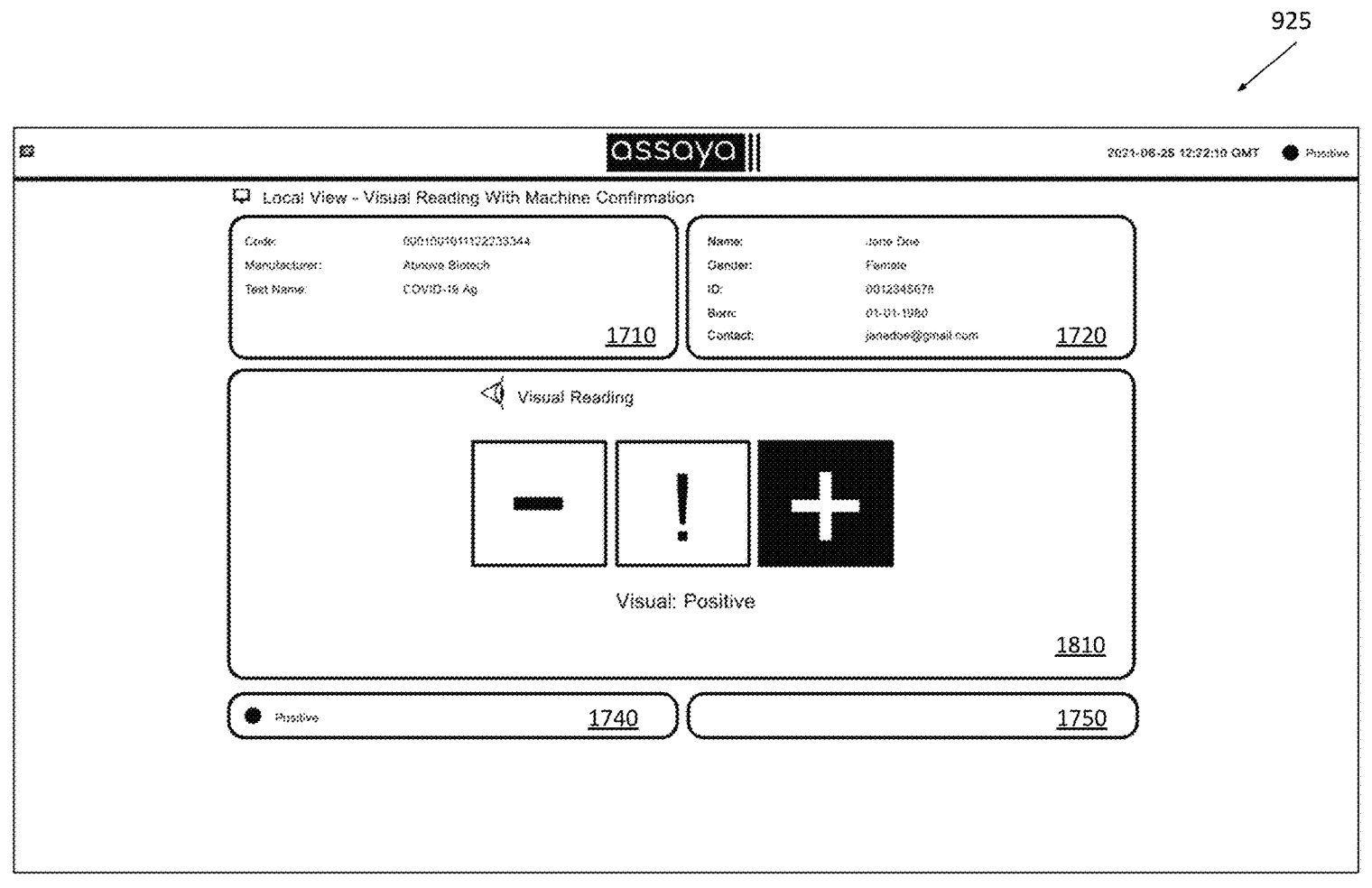
Figure 23D:
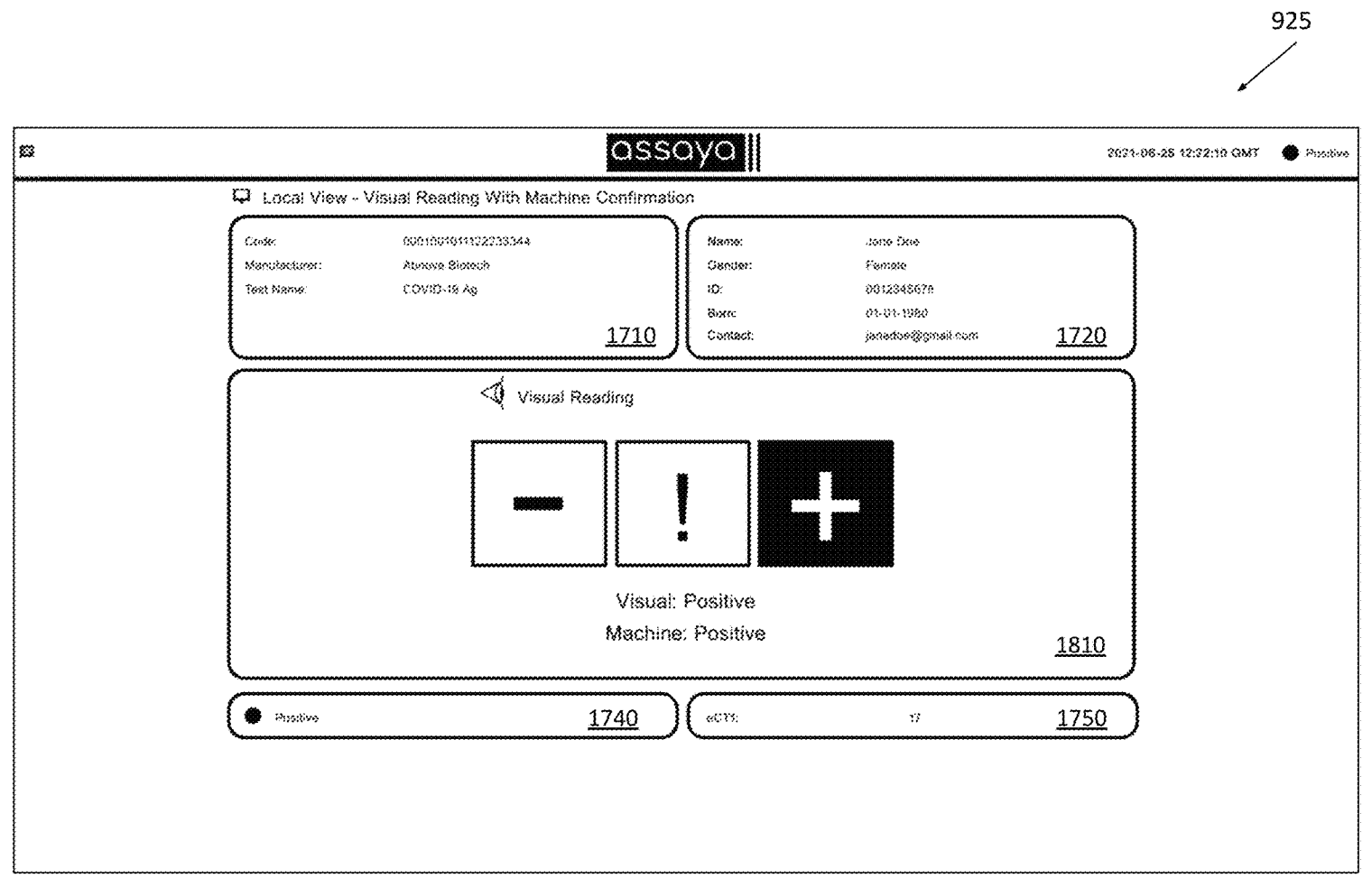

FIG. 23*a* illustrates display unit 925 when test device 100 is in VRM mode upon startup and when no cassette is in test device 100. As it has been repeatedly discussed, the initial scanning of an unused cassette and linking to a provided patient ID is not shown in this sequence as it follows the same sequence previously provided. As in previously described modes, upon insertion of a used cassette, test device 100 begins scanning (not shown). Following scanning, the cassette panel 1710 is populated based on the cassette scan (FIG. 23*b*). The operator enters her determination of the cassette test line result (positive/negative/invalid) on the display unit 925 (FIG. 23*c*). The test device 100 then provides its machine analysis of the cassette along with the equivalents result in equivalents panel 1750 (FIG. 23*d*). Once the cassette is removed from the test device 100, the collected information and results are stored locally and uploaded to the central database.

While the above functionality is described with respect to a display unit 925, on a headless testing device 100, i.e., one without a display unit 925, similar functionality can be achieved through use of an operator input device 997 previously described that receives the operator determination of positive, negative, or invalid in place of the display unit 925.

Figure 24:
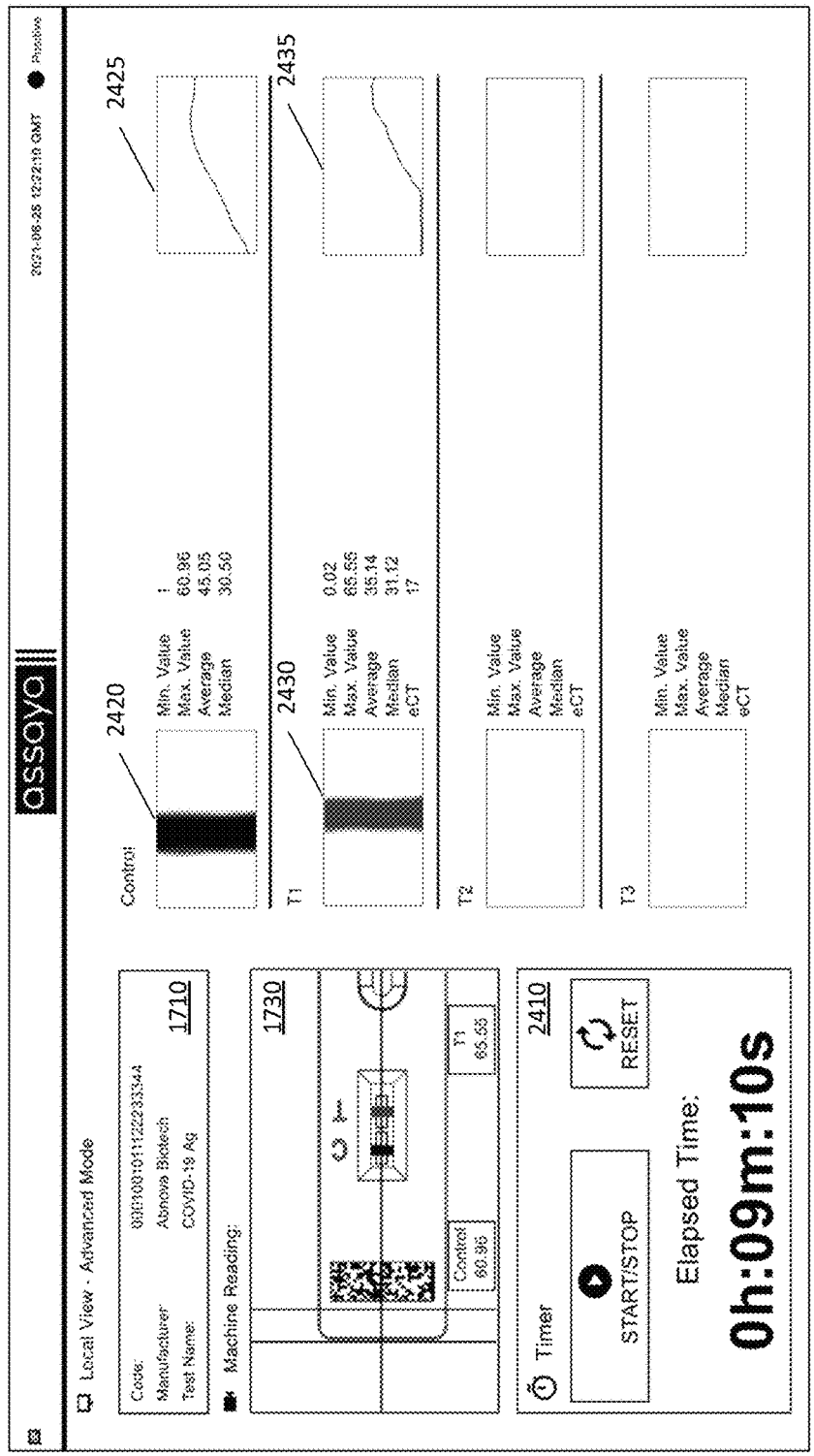
FIG. 24 illustrates the interface on the display unit during operation of the testing device 100 when in the Advanced mode in accordance with an embodiment of the present invention.

FIG. 24 illustrates the interface on the display unit 925 during operation of the testing device 100 when in the Advanced mode in accordance with an embodiment of the present invention. In Advanced mode, the operator is presented with data regarding the cassette in cassette panel 1710, a visual of the cassette in camera panel 1730, a magnified image 2420 of the control line, a control line histogram 2525 of the intensity of the control line over time, a magnified image 2430 of the test line, and a test line histogram 2435 over time. For each line, a minimum value, maximum value, average, and median are also provided. For each test line, an equivalent value, or eCt value, is provided.

Through the process described above, a large dataset of information is gathered regarding test results determined by machine, i.e. by the testing device 100, and test results gathered by a human operator who determines results by either visually inspecting LFA strips with the naked eye or is aided by a magnified image of LFA strips. This information can be statistically analyzed to yield comparisons between human determination of LFA strip results compared to machine-read and analyzed LFA strip results. In addition, information is also gathered regarding time delays between operator analysis of LFA strips and entry of the operator determined results into the testing device 100. These timing factors can demonstrate efficacy of magnified machine provided images over readings made by the naked eye.

Furthermore, possible operator bias can be studied where an operator is provided with machine results prior to operator entry of operator determined visual results. As time stamps are associated with all collected information, use of the methodology and systems described above can yield information regarding evaluation time among machine-read analysis, naked eye human analysis, and on-screen human analysis.

Finally, and perhaps most importantly, human-read results and machine-read results can be compared to each other to determine accuracy of these results and compared to PCR tests where PCR tests are currently accepted as the gold standard.

While FIG. 24 only illustrates results for a test cassette having a single control line and a single test line data set, testing device 100 can analyze and provide results (histograms, test line values, magnified line images) for a plurality of test lines or areas where lines are expected as can be seen in the unpopulated T2 and T3 areas of display unit 925. Each of camera panel 1730, magnified images 2420 and 2430, and histograms 2425 and 2435 can be selected to increase their size to full screen, after which selecting again reduces the size to the original size.

An operator panel 2410 allows the operator to start generation of the histograms of the lines, reset the histograms to time t=0, and display elapsed time since the start of the histogram. The left side of the histogram begins at the time that the Start button is pressed in operator panel 2410 with the right side of the histogram being the present time or representing an end time when Stop is pressed in operator panel 2410. If the Stop button is not activated within a predetermined period of time, for example, one hour, after pressing the Start button, then the test device 100 will stop the timer. The Advanced mode is useful for an operator to understand how a test develops over time. This allows a manufacturer to ensure consistent development of LFA strips over a time period taking into account various environmental conditions and sample sources. Expiration times can also be determined. All data collected is stored locally and uploaded to the central database.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Go (golang), Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system comprising:
   a memory having stored thereon a local testing database having a test configuration profile for a cassette having a lateral flow assay ("LFA") strip having a test line, the test configuration profile including an intensity threshold value for the test line that represents an intensity value which indicates a positive test result;

an LFA strip reader for reading the test line of the LFA strip;

a programmable data processing apparatus, in communication with the LFA strip reader and the local testing database in the memory, configured to determine an LFA test result based on comparing a measured intensity value of the LFA strip from the LFA strip reader to the intensity threshold value from the local testing database in the memory;

the programmable data processing apparatus further configured to implement an operator interface on a display connected to the programmable data processing apparatus for receiving an operator-provided result, the operator-provided result indicating whether the LFA strip has one of a positive test result or a negative test result, the programmable data processing apparatus further configured to receive the operator-provided result from the operator interface without first displaying the LFA test result on the operator interface;

the programmable data processing apparatus further configured to analyze the LFA test result and the operator-provided result to yield a result of a comparison between the LFA test result and the operator-provided result; and the programmable data processing apparatus further configured to store the result of the comparison in a result database stored in the memory connected to the programmable data processing apparatus.

2. The system of claim 1, further comprising:
the programmable data processing apparatus further configured to implement the display to show the LFA test result to an operator on the operator interface; and
the programmable data processing apparatus further configured to enable the operator to alter the operator-provided result after the LFA test result is displayed on the operator interface.

3. The system of claim 1, further comprising:
the programmable data processing apparatus further configured to implement a display to show the LFA test result to an operator on the operator interface, prior to receiving the operator-provided result;
the programmable data processing apparatus further configured to use the operator-provided result is used as a visual confirmation of the LFA test result, providing a Machine Reading with Visual Confirmation ("MRV") mode.

4. The system of claim 1, wherein the programmable data processing apparatus further configured to perform an analysis of discrepancies to tune the programmable data processing apparatus's determination of the LFA test result, wherein the discrepancies are a difference in the operator-provided results and the LFA test results.

5. The system of claim 1, wherein the programmable data processing apparatus further configured to receive the operator-provided result received without providing the LFA test result to an operator, and the programmable data processing apparatus further configured to use the operator-provided result is used for a visual confirmation of the LFA test result providing a Visual Reading with Machine Confirmation ("VRM") mode.

6. The system of claim 1, further comprising:
the programmable data processing apparatus further configured to show the LFA test result to an operator on the operator interface; and the programmable data processing apparatus further configured to request the operator interface to confirm the operator-provided result, after seeing the LFA test result.

7. The system of claim 1, further comprising:
the programmable data processing apparatus further configured to upload test results to a central database connected to the programmable data processing apparatus, the test results including the LFA test result, and the operator-provided result.

8. The system of claim 1, wherein the programmable data processing apparatus further configured to determine that the LFA strip is invalid when the operator-provided result does not match the LFA test result.

9. The system of claim 1, further comprising:
the programmable data processing apparatus further configured to implement on the a display a magnified image of a portion of the LFA strip, the portion comprising a control line, the programmable data processing apparatus further configured to show on the display a control line histogram of an intensity of the control line over time, the portion of the LFA strip further comprising the test line, and a test line histogram over time.

10. The system of claim 9, wherein for the test line and the control line a minimum value, maximum value, average, and median are displayed.

11. The system of claim 1, wherein:
the programmable data processing apparatus further configured to display the LFA test result on the operator interface after receiving the operator-provided result from the operator interface.

12. A method comprising:
maintaining a local testing database in a memory having stored thereon a test configuration profile for a cassette having a lateral flow assay ("LFA") strip having a test line, the test configuration profile including an intensity threshold value for the test line that represents an intensity value which indicates a positive test result;
reading the test line of the LFA strip using an LFA strip reader;
determining an LFA test result based on comparing a measured intensity value of a portion of the test line from the LFA strip reader to the intensity threshold value of the test line from the memory, subsequent to a sample being added to the LFA test strip;
receiving an operator-provided result at an operator interface on a display, the operator-provided result indicating whether the sample on the LFA strip results in one of a positive test result or a negative test result, wherein receiving the operator-provided result from the operator interface occurs without first displaying the LFA test result on the operator interface;
analyzing the LFA test result and the operator-provided result to yield a comparison between the LFA test result and the operator-provided result; and
storing a result of the comparison in the memory.

13. The method of claim 12, further comprising, at a time after the receiving an operator-provided result:
displaying the LFA test result to an operator; and
enabling the operator to alter the operator-provided result.

14. The method of claim 12, further comprising:
validating accuracy of the determining using the operator-provided result, wherein validation is determined by whether the LFA test result agrees with the operator-provided result.

15. The method of claim 12, wherein the operator-provided result is received without providing the LFA test result to an operator, and the operator-provided result is used for a visual confirmation of the LFA test result providing a Visual Reading with Machine Confirmation ("VRM") mode.

16. The method of claim 12, further comprising:
receiving the operator-provided result prior to displaying the LFA test result;
showing the LFA test result to an operator; and
requesting the operator to confirm the operator-provided result, after seeing the LFA test result.

17. The method of claim 12, further comprising:
displaying, on the operator interface, a magnified image of a portion of the LFA strip to aid an operator in producing the operator-provided result, the portion comprising a control line, the display further to show a control line histogram of an intensity of the control line over time, the portion further comprising of the test line, and a test line histogram over time.

18. The method of claim 17, wherein for the test line and the control line a minimum value, maximum value, average, and median are displayed on the operator interface.

19. The method of claim 12, further comprising:
displaying the LFA test result on the operator interface after receiving the operator-provided result from the operator interface.

20. A system comprising:
a local testing database having stored thereon a test configuration profile for a cassette having a lateral flow assay ("LFA") strip having a test line, the test configuration profile including an intensity threshold value for the test line that represents an intensity value which indicates a positive test result;
an LFA strip reader for reading the test line of the LFA strip;
a programmable data processing apparatus, in communication with the LFA strip reader and the local testing database, configured to determine an LFA test result based on comparing a measured intensity value of a portion of the test line from the LFA strip reader to the intensity threshold value from the test configuration profile;
the programmable data processing apparatus further configured to display an operator interface on a display connected to the programmable data processing apparatus for receiving an operator-provided result, the operator-provided result indicating whether the LFA strip has one of a positive test result or a negative test result, wherein receiving the operator-provided result from the operator interface occurs without first displaying the LFA test result on the operator interface; and
the programmable data processing apparatus further configured to store the LFA test result and the operator-provided result in a result database connected to the programmable data processing apparatus.

21. A system comprising:
a memory having stored therein a local testing database having a test configuration profile for a cassette having a lateral flow assay (LFA) strip with a test line, the test configuration profile including an intensity threshold value for the test line representing an intensity value which indicates a positive test result;
an LFA strip reader configured to read the test line of the LFA strip;
a programmable data processing apparatus configured by executable instructions stored in the memory to:
receive image data from the LFA strip reader,
compare a measured intensity value of the test line to the intensity threshold value,
determine an LFA test result based on the comparison of the measured intensity value of the test line to the intensity threshold value,
receive, from an operator interface on a display connected to the programmable data processing apparatus, an operator-provided result indicating a positive or negative test result, the operator-provided result being received without first displaying the LFA test result to an operator on the operator interface, and
compare the LFA test result and the operator-provided result to generate a comparison outcome;
a result database in the memory connected to the programmable data processing apparatus; and
the programmable data processing apparatus further configured to store the comparison outcome in a the result database.

22. The system of claim 20, wherein:
the programmable data processing apparatus further configured to display the LFA test result on the operator interface after receiving the operator-provided result from the operator interface.

* * * * *